(12) United States Patent
Fukuhara et al.

(10) Patent No.: US 8,213,731 B2
(45) Date of Patent: Jul. 3, 2012

(54) INFORMATION PROCESSING DEVICE AND METHOD

(75) Inventors: Takahiro Fukuhara, Kanagawa (JP); Naoto Nishimura, Kanagawa (JP)

(73) Assignee: Sony Corporation, Tokyo (JP)

( * ) Notice: Subject to any disclaimer, the term of this patent is extended or adjusted under 35 U.S.C. 154(b) by 1067 days.

(21) Appl. No.: 12/111,450

(22) Filed: Apr. 29, 2008

(65) Prior Publication Data

US 2008/0285869 A1    Nov. 20, 2008

(30) Foreign Application Priority Data

May 17, 2007    (JP) ................................ 2007-131287

(51) Int. Cl.
*G06K 9/36*    (2006.01)
*H04N 7/12*    (2006.01)

(52) U.S. Cl. ................... 382/240; 375/240.19

(58) Field of Classification Search ........... 382/240, 382/260, 263, 264, 305, 312; 375/240.19, 375/240.21, 240.29; 348/398.1
See application file for complete search history.

(56) References Cited

U.S. PATENT DOCUMENTS

| | | | | |
|---|---|---|---|---|
| 5,926,791 A * | 7/1999 | Ogata et al. | ................... | 704/500 |
| 6,643,406 B1 * | 11/2003 | Hajjahmad et al. | ........... | 382/240 |
| 6,674,911 B1 * | 1/2004 | Pearlman et al. | ............. | 382/240 |
| 6,757,343 B1 * | 6/2004 | Ortega et al. | ................. | 375/340 |
| 6,996,281 B2 * | 2/2006 | Boliek et al. | .................. | 382/236 |
| 2007/0269122 A1 | 11/2007 | Fukuhara et al. | | |
| 2007/0286510 A1 | 12/2007 | Fukuhara | | |
| 2008/0013845 A1 | 1/2008 | Fukuhara et al. | | |
| 2008/0013846 A1 | 1/2008 | Fukuhara et al. | | |

FOREIGN PATENT DOCUMENTS

| | | |
|---|---|---|
| JP | 10-283342 | 10/1998 |
| JP | 11-239060 | 8/1999 |
| JP | 2002-101310 | 4/2002 |

OTHER PUBLICATIONS

U.S. Appl. No. 11/814,257, filed Jul. 18, 2007, Takahiro Fukuhara, et al.
Wim Sweldens, "The Lifting Scheme: A Custom-Design Construction of Biorthogonal Wavelets", Applied and Computational Harmonic Analysis, vol. 3, No. 2, pp. 186-200, 1996.
Christos Chrysafis et al., "Line Based, Reduced Memory, Wavelet Image Compression", IEEE Transactions on Image Processing, vol. 9, No. 3, pp. 378-389, Mar. 2000.

* cited by examiner

*Primary Examiner* — Kanjibhai Patel
(74) *Attorney, Agent, or Firm* — Oblon, Spivak, McClelland, Maier & Neustadt, L.L.P.

(57) ABSTRACT

An information processing device includes: a synthesis filter processing unit to subject image data to analysis filtering for dividing the frequency components of the image data into highband components and lowband components hierarchically, and subject the frequency components of the image data divided into a plurality of frequency components to synthesis filtering for mutually synthesizing the frequency components of the frequency band of the same division level recursively; a frequency component holding unit to hold frequency components of a division level one order lower, generated by the synthesis filtering performed by the synthesis filter processing unit; and a control unit to cause the synthesis filter processing unit to recursively perform the synthesis filtering processing on each frequency component held in the frequency component holding unit, in an order whereby the image data is restored in order from the top of the image, a plurality of lines at a time.

14 Claims, 29 Drawing Sheets

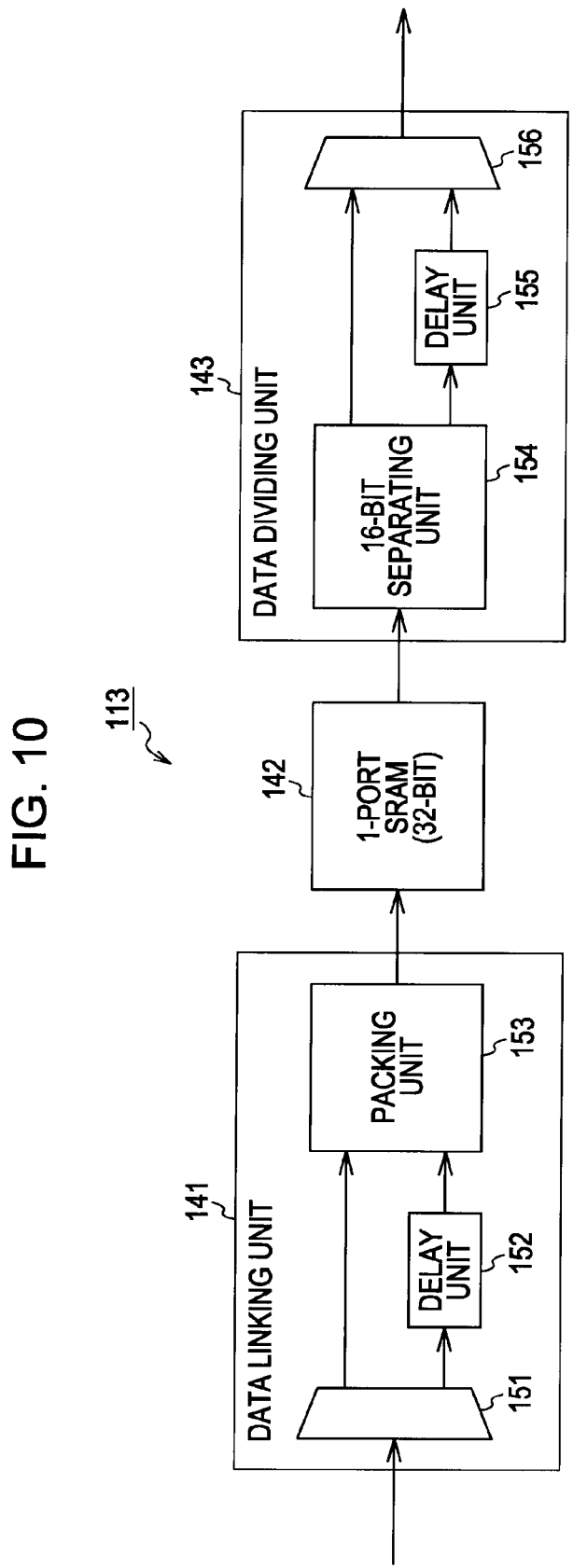

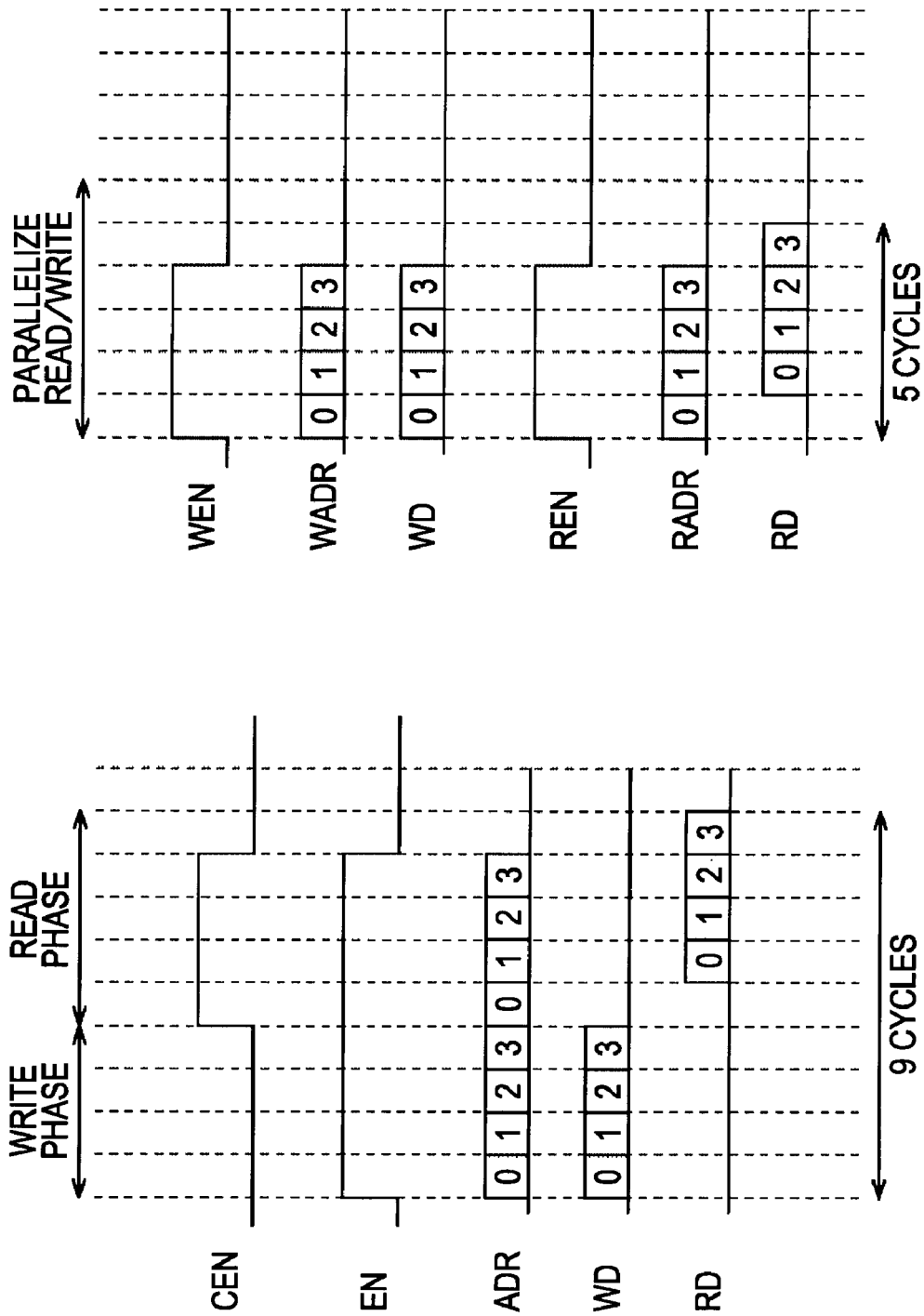

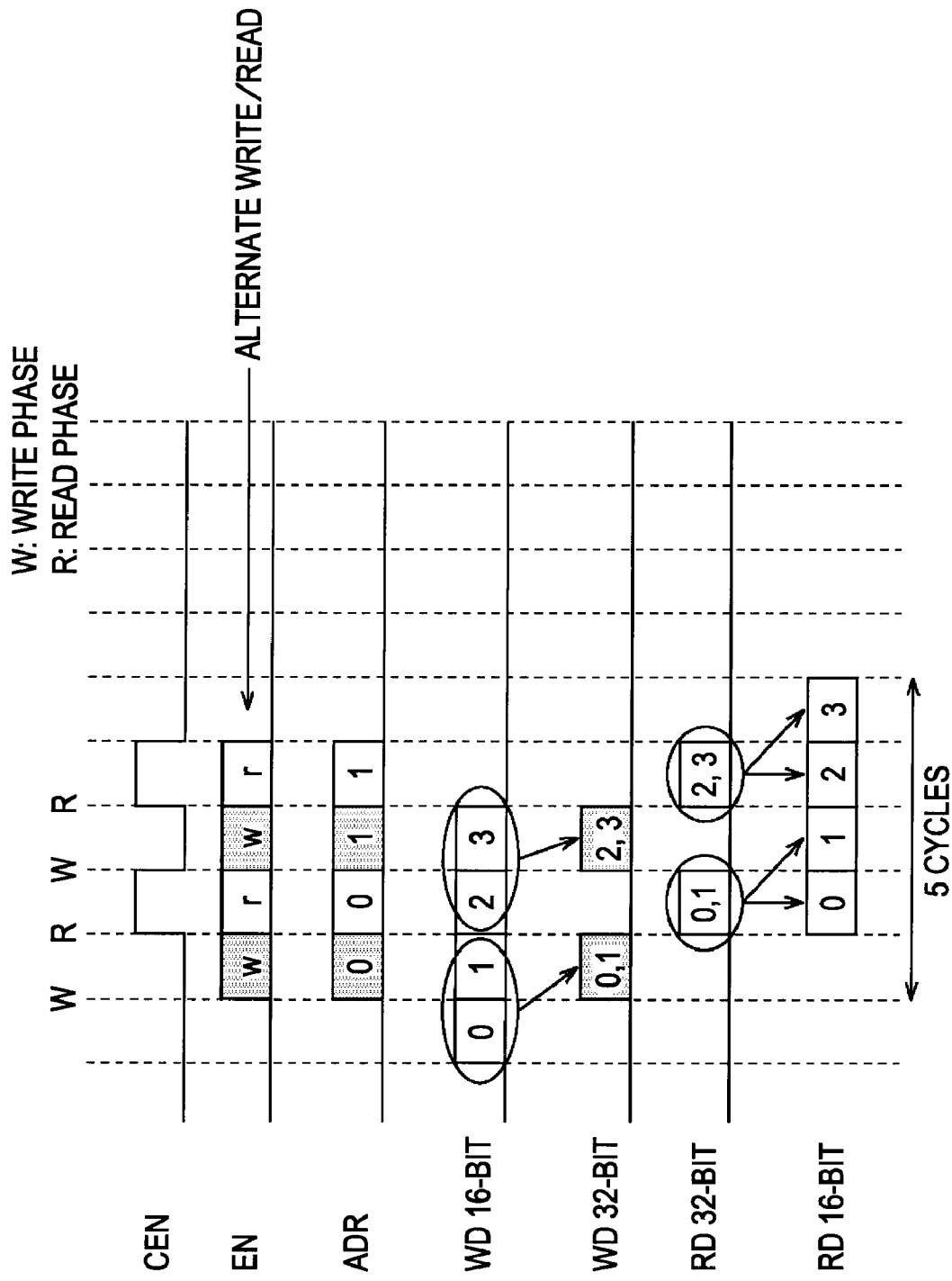

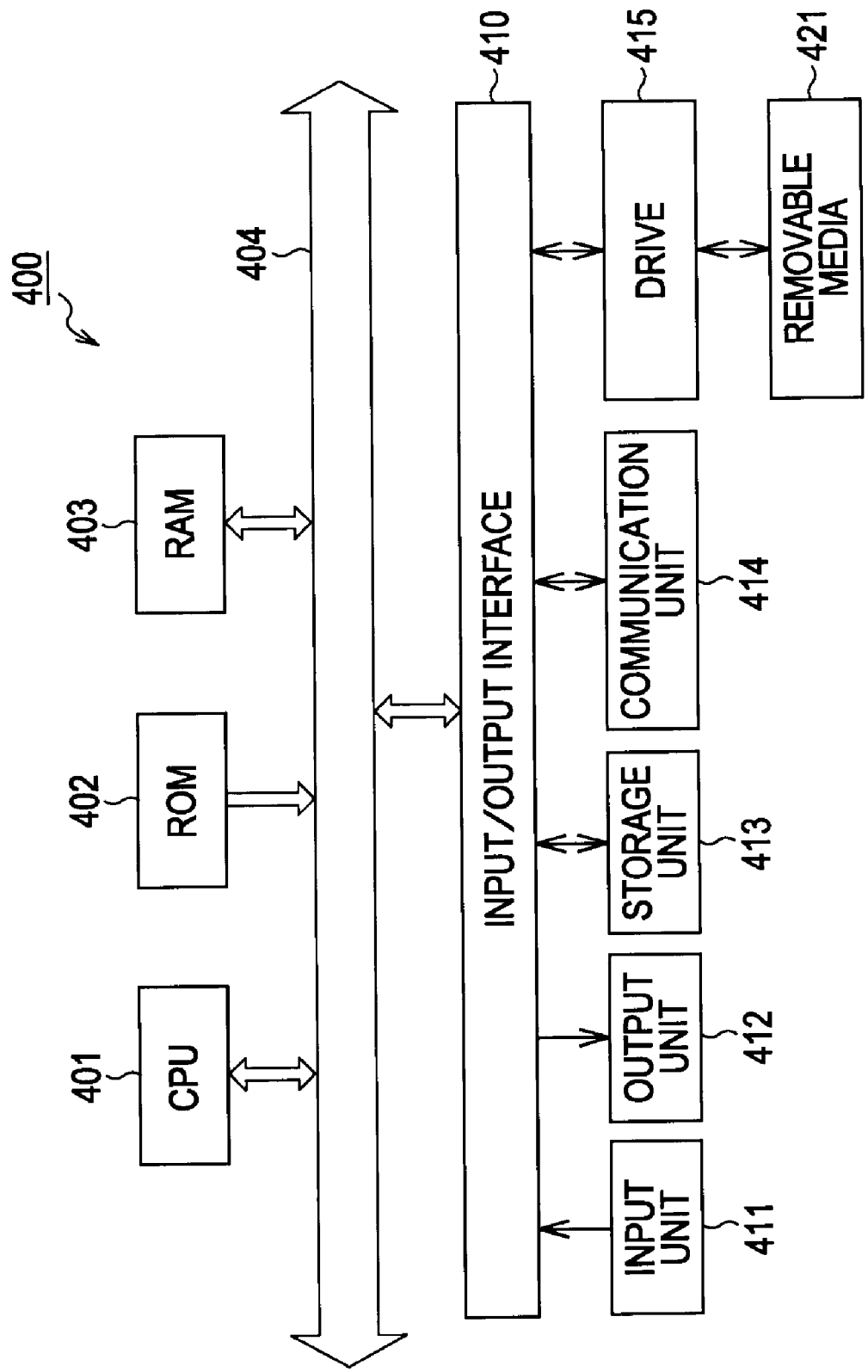

INFORMATION PROCESSING DEVICE AND METHOD

CROSS REFERENCES TO RELATED APPLICATIONS

The present invention contains subject matter related to Japanese Patent Application JP 2007-131287 filed in the Japanese Patent Office on May 17, 2007, the entire contents of which are incorporated herein by reference.

BACKGROUND OF THE INVENTION

1. Field of the Invention

The present invention relates to an information processing device and method, and particularly, an information processing device and method whereby the delay time of wavelet transformation processing can be reduced.

2. Description of the Related Art

An image compression method representative of known methods is the JPEG (Joint Photographic Experts Group) method that has been standardized by the ISO (International Standards Organization). This is known to provide excellent coded images and decoded images in the event that DCT (Discrete Cosine Transform) is used and a relatively great number of bits are appropriated.

In recent years, there has been much research performed on a method wherein images are divided into multiple bands (sub-bands) with filters called filter banks, wherein high-pass filters and low-pass filters are combined, and coding is performed for each band. Particularly, wavelet transformation coding is viewed as a new technology which is a likely candidate to replace DCT, since it does not have the problem that DCT has, i.e., marked block distortion at high compression rates.

International standardization of JPEG 2000 was completed January 2001. JPEG 2000 combines wavelet transformation and high-efficiency entropy coding (bit-plane based bit modeling and arithmetic encoding), and realizes marked improvements over JPEG with regard to coding efficiency.

Wavelet transformation processing (e.g., see Japanese Unexamined Patent Application Publication No. 10-283342) uses a technique wherein, basically, image data is taken as input which is subjected to horizontal direction filtering and vertical direction filtering, in which lowband components are hierarchically divided.

Wavelet inverse transformation processing for transforming the coefficient data (frequency components) transformed from image data by the wavelet transformation processing into the original image data performs processing for ultimately restoring an image while subjecting highband components and lowband components to synthesis filtering up to the lowermost division level from the uppermost division level.

With the related art, wavelet transformation processing has been used for compression/decompression of still image data in almost all cases, so wavelet transformation processing could be performed with the entire picture as a processing increment.

SUMMARY OF THE INVENTION

However, in the case of applying this wavelet transformation processing technology to compression/decompression of moving image data, performing wavelet inverse transformation processing in increments of pictures results in synthesis filter processing performed on all coefficients within the picture from the uppermost order to the lowermost order, for each division level, so there has been difficulty in outputting baseband image data one line at a time within the time of horizontal synchronization signals of video signals, that is to say, so-called real-time (instantaneous) output of image data has been difficult.

With the related art, if one desired to output baseband image data while maintaining the data format of video signals, one need to either perform one picture worth of synthesis filter processing within one horizontal synchronization signal period, or temporarily hold baseband image data generated by the synthesis filter processing in buffer memory.

In the case of the former, the synthesis filter processing must be performed at extremely high speeds, to an extent which might be considered unrealistic. In the case of the latter, not only may manufacturing costs increase due to increased memory capacity, but also the delay time from input of coefficients to output of image data may increase.

For example, with a teleconference system, video game system, or the like, it is desirable to perform transmission of image data with low delay, and such increase in delay time affects operations greatly, so there is demand for as much reduction in time delay as possible.

There has thus been realized the need to reduce delay time of wavelet inverse transformation processing by making the processing order of synthesis filter processing highly efficient.

An information processing device according to an embodiment of the present invention includes: a synthesis filter processing unit configured to subject image data to analysis filtering for dividing the frequency components of the image data into highband components and lowband components hierarchically, and subject the frequency components of the image data divided into a plurality of frequency components to synthesis filtering for mutually synthesizing the frequency components of the frequency band of the same division level recursively; a frequency component holding unit configured to hold frequency components of a division level one order lower, generated by the synthesis filtering performed by the synthesis filter processing unit; and a control unit configured to cause the synthesis filter processing unit to recursively perform the synthesis filtering processing on each frequency component held in the frequency component holding unit, in an order whereby the image data is restored in order from the top of the image, a plurality of lines at a time.

The control unit may cause the synthesis filter processing unit to recursively perform the synthesis filtering processing on each frequency component held in the frequency component holding unit, in an order whereby the image data is restored in order from the top of the image, two lines at a time.

The frequency component may hold the frequency components mutually independent for each division level of the frequency components.

The control unit may cause the synthesis filter processing unit to preferentially perform the synthesis filtering processing on the frequency components of lower level, of the frequency components held in the frequency component holding unit.

The synthesis filter processing unit may synthesize one line each of frequency components of mutually the same division level frequency band to generate a plurality of lines of frequency components of a division level one order lower, with the control unit causing the frequency component holding unit to hold the plurality of lines generated by the filter processing unit, one line at a time.

The synthesis filter processing unit may synthesize one line each of frequency components of mutually the same division level frequency band to generate two lines of frequency components of a division level one order lower; with the control unit causing the frequency component holding unit to hold the two lines generated by the filter processing unit, one line at a time.

The information processing device may further include an image data holding unit configured to holding the image data restored by the synthesis filter processing which is recursively performed, with the control unit causing the frequency component holding unit to hold, of the two lines generated by the synthesis filter processing unit, one line, and cause the frequency component holding unit to hold the other one line after the other one line has been temporarily held by the image data holding unit, such that one line is held at a time in the frequency component holding unit.

The control unit may externally output, of the two lines of image data restored, one line, and hold the other one line in the image data holding unit until the next output timing.

The control unit may hold the other one line of frequency components generated by the synthesis filter processing unit in the image data holding unit during a period in which the image data is not held, and further, at the timing of holding the other one line of the image data generated by the synthesis filter processing unit, the frequency component held at that time may be read out and moved to the frequency component holding unit.

An information processing method according to an embodiment of the present invention includes the steps of: synthesis filter processing, for subjecting image data to analysis filtering for dividing the frequency components of the image data into highband components and lowband components hierarchically, and subjecting the frequency components of the image data divided into a plurality of frequency components to synthesis filtering for mutually synthesizing the frequency components of the frequency band of the same division level recursively; frequency component holding, for holding frequency components of a division level one order lower, generated in the synthesis filtering; and recursively performing the synthesis filtering processing on each frequency component held, in an order whereby the image data is restored in order from the top of the image, a plurality of lines at a time.

According to embodiments of the present invention, wavelet inverse transformation processing can be performed, and more particularly, the delay time of wavelet inverse transformation processing can be reduced.

BRIEF DESCRIPTION OF THE DRAWINGS

FIG. 10 is a block diagram illustrating a detailed configuration example of the midway calculation buffer unit shown in FIG. 1;

FIGS. 12A and 12B are diagrams illustrating examples of the timing of data input/output with common 1-port SRAM and 2-port SRAM;

FIG. 13 is a diagram illustrating an example of the timing of data input/output with the 1-port SRAM shown in FIG. 10;

FIG. 29 is a diagram illustrating a configuration example of an embodiment a computer to which an embodiment of the present invention has been applied.

DESCRIPTION OF THE PREFERRED EMBODIMENTS

First, wavelet transformation processing will be described. Wavelet transformation processing is processing wherein an analysis filter is used to divide image data into bands with high spatial frequency and low spatial frequency. Analysis filters include a horizontal analysis filter which subjects image data to analysis filter processing in the horizontal direction of the image, and a vertical analysis filter which subjects image data to analysis filter processing in the vertical direction of the image, with image data being divided into four bands (sub-bands) by analysis filter processing being performed once in each direction. With wavelet transformation processing, the above horizontal direction and vertical direction analysis filter processing is recursively repeated in the lowest band of spatial frequencies in both the horizontal direction and vertical direction of the analysis filter processing results, which is to say, that the processing is repeated in a hierarchical manner.

Figure 1:
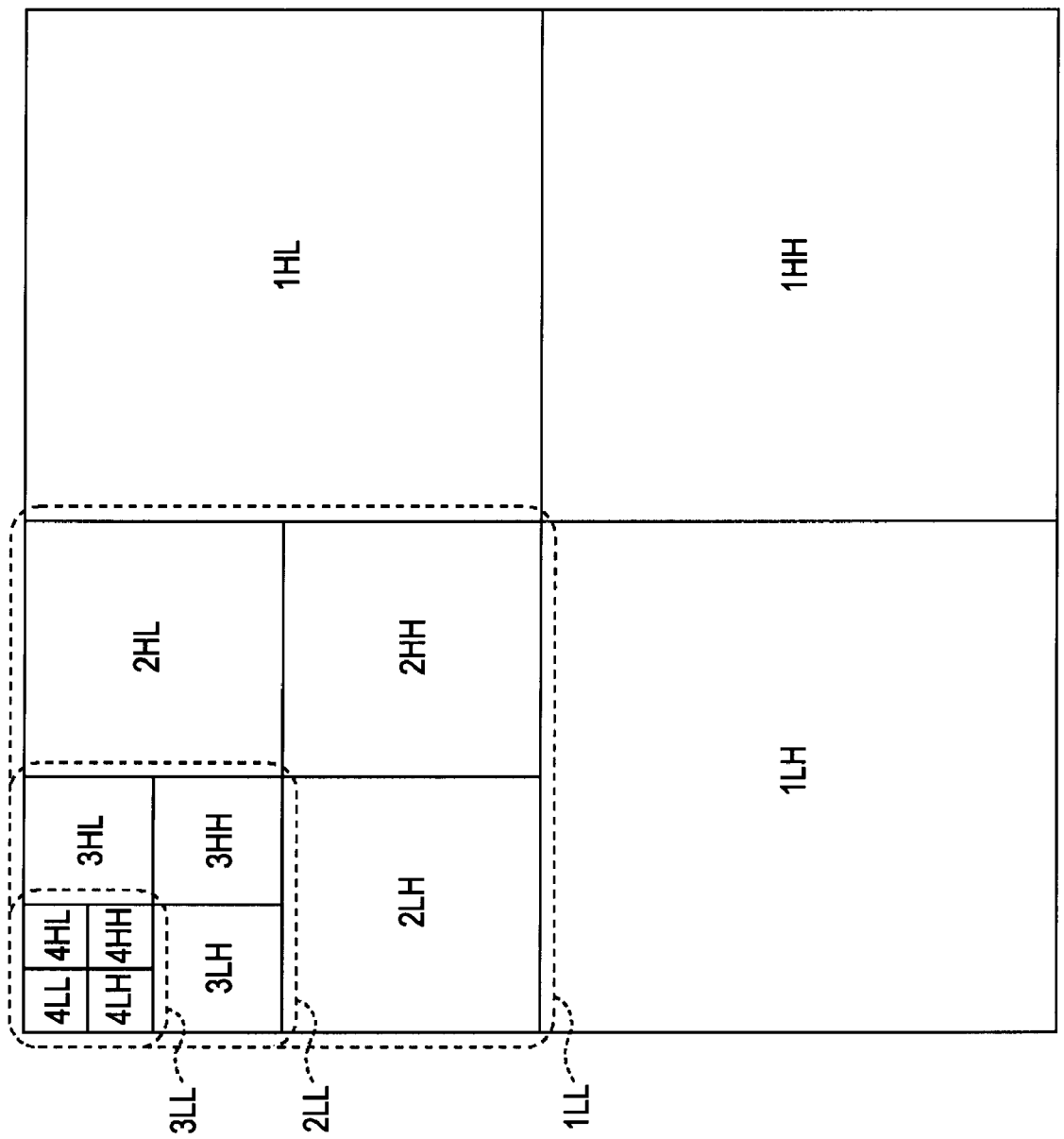
FIG. 1 is a schematic diagram for describing wavelet transformation.

FIG. 1 is a diagram schematically illustrating an example in a case wherein the analysis filtering is repeated four times. With the example shown in FIG. 1, the horizontal direction and vertical direction analysis filtering are repeated four times recursively, whereby the frequency components of the image data of one picture are divided into 13 hierarchical sub-bands.

In FIG. 1, each of solid-line squares and dotted-line squares with rounded corners represents a sub-band generated by the analysis filtering, and the numeral described in each sub-band indicates the hierarchical level of the sub-band thereof, i.e., indicates whether to obtain the sub-band thereof by how many times the image data of the baseband being subjected to the analysis filtering. Also, "L" and "H" described in each sub-band represent lowband components and highband components respectively, the left side indicates the horizontal direction analysis filtering result, and right side indicates the vertical direction analysis filtering.

With the example shown in FIG. 1, the baseband image data is subjected to first analysis filtering to generate four sub-bands (1LL, 1LH, 1HL, and 1HH) of the division level 1. Of these sub-bands, the sub-band "1LL" which is lowband components as to both the horizontal and vertical directions is subjected to second analysis filtering to generate four sub-bands (2LL, 2LH, 2HL, and 2HH) of the division level 2. The sub-band "2LL" which is lowband components as to both the horizontal and vertical directions is subjected to third analysis filtering to generate four sub-bands (3LL, 3LH, 3HL, and 3HH) of the division level 3. The sub-band "3LL" which is lowband components as to both the horizontal and vertical directions is subjected to fourth analysis filtering to generate four sub-bands (4LL, 4LH, 4HL, and 4HH) of the division level 4.

Thus, the reason why lowband components are subjected to repeat transform and repeat division is because the higher order the sub-band (of lowband components) is, the more image energy focuses on the lowband components. The analysis filtering is thus performed recursively to generate hierarchical sub-bands, and band data having a low spatial frequency is driven into a smaller region, thereby enabling effective compression encoding at the time of performing entropy encoding.

Note that in the following, of the four sub-bands generated by the analysis filter processing, the sub-band "LL" which is the lowband component in both the horizontal direction and vertical direction, where analysis filter processing is performed again, will be called "lowband sub-band", and the other sub-bands "LH", "HL", and "HH" where no further analysis processing is performed will be called "highband sub-band".

Such a method exists wherein the entire picture is subjected to the wavelet transformation processing collectively, and also a method exists wherein the image data of one picture is divided in increments of several lines to perform the wavelet transformation processing regarding each thereof mutually in an independent manner. With the latter method, the data amount of image data to be processed at one-time wavelet transformation processing is small as compared with the former method, so the output start timing of the processing results of the wavelet transformation processing can be performed earlier. In other words, the delay time caused by the wavelet transformation processing can be shortened.

Note that, in this case, the number of lines serving as the processing increment of the wavelet transformation processing is based on the number of lines necessary for obtaining one line worth of the highest order level sub-band coefficients at the predetermined division level, of the wavelet transformation processing.

Figure 2:
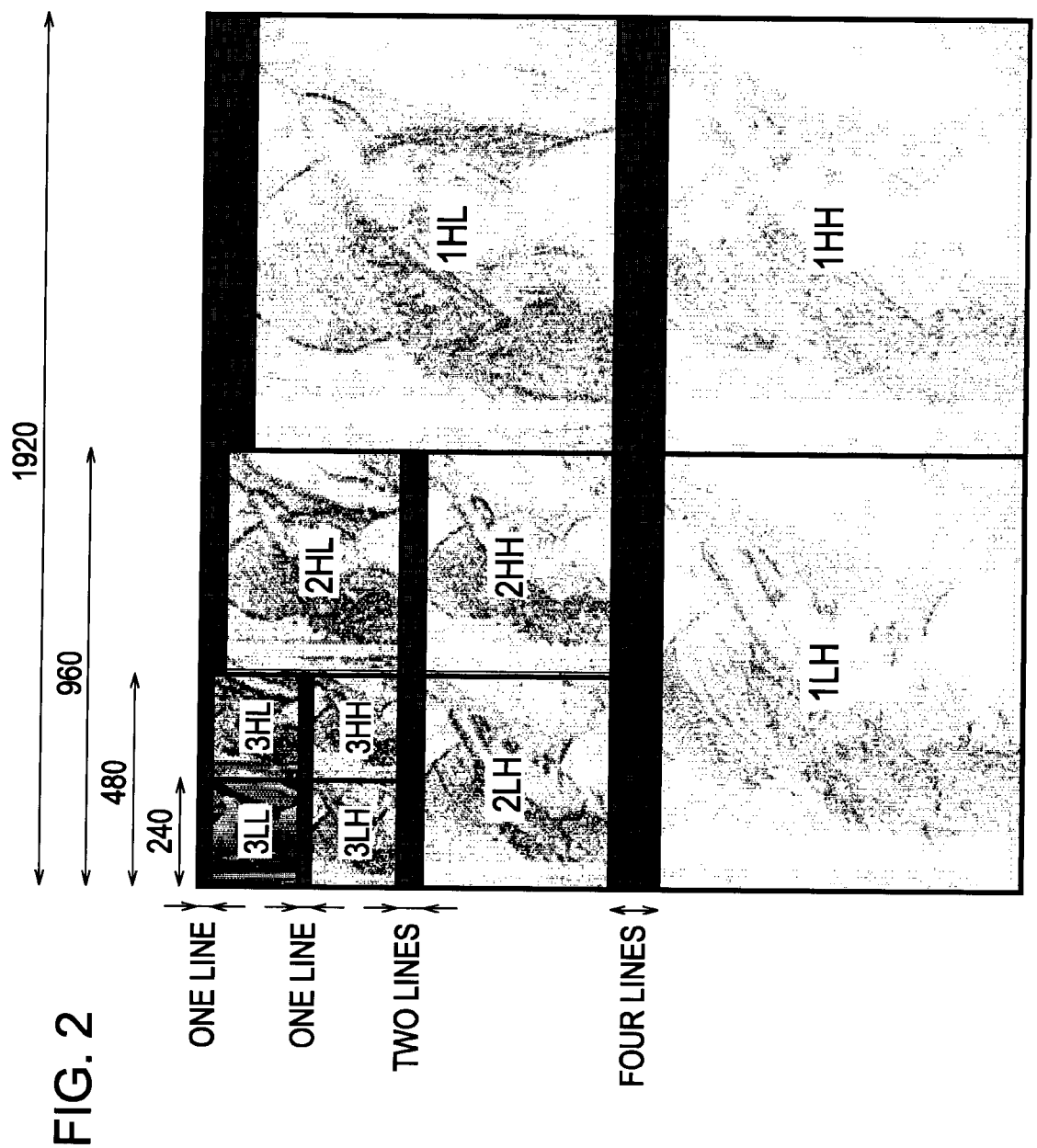
FIG. 2 is a schematic diagram for describing wavelet transformation.

Data is divided into four pieces by the analysis filtering, so the number of lines decreases by half, such as shown in FIG. 2. That is to say, like the example shown in FIG. 2, in the case of the wavelet transformation processing of the division level 3, in order to obtain one line worth of the highest order level sub-bands (3LL, 3LH, 3HL, and 3HH), eight lines worth of baseband image data is needed. Accordingly, in this case, the wavelet transformation processing is performed with eight lines or more of baseband image data as processing increment. In a case wherein the division level is four like the example shown in FIG. 1, 16 lines worth of baseband image data is needed.

Thus, a group of baseband pixel data necessary for generating one line worth of the highest order level lowband sub-band "LL" coefficient data will be referred to as a precinct (or line block). Note that a precinct sometimes indicates a group of the overall sub-bands coefficient data obtained by subjecting one precinct worth of pixel data to wavelet transformation, which is substantially the same as a group of baseband pixel data necessary for generating one line worth of the highest order level lowband sub-band "LL" coefficient data. Note that the number of lines of one precinct may not be the same mutually between precincts within a picture.

Examples of such wavelet transformation processing analysis filters include 5×3 filters and 9×7 filters used with JPEG 2000, for example. The most common computation method in analysis filtering computation methods using such filters is a method called convolution computation. This convolution computation is the most basic way to realize digital filters, with convolution multiplication being performed on actual input data on filter tap coefficients. However, with convolution computation, if the tap length is great, there cases wherein the calculation load increases accordingly.

Wavelet transformation lifting, introduced in the paper "W. Swelden, 'The lifting scheme: A custom-design construction of biorthogonal wavelets', Appl. Comput. Harmon. Anal., Vol 3, No. 2, pp. 186-200, 1996", is a known technique for handling this.

Figure 3:
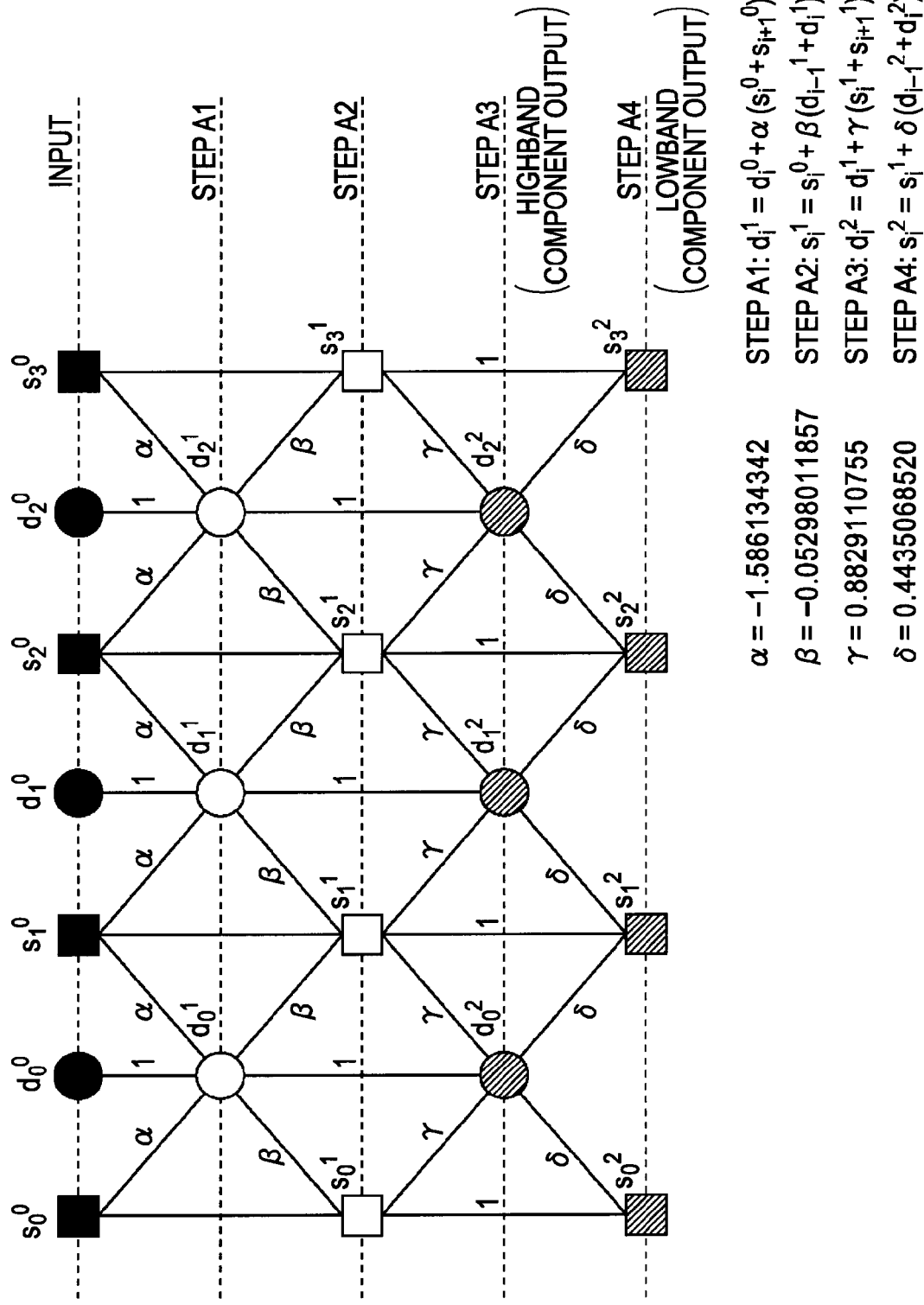
FIG. 3 is a diagram for describing an example of a lifting scheme with a 9×7 analysis filter.

FIG. 3 illustrates a lifting scheme of a 9×7 filter. In the example shown in FIG. 3, the first tier (highest tier) illustrates a sample group of an input image (pixel row), and the second and third tiers indicate components (coefficients) generated at a step A1 and step A2, respectively. Also, the fourth tier indicates highband component output generated at the processing in step A3, and the fifth tier indicates lowband component output generated at the processing in step A4. The top tier is not restricted to a sample group of an input image, and may be coefficients obtained from previous analysis filtering. Note that here, top tier is a sample group of an input image, with the solid squares representing even samples or lines, and the solid circles representing odd samples or lines.

That is to say, in this case, highband components are obtained by the processing in step A3, and lowband components are obtained by the processing in step A4. The processing of step A1 through step A4 can be represented by the following Expressions (1) through (4).

$$\text{Step } A1: d_i^1 = d_i^0 + \alpha(s_i^0 + s_{i+1}^0) \tag{1}$$

$$\text{Step } A2: s_i^1 = s_i^0 + \beta(d_{i-1}^1 + d_i^1) \tag{2}$$

Step A3: $d_i^2 = d_i^1 + \gamma(s_i^1 + s_{i+1}^1)$ (3)

Step A4: $s_i^s = s_i^1 + \delta(d_{i-1}^2 + s_i^2)$ (4)

wherein $\alpha = -1.586134342$, $\beta = -0.05298011857$, $\gamma = 0.8829110755$, and $\delta = 0.4435068520$ Thus, with the analysis filtering applying the lifting technique, the processing of step A1 and step A2 is performed, highband component coefficients are generated at step A3, following which lowband component coefficients are generated at step A4. The filter bank used at this time can be realized with addition and shift computations alone, as can be seen from Expressions (1) through (4). Accordingly, the amount of calculations can be markedly reduced.

The coefficient data obtained by being subjected to such wavelet transformation processing is subjected to, for example, entropy encoding, and converted into encoded data. This encoded data is subjected to entropy decoding at the time of using this data, whereby the original baseband image data is restored by wavelet inverse transformation processing corresponding to the above-mentioned wavelet transformation processing.

Figure 4:
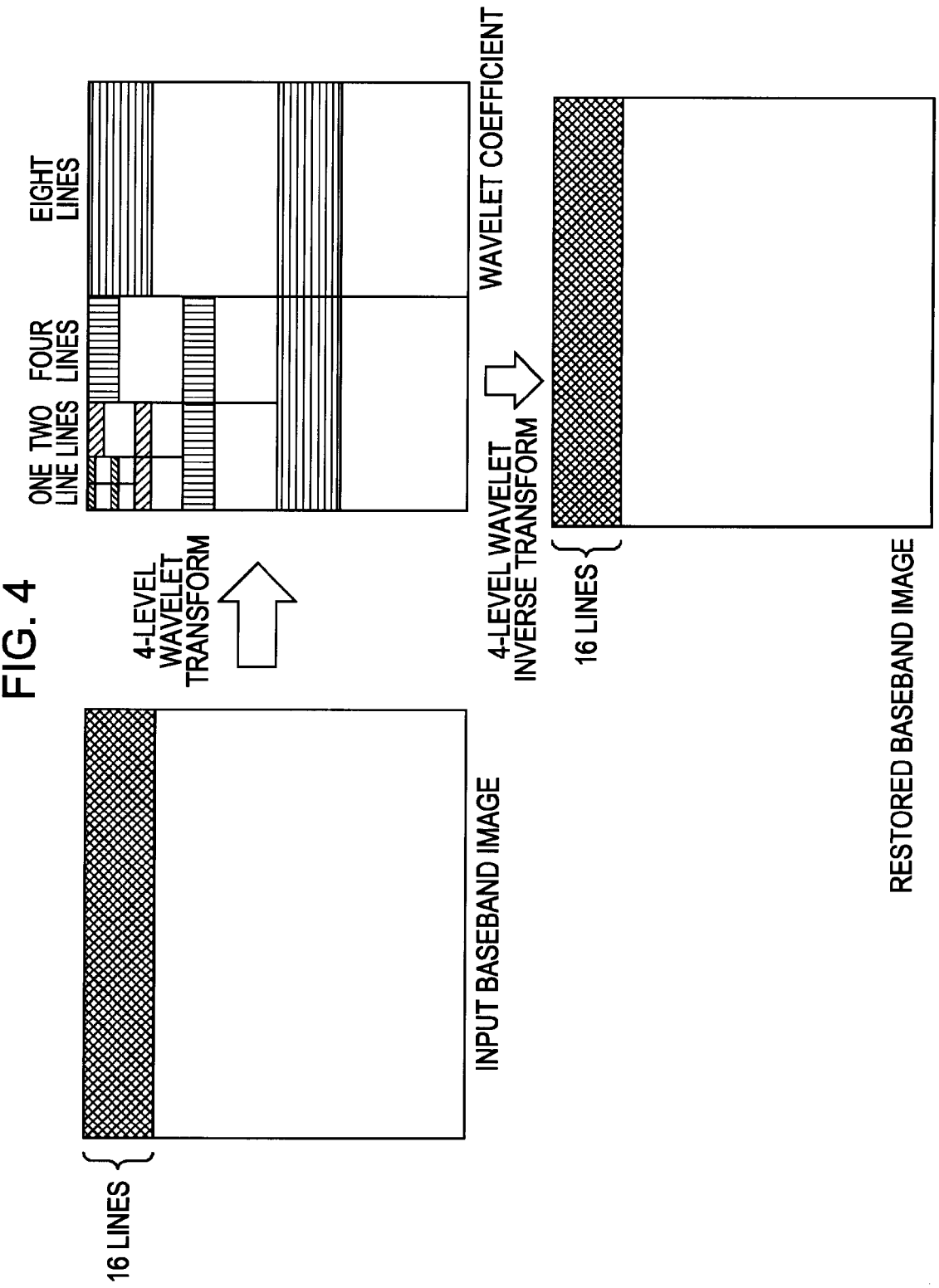
FIG. 4 is a schematic diagram for describing wavelet transformation and wavelet inverse transformation.

That is to say, as shown in FIG. 4, the wavelet inverse transformation processing is the inverse transformation processing of the wavelet transformation processing, wherein wavelet coefficients obtained by baseband image data being transformed by the wavelet transformation processing are transformed (inverse-transformed) into the original baseband image data. Accordingly, as shown in FIG. 4, in a case wherein the wavelet transformation processing of the division level 4 is performed, the wavelet inverse transformation processing is also performed at the division level 4. Also, as shown in FIG. 4, for example, in a case wherein 16 lines worth of input baseband image data is taken as one precinct, and the wavelet transformation processing is performed for each precinct thereof, the wavelet inverse transformation processing is also performed for each precinct thereof, and 16 lines worth of the baseband image data is restored from one precinct worth of coefficient data.

Description will be made below regarding a method for reducing the amount of buffer memory necessary with this wavelet inverse transformation processing.

Figure 5:
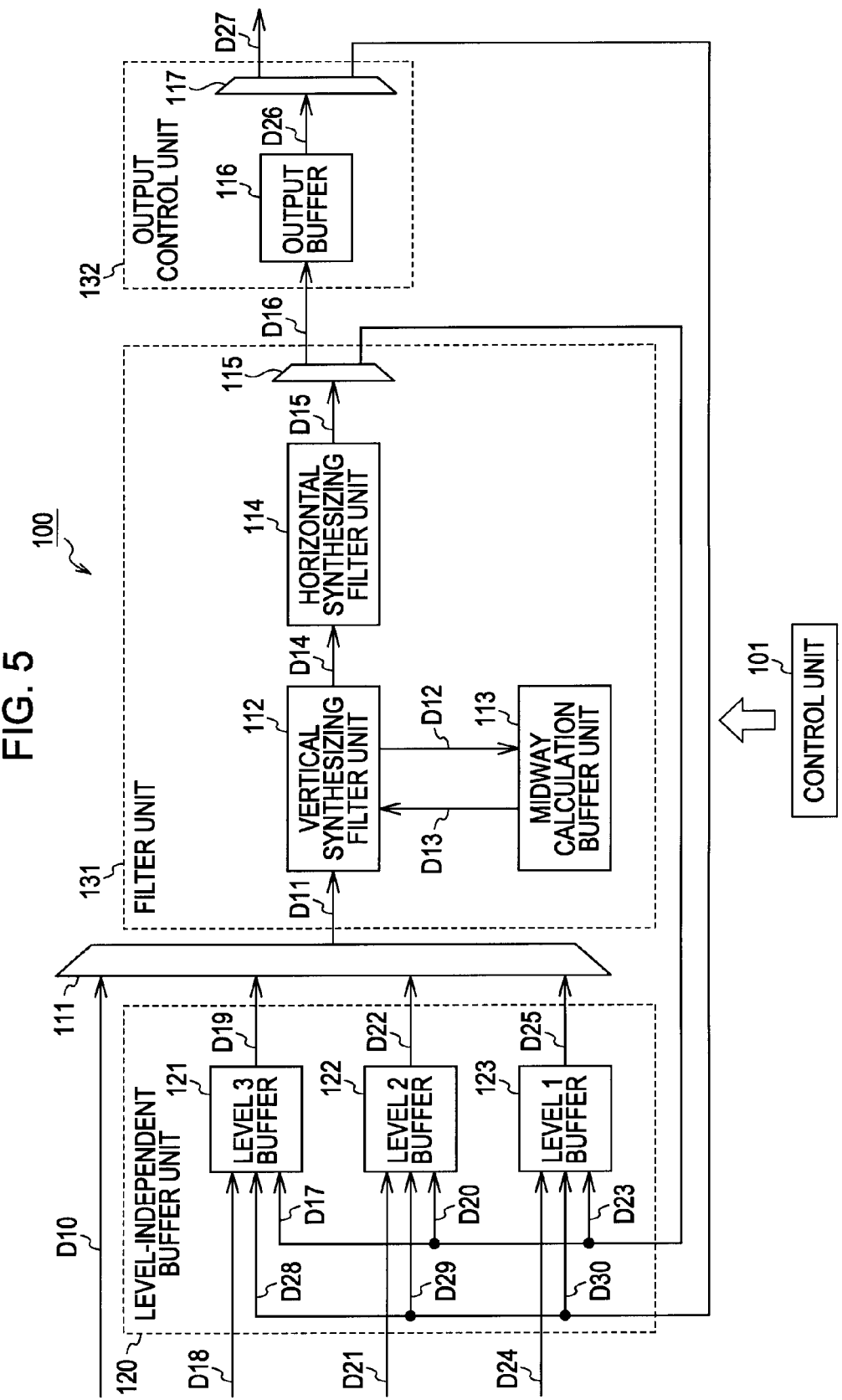
FIG. 5 is a block diagram illustrating a configuration example of a wavelet inverse transformation device to which an embodiment of the present invention has been applied.

FIG. 5 is a block diagram illustrating a configuration example of a wavelet inverse transformation device to which an embodiment of the present invention is applied. As shown in FIG. 5, the wavelet inverse transformation device 100 is a band synthesizing device for inputting the coefficient data subjected to wavelet transformation at the division level 4, and performing synthesis filtering for synthesizing that data. The wavelet inverse transformation device 100 shown in FIG. 5 includes a control unit 101, selector 111, vertical synthesizing filter unit 112, midway calculation buffer unit 113, horizontal synthesizing filter unit 114, selector 115, output buffer unit 116, selector 117, and level-independent buffer unit 120.

The control unit 101 controls the operation of each unit of the selector 111 through level-independent buffer unit 120. The selector 111 is controlled by the control unit 101 to select one of external input (D10) or the output of the buffer for each division level within the level-independent buffer units 120 (D19, D322, and D325). The vertical synthesizing filter unit 112 is controlled by the control unit 101 to obtain the coefficient data of the four sub-bands of the division level to be processed from the buffer selected by the selector 111 or external input one line at a time substantially (D11).

The vertical synthesizing filter unit 112 is controlled by the control unit 101 to subject the obtained coefficient data to synthesis filtering regarding the frequency components in the image vertical direction of the baseband image data using the midway calculation coefficients read out from the midway calculation buffer unit 113.

The vertical synthesizing filter unit 112 writes the coefficients generated by synthesis filter calculation performed as synthesis filtering in the midway calculation buffer unit 113 (D12), and simultaneously, performs the synthesis filtering by repeating the synthesis filter calculation while reading out the coefficients necessary for the next synthesis filter calculation from the midway calculation buffer unit 113 (D13), which will be described later. According to this vertical direction synthesis filtering, the lowband components and highband components in the vertical direction are synthesized, and the lowband components and highband components in the horizontal direction are generated two lines at a time.

When the synthesis filtering as to input coefficient data is completed, the vertical synthesizing unit 112 reads out the lowband components and highband components in the horizontal direction held at the midway calculation buffer unit 113 one at a time alternately in predetermined order, e.g., in order toward the right from the left of the screen for each line to supply this to the horizontal synthesizing filter unit 114 (D14).

The horizontal synthesizing unit 114 is controlled by the control unit 101 to subject the coefficient data supplied from the vertical synthesizing filter unit 112 to synthesis filtering regarding the frequency components in the image horizontal direction of baseband image data.

According to this horizontal direction synthesis filtering, two lines worth of the lowband sub-band coefficient data (or baseband image data) which is lowband component sub-band are generated in the vertical and horizontal directions of one lower level. The horizontal synthesizing filter unit 114 outputs the two lines worth of the lowband sub-band coefficient data (or baseband image data) to the selector 115 (D15).

As described above, the vertical synthesizing filter unit 112 and horizontal synthesizing filter unit 114 substantially synthesize one line worth of the coefficient data mutually at the same position, of each sub-band of the division level to be processed by the one-time vertical direction and horizontal direction synthesis filtering to generate two lines worth of lowband sub-band coefficient data of one lower level or baseband image data.

Figure 6:
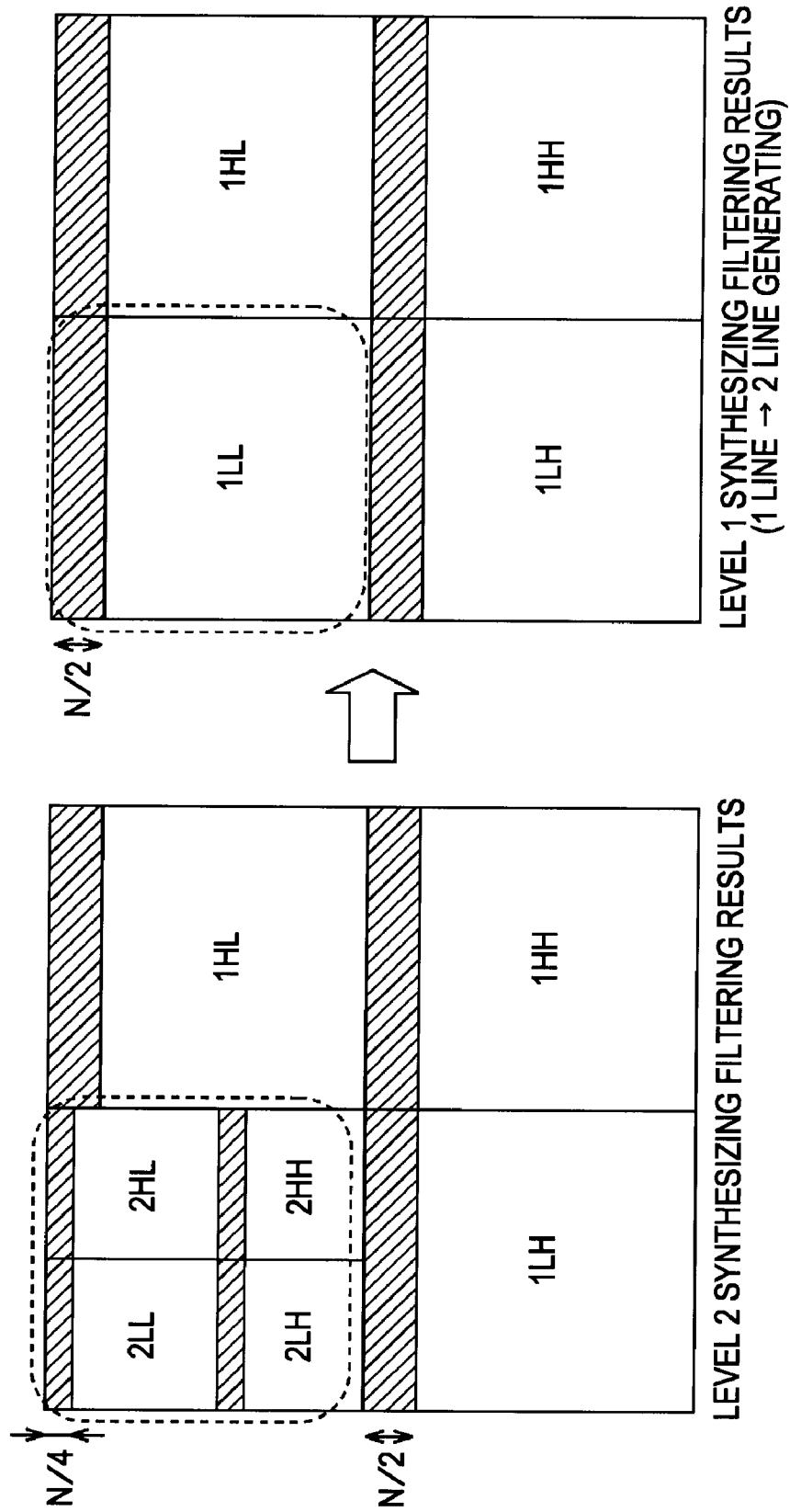
FIG. 6 is a schematic diagram for describing synthesizing filtering.

That is to say, as shown in FIG. 6, when assuming that one precinct is made up of N lines worth of image data, the vertical synthesizing filter unit 112 and horizontal synthesizing filter unit 114 substantially synthesize, for example, N/4 lines worth of the four sub-bands coefficient data of the division level 2 to generate N/2 lines worth of the lowband sub-band coefficient data of the division level 1.

The vertical synthesizing filter unit 112 and horizontal synthesizing filter unit 114 repeat such synthesis filtering while changing the division level to be processed as appropriate, thereby transforming all of the coefficient data subjected to wavelet transformation in increments of precinct into baseband image data. Subsequently, the vertical synthesizing filter unit 112 and horizontal synthesizing filter unit 114 repeat the synthesis processing regarding all precincts and all pictures in the same way. The amount of data to be processed at once is reduced by thus performing the synthesis filtering in increments of precinct as compared with a case wherein the entire image is subjected to synthesis filtering, whereby the wavelet inverse transformation device 100 can reduce the delay time due to wavelet inverse transformation. Also, as described above, performing the synthesis filtering in increments of line enables control to be performed in more detail, whereby the wavelet inverse transformation device 100 can further optimize the wavelet inverse transformation processing, and further reduce the delay time.

Now, returning to FIG. 5, where the selector 115 is controlled by the control unit 101 to select the data output destination of the horizontal synthesizing filter unit 114, of the coefficient data generated by the synthesis filtering, supply a part of the coefficient data to the level-independent buffer units 120 to hold this, and supply another part of the coefficient data to the output buffer unit 116 to hold this. For example, the selector 115 supplies, of the two lines worth of the lowband sub-band coefficient data supplied from the horizontal synthesizing filter unit 114, one line of the lines to the output buffer unit 116 to hold this (D16), and supplies the other one line to the level-independent buffer units 120 to hold this at the buffer for the division level of the coefficient data thereof, of the level-independent buffer units 120 (D17, D320, and D323).

Note that, in a case wherein the data supplied from the horizontal synthesizing filter unit 114 is baseband image data, the selector 115 supplies two lines worth of the image data thereof to the output buffer unit 116 (D16) to hold one line of the lines, and output the other one line externally.

The output buffer unit 116 is controlled by the control unit 101 to hold the coefficient data or image data supplied from the selector 115 as necessary, read out the held data as necessary, and output this to the selector 117. For example, in a case wherein one line worth of the sub-band coefficient data is supplied from the selector 115, the output buffer unit 116 holds the coefficient data thereof. Also, for example, two lines worth of baseband image data ultimately generated by the synthesis filtering are supplied from the selector 115, the output buffer unit 116 outputs one line thereof externally (D26), and also holds the other one line until the next output timing. When holding this baseband image data, the output buffer unit 116 writes the baseband image data in the internal memory, while reading out the coefficient data held in the internal memory to output this to the selector 117 (D26).

The selector 117 is controlled by the control unit 101 to control the data output destination of the output buffer unit 116. For example, in a case wherein coefficient data is supplied from the output buffer unit 116, the selector 117 supplies the coefficient data thereof to the level-independent buffer units 120 (D28, D329, and D330) to hold this at the buffer for the division level of the coefficient data thereof, of the level-independent buffer units 120. Also, for example, in a case wherein baseband image data is supplied from the output buffer unit 116, the selector 117 outputs the baseband image data thereof externally (D27).

The level-independent buffer unit 120 is controlled by the control unit 101 to hold the coefficient data supplied from the selector 115 or selector 117, and the coefficient data supplied externally, which can be subjected to the synthesis filtering again, at the buffer for division level of the coefficient data until the synthesis filtering is performed. The level-independent buffer unit 120 supplies the held coefficient data to the selector 111.

The level-independent buffer unit 120 includes a level 1 buffer 121, level 2 buffer 122, and level 1 buffer 123.

The level 1 buffer 121 is controlled by the control unit 101 to control supply of the coefficient data of the division level 1 to the selector 111 (the vertical synthesizing filter unit 112 via the selector 111). For example, the level 1 buffer 121 holds the division level 1 lowband sub-band coefficient data (3LL) supplied from the selector 115 or selector 117 (D17 and D328), or the division level 1 highband sub-bands coefficient data (3LH, 1HL, and 1HH) supplied externally (D18) at the internal memory. Subsequently, the level 1 buffer 121 multiplexes the coefficient data of each sub-band of the division level 1 held at the internal memory at predetermined timing, and supplies this to the vertical synthesizing filter unit 112 via the selector 111 (D19).

The level 2 buffer 122 is controlled by the control unit 101 to control supply of the coefficient data of the division level 2 to the selector 111 (the vertical synthesizing filter unit 112 via the selector 111). For example, the level 2 buffer 122 holds the division level 2 lowband sub-band coefficient data (2LL) supplied from the selector 115 or selector 117 (D17 and D328), or the division level 2 highband sub-bands coefficient data (2LH, 2HL, and 2HH) supplied externally (D21) at the internal memory. Subsequently, the level 2 buffer 122 multiplexes the coefficient data of each sub-band of the division level 2 held at the internal memory at predetermined timing, and supplies this to the vertical synthesizing filter unit 112 via the selector 111 (D22).

The level 1 buffer 123 is controlled by the control unit 101 to control supply of the coefficient data of the division level 1 to the selector 111 (the vertical synthesizing filter unit 112 via the selector 111). For example, the level 1 buffer 123 holds the division level 1 lowband sub-band coefficient data (1LL) supplied from the selector 115 or selector 117 (D23 and D330), or the division level 1 highband sub-bands coefficient data (1LH, 1HL, and 1HH) supplied externally (D24) at the internal memory.

Subsequently, the level 1 buffer 123 multiplexes the coefficient data of each sub-band of the division level 1 held at the internal memory at predetermined timing, and supplies this to the vertical synthesizing filter unit 112 via the selector 111 (D25).

Note that the configuration of the level-independent buffer units 120 shown in FIG. 5 is an example in a case wherein with the wavelet inverse transformation device 100, division level 4 wavelet inverse transformation processing is performed. The configuration of the level-independent buffer units 120 is set according to the division level of the wavelet inverse transformation processing performed by the wavelet inverse transformation device 100 so as to hold the coefficient data of the division levels other than the highest order level mutually independently. That is to say, the level-independent buffer units 120 include dedicated buffers such as the level 1 buffer 121 through level 1 buffer 123 regarding each division level other than the highest order level.

Also, in FIG. 5, the vertical synthesizing filter unit 112, midway calculation buffer unit 113, horizontal synthesizing filter unit 114, and selector 115 are processing units relating to synthesis filter processing, and these are also collectively called a filter unit 131. Also, the output buffer unit 116 and selector 117 are processing units basically relating to image data output, and these are also collectively called an output control unit 132.

Next, description will be made regarding a calculation method of the synthesis filtering executed by the vertical synthesizing filter unit 112 and horizontal synthesizing unit 114. In the same way as with the case of the synthesis filtering described above with reference to FIG. 3, filtering can be executed effectively, so it is desirable to employ the lifting technique in the same way with the wavelet inverse transformation synthesis filtering as well.

Figure 7:
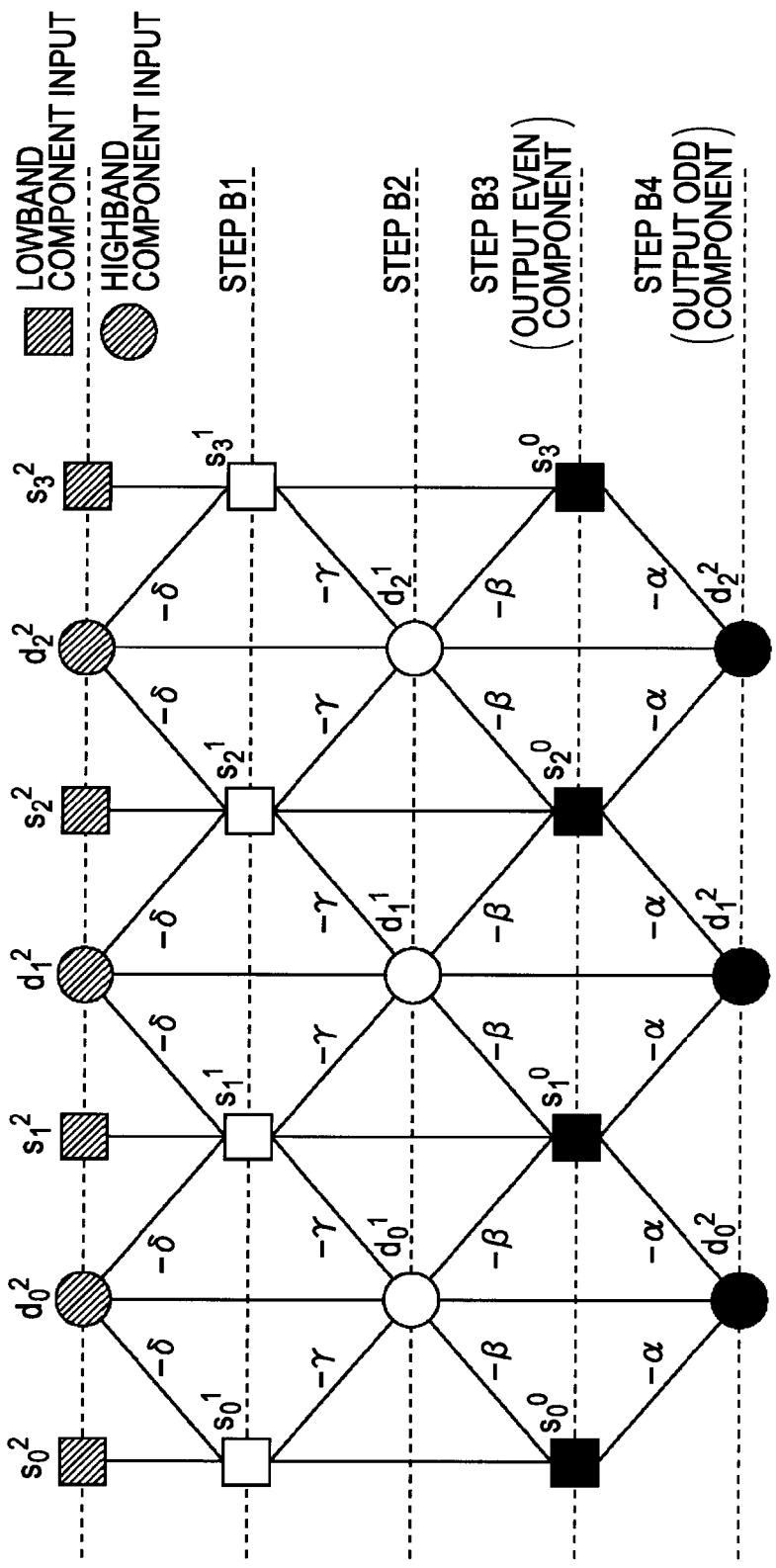
FIG. 7 is a diagram of r describing an example of a lifting scheme with a 9×7 analysis filter.

FIG. 7 illustrates a lifting scheme of a 9×7 synthesis filter used with the JPEG 2000 standard as well. Unlike common convolution computation, with a method according to the lifting technique, even-numbered components and odd-numbered components are calculated through the following four steps of steps B1 through B4.

With the example shown in FIG. 7, the first tier (highest tier) indicates coefficients generated by wavelet transformation, wherein solid circles represent highband component coefficients, and solid squares represent lowband component coefficients. The second and third tiers indicate components (coefficients) generated by the processing in steps B1 and processing in step B2, respectively. Also, the fourth tier indicates even-numbered component output generated by the processing in step B3, and the fifth tier indicates odd-numbered component output generated by the processing in step B4.

With the 9×7 synthesis filtering, even-numbered components are obtained by the processing in step B3, and odd-numbered components are obtained by the processing in step B4. The processing of step B1 through step B4 can be represented by the following Expressions (5) through (8).

$$\text{Step } B1: s_i^1 = s_i^2 - \delta(d_{i-1}^2 + d_i^2) \tag{5}$$

$$\text{Step } B2: d_i^1 = d_i^2 - \gamma(s_i^1 + s_{i+1}^1) \tag{6}$$

$$\text{Step } B3: s_i^0 = s_i^1 - \beta(d_{i-1}^1 + d_i^1) \tag{7}$$

$$\text{Step } B4: d_i^0 = d_i^1 - \alpha(s_i^0 + s_{i+1}^0) \tag{8}$$

wherein $\alpha = -1.586134342$, $\beta = -0.05298011857$, $\gamma = 0.8829110755$, and $\delta = 0.4435068520$ Thus, with the synthesis filtering applying the lifting technique, the processing of step B1 and step B2 is performed, even-numbered component coefficients are generated at step B3, following which odd-numbered component coefficients are generated at step B4. The filter bank used at this time can be realized with subtraction and shift computations alone, as can be seen from Expressions (5) through (8). Accordingly, the amount of calculations can be markedly reduced.

Figure 8:
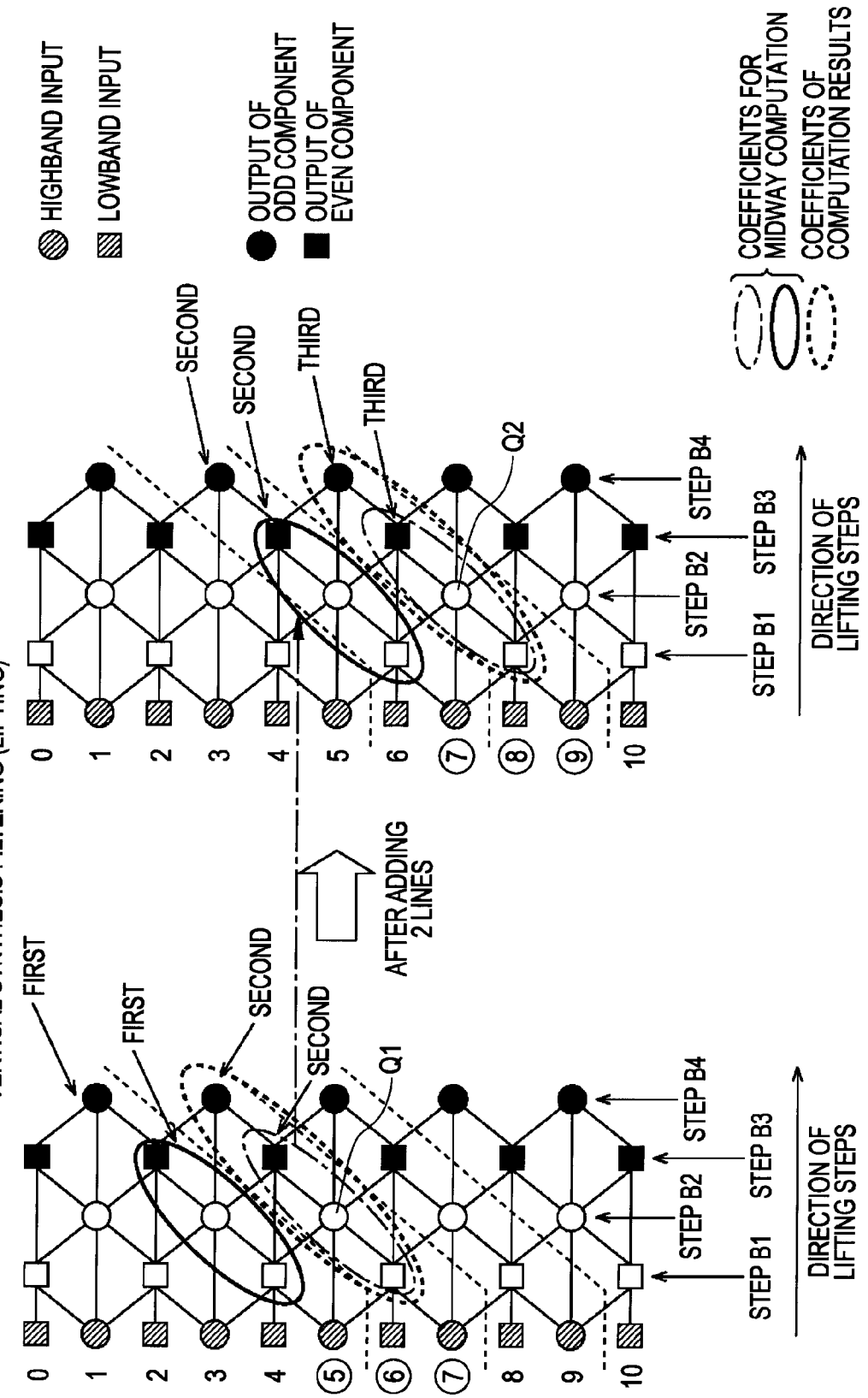
FIG. 8 is a diagram for describing an example of vertical analysis filtering.

The vertical synthesis filtering performed by the vertical synthesizing filter unit 112 will be described in detail. FIG. 8 illustrates an example of performing vertical synthesis filtering as to a coefficients group in the vertical direction, with the lifting scheme shown in FIG. 7.

The example shown in FIG. 8 shows an example of a case wherein even-numbered coefficient data (hereafter, also referred to as even-numbered coefficients) and odd-numbered coefficient data (hereafter, also referred to as odd-numbered coefficients) are generated through the processing of four steps (step B1 through step B4) described above with reference to FIG. 7 as to the vertical direction coefficient data, and the direction of lifting steps proceeds from the left to the right in the drawing.

Also, the numeral indicated at the left side of the vertical direction coefficient data represents a line number, the hatched circles and squares at the first column from the left represent highband input which is input of highband components in the screen vertical direction, and lowband input which is input of lowband components in the screen vertical direction, respectively. Further, the circles and squares at the subsequent tiers represent the highband coefficients and lowband coefficients generated in the process of lifting computation respectively, and particularly, the solid circles and solid squares represent the odd-numbered coefficients which are coefficient data of which the line numbers are odd lines, and the even-numbered coefficients which are coefficient data of which the line numbers are even lines, which are the results of lifting computation, respectively.

The following is a description of operations in order from the left. The left side in FIG. 8 illustrates an example wherein three lines of coefficients, line Nos. 4 through 6 in the vertical direction, are input, and computation with a lifting scheme in the vertical direction (i.e., horizontal lifting computation) is performed. Note that, in this case, the even-numbered coefficients at the highest tier are not coupled with odd-numbered coefficients, so description thereof will be omitted.

In order to obtain the first even-numbered coefficient in step B3 of the vertical lifting computation and obtain the first odd-numbered coefficient in step B4, there is the need to input the coefficients of the six lines of Nos. 0 through 5.

Subsequently, in order to obtain the second even-numbered coefficients and odd-numbered coefficients, there is the need for the three coefficients indicated by the heavy solid lines and the coefficients of the two lines of Nos. 6 and 7 indicated by circled numbers, and further, in order to calculate the coefficient indicated by Q1 at step B2, the coefficient of the line No. 5 indicated by a circled number is also necessary.

The three coefficients indicated by the heavy solid lines are a part of the coefficients generated in the process of the vertical lifting computation for obtaining the first even-numbered coefficient and odd-numbered coefficient (hereafter also referred to as "first vertical lifting computation").

Accordingly, in order to obtain the second even-numbered coefficient and odd-numbered coefficient, there is ultimately the need to input the coefficients of the three lines of Nos. 5 through 7. Note however, that the coefficient of the line No. 5 is a coefficient to be input again, so substantially, this input becomes additional input of the coefficients of the two lines (line Nos. 6 and 7). The coefficient data of three lines in the vertical direction (substantially, coefficient data of two lines) is read out from the buffer of the level corresponding to the level-independent buffer units 120 shown in FIG. 5 for each level. That is to say, when the current wavelet transformation division level is 2, the coefficient data is read out from the level 2 buffer 122.

Further, in order to obtain the second even-numbered coefficient and odd-numbered coefficient, there is the need to input the three coefficients indicated by the heavy solid line generated in the process of the vertical lifting computation for obtaining the first even-numbered coefficient and odd-numbered coefficient. These coefficients are held at the midway calculation buffer unit 113 after the second even-numbered coefficient and odd-numbered coefficient are obtained, so are read out from the midway calculation buffer unit 113 thereof.

That is to say, the three coefficients indicated by the heavy solid line stored in the midway calculation buffer unit 113 at the first vertical lifting computation, and the coefficients of the three lines of Nos. 5 through 7 which are read out and input from the corresponding level buffer are employed to perform vertical lifting computation, thereby obtaining four coefficients (indicated by the heavy dotted line) including the second even-numbered coefficient and odd-numbered coefficient. These coefficients are stored in the midway calculation buffer unit 113, in the same way as with the case of the first vertical lifting computation. At this time, simultaneously with writing of these coefficients, the coefficients employed for the next vertical lifting computation are read out from the midway calculation buffer unit 113. In the case of the example at the left side of FIG. 8, of the coefficients stored in the midway calculation buffer unit 113, the three coefficients indicated by the single-dot broken line are coefficients necessary for obtaining the third even-numbered coefficient and odd-numbered coefficient, and accordingly are read out from the midway calculation buffer unit 113.

An example of a case wherein, following reading out of the coefficient of line No. 7, the coefficients of the two lines are to be additionally read out, i.e., the coefficients of the three lines of Nos. 7 through 9 in the vertical direction are input and vertical lifting computation is performed, is shown at the right side of FIG. 8.

In the same way as with the second case, in order to obtain the third even-numbered coefficient and odd-numbered coefficient, there is the need for the three coefficients indicated by the heavy solid lines and the coefficients of the two lines of Nos. 8 and 9 indicated by circled numbers, and further, in order to calculate the coefficient indicated by Q2 at step B2, the coefficient of the line No. 7 indicated by a circled number is also necessary.

Note that the three coefficients indicated by the heavy solid line at the right side have been stored in the midway calculation buffer unit 113 in the second horizontal lifting computation, as indicated by the single-dot broken line at the left side of the diagram.

Accordingly, four coefficients (indicated by the heavy dotted line) including the third even-numbered coefficient and odd-numbered coefficient are obtained by performing vertical lifting computation using the three coefficients indicated by the heavy solid line that have been stored at the second vertical lifting computation, and the coefficients of the three lines of Nos. 7 through 9 that have been read out and input from the corresponding level buffer. These coefficients are stored in the midway calculation buffer unit 113. At this time, simultaneously with writing of these coefficients, the coefficients necessary for the next vertical lifting computation are read out from the midway calculation buffer unit 113. In the case of the right side of FIG. 8, of the coefficients stored in the midway calculation buffer unit 113, the three coefficients indicated by the single-dot broken line are coefficients necessary for obtaining the fourth even-numbered coefficient and odd-numbered coefficient, and accordingly are read out from the midway calculation buffer unit 113.

Thus, the vertical lifting computation is performed to the far lowest line of the screen using the input coefficient data and the coefficients held at the midway calculation buffer unit 113, thereby completing vertical direction synthesis filtering.

Figure 9:
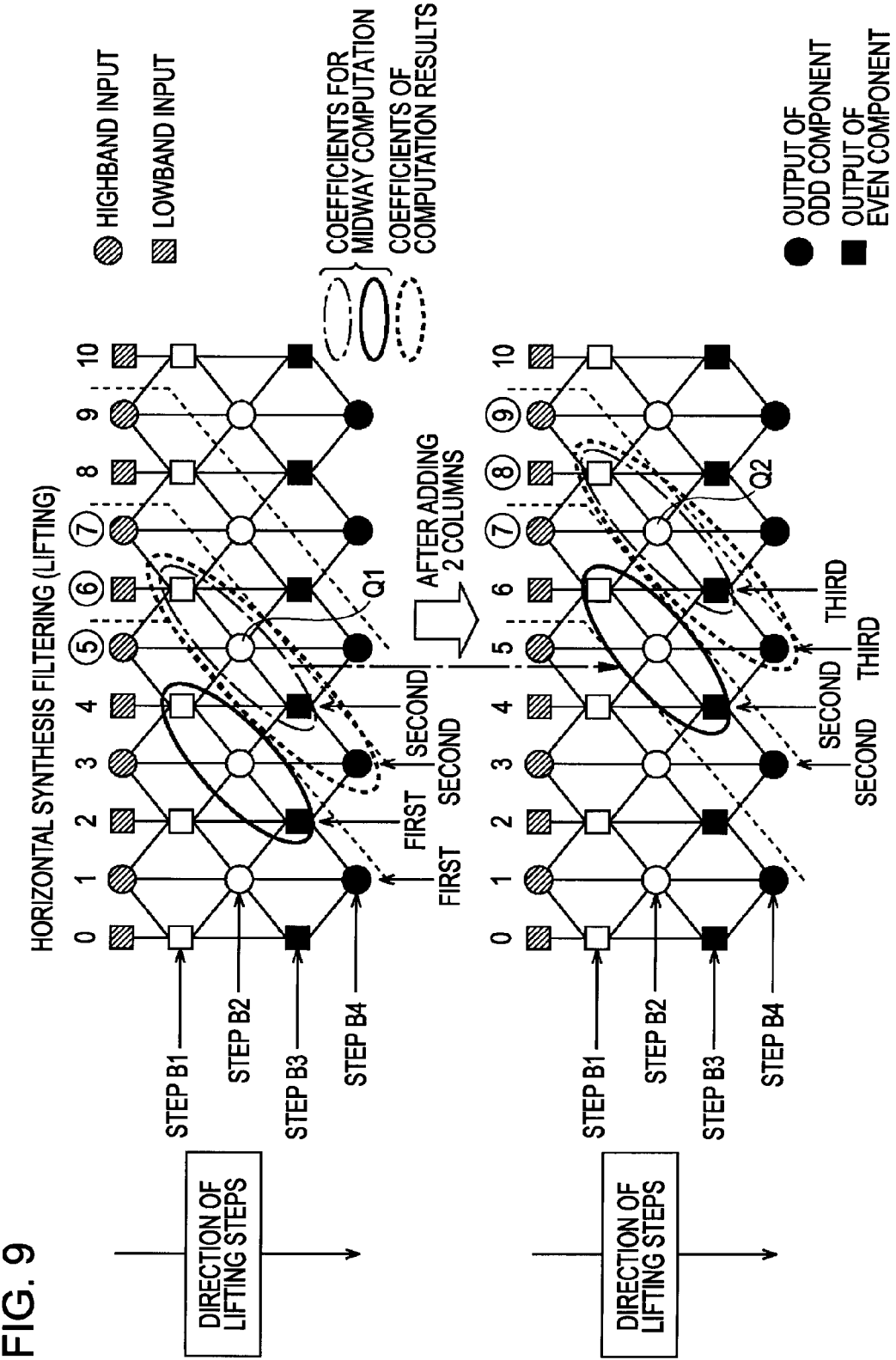
FIG. 9 is a diagram for describing an example of horizontal analysis filtering.

Next, the horizontal synthesizing filtering performed by the horizontal synthesizing filter unit 114 will be described in detail. FIG. 9 illustrates an example of arraying coefficients obtained by vertical direction synthesizing filtering in the horizontal direction, and performing horizontal synthesizing filtering with the lifting scheme shown in FIG. 7.

The example shown in FIG. 9 shows an example of the horizontal direction coefficients being subjected to the processing of the four steps (Steps B1 through B4) described above with reference to FIG. 7 whereby the odd-numbered component coefficients and the even-numbered component coefficients are generated, with the direction of lifting steps proceeding from the top to the bottom in the drawing.

Also, the numbers shown above the coefficients in the horizontal direction indicate column Nos., with the hatched circles and squares at the first tier from the top representing the highband input and lowband input, respectively, and the circles and squares at the subsequent tiers represent the highband coefficients and lowband coefficients generated in the process of lifting computation, respectively. Particularly, the solid circles and solid squares represent the odd-numbered coefficients and even-numbered coefficients which are the results of the lifting computation, respectively.

The following is a description of operations in order from the top. The upper side of FIG. 9 illustrates an example of a case wherein the coefficients of columns Nos. 5 through 7 in the horizontal direction are input, and computation with a lifting scheme in the horizontal direction (hereafter, referred to as "horizontal lifting computation") is performed. Note that in this case, the even-numbered coefficient at the far left is not paired with an odd-numbered coefficient, and accordingly description thereof will be omitted.

In order to obtain the first even-numbered coefficient in step B3 of the horizontal lifting computation and obtain the first odd-numbered coefficient in step B4, there is the need to input the coefficients of the six columns of Nos. 0 through 5.

Subsequently, in order to obtain the second even-numbered coefficient and odd-numbered coefficient, there is the need for the three coefficients indicated by the heavy solid lines and the coefficients of the two columns of Nos. 6 and 7 indicated by circled numbers, and further, in order to calculate the coefficient indicated by Q1 at step B2, the coefficient of the column No. 5 indicated by a circled number is also necessary.

The three coefficients indicated by the heavy solid lines are a part of the coefficients generated in the process of the horizontal lifting computation for obtaining the first odd-numbered coefficient and even-numbered coefficient (hereafter also referred to as "first horizontal lifting computation").

That is to say, in order to obtain the second odd-numbered coefficient and even-numbered coefficient, there is ultimately the need to input the coefficients of the three columns of Nos. 5 through 7 indicated by circled numbers, and further, latch the three coefficients indicated by the heavy solid lines that are generated in the process of the first horizontal lifting computation. Actually, with this being no more than three coefficients, a flip-flop which is often used as a latch can be built into the horizontal analyzing filter unit 114.

Accordingly, performing horizontal lifting computation using the three coefficients indicated by the heavy solid line that have been latched at the first horizontal lifting computation, and the coefficients of the three columns of Nos. 5 through 7 that have been input, generates four coefficients (indicated by the heavy dotted line) including the second odd-numbered coefficient and even-numbered coefficient at the point that the computation process thereof ends. Of these, the three coefficients indicated by the single-dot broken line are coefficients necessary for obtaining the third odd-numbered coefficient and even-numbered coefficient, and accordingly are latched at a built-in flip-flop.

An example of a case wherein, following input of the column No. 7 coefficient, the coefficients of two columns in the horizontal direction are to be additionally input, i.e., the coefficients of the three columns of Nos. 7 through 9 in the horizontal direction are input and horizontal lifting computation is performed, is shown at the lower half of FIG. 9.

In the same way as with the second case, in order to obtain the third odd-numbered coefficient and even-numbered coefficient, there is the need for the three coefficients indicated by the heavy solid lines and the coefficients of the two columns of Nos. 8 and 9 indicated by circled numbers, and further, in order to calculate the coefficient indicated by Q2 at step B2, the coefficient of the column No. 7 indicated by a circled number is also necessary.

Note that the three coefficients indicated by the heavy solid line at the lower half have been latched in the second horizontal lifting computation, as indicated by the single-dot broken line at the upper half of the diagram.

Accordingly, performing horizontal lifting computation using the three coefficients indicated by the heavy solid line that have been latched at the second horizontal lifting computation, and the coefficients of the three columns of Nos. 7 through 9 that have been newly input, generates four coefficients (indicated by the heavy dotted line) including the third odd-numbered coefficient and even-numbered coefficient. Of these, the three coefficients indicated by the single-dot broken line are coefficients necessary for obtaining the fourth odd-numbered coefficient and even-numbered coefficient, and accordingly are latched at a built-in flip-flop.

Thus, the horizontal lifting computation is performed to the far right column of the screen while sequentially inputting three columns worth of coefficients and holding the three intermediate computation coefficients, thereby completing horizontal direction analysis filtering.

While any sort of memory may be used for the midway calculation buffer unit 113 described above, it should be kept in mind that a part of the coefficients hold in the midway calculation buffer unit 113 will be read out again for use in subsequent lifting computation. That is to say, coefficients are written to and read out from the midway calculation buffer unit 113 frequently.

Therefore, it is desirable to enable the midway calculation buffer unit 113 to perform coefficient reading and coefficient writing in parallel, so as to reduce delay time due to coefficient reading and coefficient writing.

FIG. 10 is a block diagram illustrating a configuration example of the midway calculation buffer unit 113. As shown in FIG. 10, the midway calculation buffer unit 113 includes a data linking unit 141, 1-port SRAM (Static Random Access Memory) 142, and a data dividing unit 143.

The data linking unit 141 links two pieces of 16-bit data supplied consecutively from the vertical analysis filter unit 112 to generate 32-bit data and supply this to the 1-port SRAM 142. The data linking unit 141 includes a selector 151, delay unit 152, and packing unit 153.

The selector 151 takes two pieces of 16-bit data supplied consecutively as a pair, and distributes these so as to supply one supplied previously to the delay unit 152, and supply the other supplied later to the packing unit 153. The delay unit 152 delays the timing of the supplied 16-bit data by one cycle worth (up to the next data supply timing), and then supplies this to the packing unit 153. That is to say, two pieces of data are supplied to the packing unit 153 simultaneously. The packing unit 153 links the two pieces of 16-bit data to generate 32-bit data, and supplies the 32-bit data thereof to the 1-port SRAM 142 to hold this.

The data dividing unit 143 reads out the 32-bit data from the 1-port SRAM 142, divides the one piece of 32-bit data into two pieces of 16-bit data, and outputs these. The data dividing unit 143 includes a 16-bit separating unit 154, delay unit 155, and selector 156.

The 16-bit separating unit 154 separates the 32-bit data read out from the 1-port SRAM 142 into upper 16 bits and lower 16 bits to generate two pieces of 16-bit data, and supplies the 16-bit data which is the upper 16 bits to the selector 156, and supplies the 16-bit data which is the lower 16 bits to the delay unit 155. The delay unit 155 delays the timing of the 16-bit data which is the lower 16 bits by one cycle worth, and supplies this to the selector 156. The selector 156 switches input to the 16-bit separating unit 154 or delay unit 155 alternately for every cycle. Thus, the two pieces of 16-bit data are consecutively output in order.

The 1-port SRAM 142 is a recording medium for performing writing and reading of data using one system, and is controlled by the control unit 120 to store the 32-bit data supplied from the packing unit 153 of the data linking unit 141, and output the stored 32-bit data to the 16-bit separating unit 154 of the data dividing unit 143.

Of memory employed for data storage, RAM (Random Access Memory) performs writing and reading of data electrically, so operation thereof is high speed, but the price per increment area is expensive, leading to a problem in that it is difficult to use this in large quantities. As a kind of RAM, there is SRAM which employs a flip-flop circuit as a storage element. SRAM has an advantage of high-speed operation whereby there is no need to perform operation for storing and holding data, but has a complicated circuit, and accordingly, integration may suffer. That is to say, in order to promote integration, how much capacity of SRAM can be reduced is crucial.

Figure 11B:
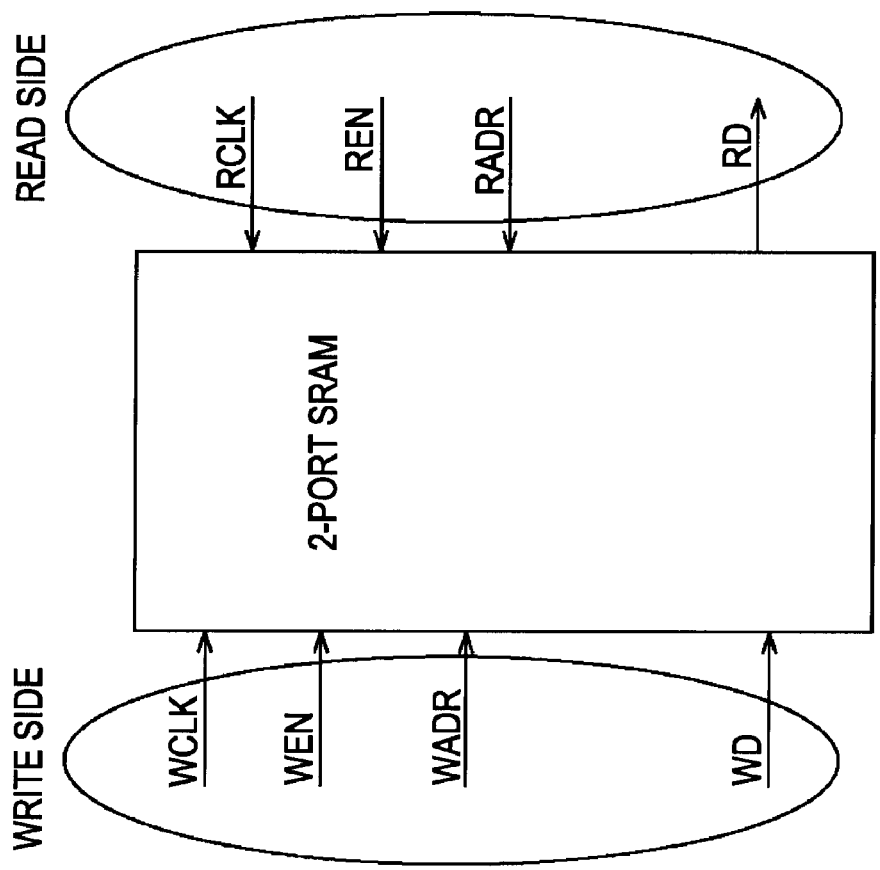
FIGS. 11A and 11B are diagrams illustrating configuration examples of input/output terminals of common 1-port SRAM and 2-port SRAM.
Figure 11A:
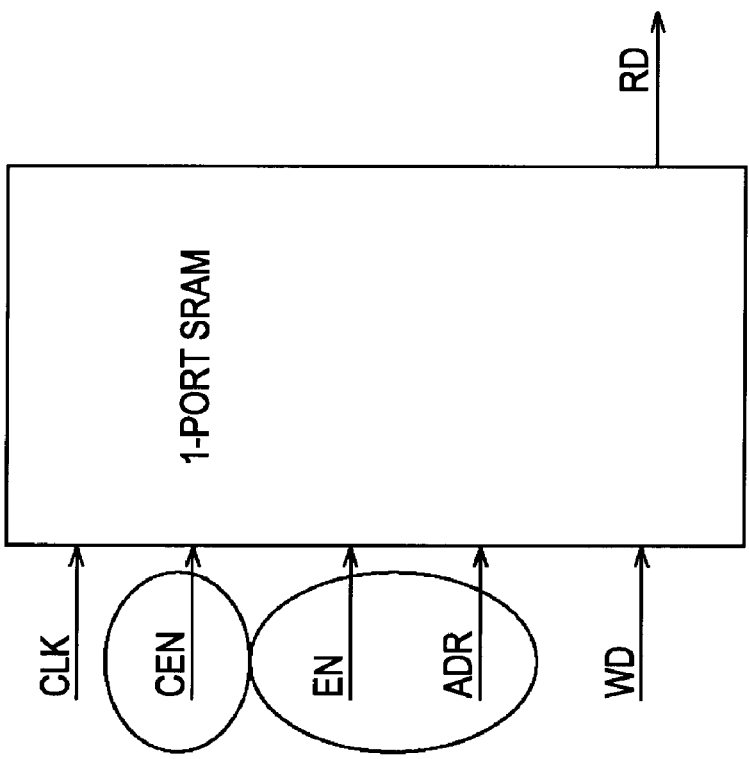

In general, for SRAM, there are 1-port SRAM wherein input and output of data cannot be performed simultaneously, and 2-port SRAM wherein input and output of data can be performed simultaneously, and each has input and output terminals such as shown in FIG. 11A or 11B.

That is to say, 1-port SRAM generally has, as shown in FIG. 11A, a terminal to which a clock signal "CLK" is input, a terminal to which a chip enable signal "CEN" is input, a terminal to which an enable signal "EN" is input, which controls input/output of data is input, a terminal to which address information "ADR" is input, which specifies an address for writing 32-bit data or an address for reading out 32-bit data, a terminal to which 32-bit write data "WD" is input, and a terminal from which 32-bit readout data "RD" is output.

On the other hand, 2-port SRAM generally has, as shown in FIG. 11B, a terminal to which a write clock signal "WCLK" is input, a terminal to which a write control enable signal "WEN" is input, a terminal to which write address information "WADR" is input, which specifies an address for writing 32-bit data, a terminal to which 32-bit write data "WD" is input, a terminal to which a readout clock signal "RCLK" is input, a terminal to which a readout control enable signal "REN" is input, a terminal to which readout address information "RADR" is input, which specifies an address for reading out 32-bit data, and a terminal from which the 32-bit readout data "RD" is output.

In the case of 1-port SRAM shown in FIG. 11A, the chip enable signal "CEN" is a signal for switching a readout operation and writing operation, the two signals of the enable signal "EN" and address information "ADR" are shared with a readout operation and writing operation. For example, in a case wherein the chip enable signal "CEN" specifies a readout operation, the enable signal "EN" becomes a signal for controlling readout operation timing, and the address information "ADR" becomes a signal for specifying the address of data to be read out. Conversely, in a case wherein the chip enable signal "CEN" specifies a writing operation, the enable signal "EN" becomes a signal for controlling writing operation timing, and the address information "ADR" becomes a signal for specifying the address of data to be written in. That is to say, 1-port SRAM cannot perform a readout operation and writing operation simultaneously.

On the other hand, in the case of 2-port SRAM shown in FIG. 11B, the signal for controlling a writing operation and the signal for controlling a readout operation are mutually completely independent. That is to say, 2-port SRAM can perform a readout operation and writing operation at arbitrary timing, and accordingly, can perform a readout operation and writing operation in parallel.

FIGS. 12A and 12B are schematic views illustrating a timing chart in a case wherein four pieces of data is written in such 1-port SRAM and 2-port SRAM, and further these pieces of data are read out therefrom immediately. FIG. 12A illustrates a timing chart example in the case of 1-port SRAM, and FIG. 12B illustrates a timing chart example in the case of 2-port SRAM.

As shown in FIG. 12A, in the case of 1-port SRAM, the four pieces of data are consecutively written (four cycles) in accordance with the enable signal "EN", following one cycle passage according to the latency of SRAM, the written four pieces of data are read out consecutively (four cycles). Accordingly, 1-port SRAM needs the time of a total of nine cycles for writing and readout processing of the four pieces of data. Note that "cycle" indicates the synchronous timing of the processing, i.e., time serving as the increments of timing sharing. For example, here, the writing or readout timing (or the cycle thereof) of data is indicated.

On the other hand, as shown in FIG. 12B, in the case of 2-port SRAM, both of the write control enable signal "WEN" and readout control enable signal "REN" exist, whereby the readout operation and writing operation of the four pieces of data can be parallelized. Accordingly, as shown in FIG. 12B, with 2-port SRAM, a readout operation and writing operation can be executed with four cycles, and the processing can be completed with a total of five cycles including the latency of one cycle.

In the case of HDTV (High Definition TeleVision), the horizontal size of one line is 1920 pixels, so when the coefficients of one line worth thereof are written in 1-port SRAM, and further, are read out, 1920×2=3840 cycles are needed. That is to say, with the synthesis filtering, when 1-port SRAM is applied as the midway calculation buffer unit 113, delay time may increase.

In order to reduce this number of cycles, there is the need to employ 2-port SRAM instead of 1-port SRAM, but 2-port SRAM is generally equivalent to having two configurations of 1-port SRAM internally, manufacturing costs are expensive, and also the circuit area reaches generally double that of 1-port SRAM. In an ordinary case, with the circuit scale of memory, the occupancy rate is high among LSI (Large Scale Integration) chips, and increase in memory area may lead to increase in chip area.

Therefore, an arrangement is made here wherein 1-port SRAM is applied as the midway calculation buffer unit 113, as shown in FIG. 10 data to be written in the 1-port SRAM 142 is linked using the data linking unit 141 to generate 32-bit data, the data is read out in increments of 32 bits using the 1-port SRAM 142, the 32-bit data thereof is separated into two pieces of 16-bit data using the data dividing unit 143, whereby readout and writing of data as to the 1-port SRAM 142 can be operated in parallel.

Description will be made regarding the operation flow of each unit of the midway calculation buffer unit 113 shown in FIG. 10 with reference to the timing chart shown in FIG. 13.

As shown in the fourth tier from the top of FIG. 13, when 16-bit write data (WD16 bit) "0" is supplied at the first cycle, the selector 151 of the data linking unit 141 delays the data "0" by one cycle through the delay unit 152, and supplies this to the packing unit 153. Subsequently, when 16-bit write data "1" is supplied at the second cycle, the selector 151 of the data linking unit 141 supplies the data "1" to the packing unit 153. At the second cycle, the packing unit 153 links the data "0" and "1" thereof to generate 32-bit write data (WD32 bit) "0, 1", and writes the data "0, 1" in an address "0" in accordance with the writing instructions indicated with the first tier through third tier from the top of FIG. 13.

Also, as shown in the fourth tier from the top of FIG. 13, when 16-bit write data (WD16 bit) "2" is supplied at the third cycle, the selector 151 of the data linking unit 141 delays the data "2" by one cycle through the delay unit 152, and supplies this to the packing unit 153. That is to say, at this third cycle, writing to the 1-port SRAM 142 is not performed.

Accordingly, in the third cycle thereof, the 16-bit separating unit 154 of the data dividing unit 143 reads out the 32-bit data written in the address "0" in accordance with the readout instructions indicated with the first tier through third tier from the top of FIG. 13, and separates the readout data (RD32 bit) "0, 1" into two pieces of 16-bit data (data "0" and data "1"). The 16-bit separating unit 154 supplies the separated one of the data "0" to the selector 156, and delays the other data "1" by one cycle through the delay unit 155 to supply this to the selector 156. The selector 156 outputs the data "0" and data "1" sequentially (RD16 bit).

As described above, at the fourth cycle, the data "2" delayed and supplied to the packing unit 153 at the third cycle is linked to 16-bit write data "3" supplied to the packing unit 153 from the selector 151 of the data linking unit 141 without passing through the delay unit 152 at the fourth cycle to generate 32-bit write data (WD32 bit) "2, 31". At the fourth cycle, the packing unit 153 writes the data "2, 3" in an address "1" in accordance with the writing instructions indicated with the first tire through third tier from the top of FIG. 13.

As with the third cycle, at the fifth cycle, the 16-bit separating unit 154 of the data dividing unit 143 reads out the 32-bit data written in the address "1" in accordance with the readout instructions indicated with the first tier through third tier from the top of FIG. 13, and separates the readout data (RD32 bit) "2, 3" into two pieces of 16-bit data (data "2" and data "3"). The 16-bit separating unit 154 supplies the separated one of the data "2" to the selector 156, and delays the other data 1131 by one cycle through the delay unit 155 to supply this to the selector 156. The selector 156 outputs the data "2" and data "3" sequentially (RD16 bit).

As described above, two-pieces of 16-bit data are read out and written as to the 1-port SRAM as 32-bit data, whereby the midway calculation buffer unit 113 can perform, according to time sharing, writing according to the data linking unit 141 and readout according to the data dividing unit 143 simultaneously in parallel, and accordingly, four pieces of data in a total of five cycles can be written in and further read out from the 1-port SRAM 142. Note that "cycle" indicates the synchronous timing of the processing, i.e., time serving as the increments of timing sharing. For example, here, the writing or readout timing (or the cycle thereof) of data is indicated.

Thus, the wavelet inverse transformation device 100 can suppress increase in the circuit scale of the midway calculation buffer unit 113, operate the midway calculation buffer unit 113 at high speed, whereby increase in time delay according to wavelet inverse transformation can be suppressed.

Note that description has been made so far wherein the 1-port SRAM 142 performs input/output of data in increments of 32 bits, but the data increments of input/output of data as to the 1-port SRAM 142 is arbitrary. Also, description has been made wherein input/output of data as to the midway calculation buffer unit 113 is preformed in increments of 16 bits, but the data increments of input/output of data as to the midway calculation buffer unit 113 is also arbitrary. That is to say, the configuration of the data linking unit 141 and data dividing unit 143 shown in FIG. 11 is an example, and in reality, is determined by the data increments of input/output of data as to the 1-port SRAM 142 and the data increments of input/output of data as to the midway calculation buffer unit 113.

However, the basic configuration is similar to the example shown in FIG. 10. That is to say, the data linking unit 141 links multiple pieces of data in predetermined data increments input to the midway calculation buffer unit 113, generates one piece or multiple pieces of data in data input increments of the 1-port SRAM 142, and supplies the data to the 1-port SRAM 142 to be held. Also, the data dividing unit 143 reads out piece or multiple pieces of data in data output increments of the 1-port SRAM 142 from the 1-port SRAM 142, separates the readout data into multiple pieces of data in the data output increments of the midway calculation buffer unit 113, and outputs these from the midway calculation buffer unit 113.

The 1-port SRAM 142 performs readout and writing of data in data input/output increments alternately.

Also, 1-port SRAM is used in the same way for the output buffer unit 116 in FIG. 5, as well. Thus, the control unit 101 can store the baseband image data output from the horizontal synthesizing filter unit 114 in the output buffer unit 116, and simultaneously therewith, supply the coefficient data held at the output buffer unit 116 to the level-independent buffer unit 120.

Figure 14:
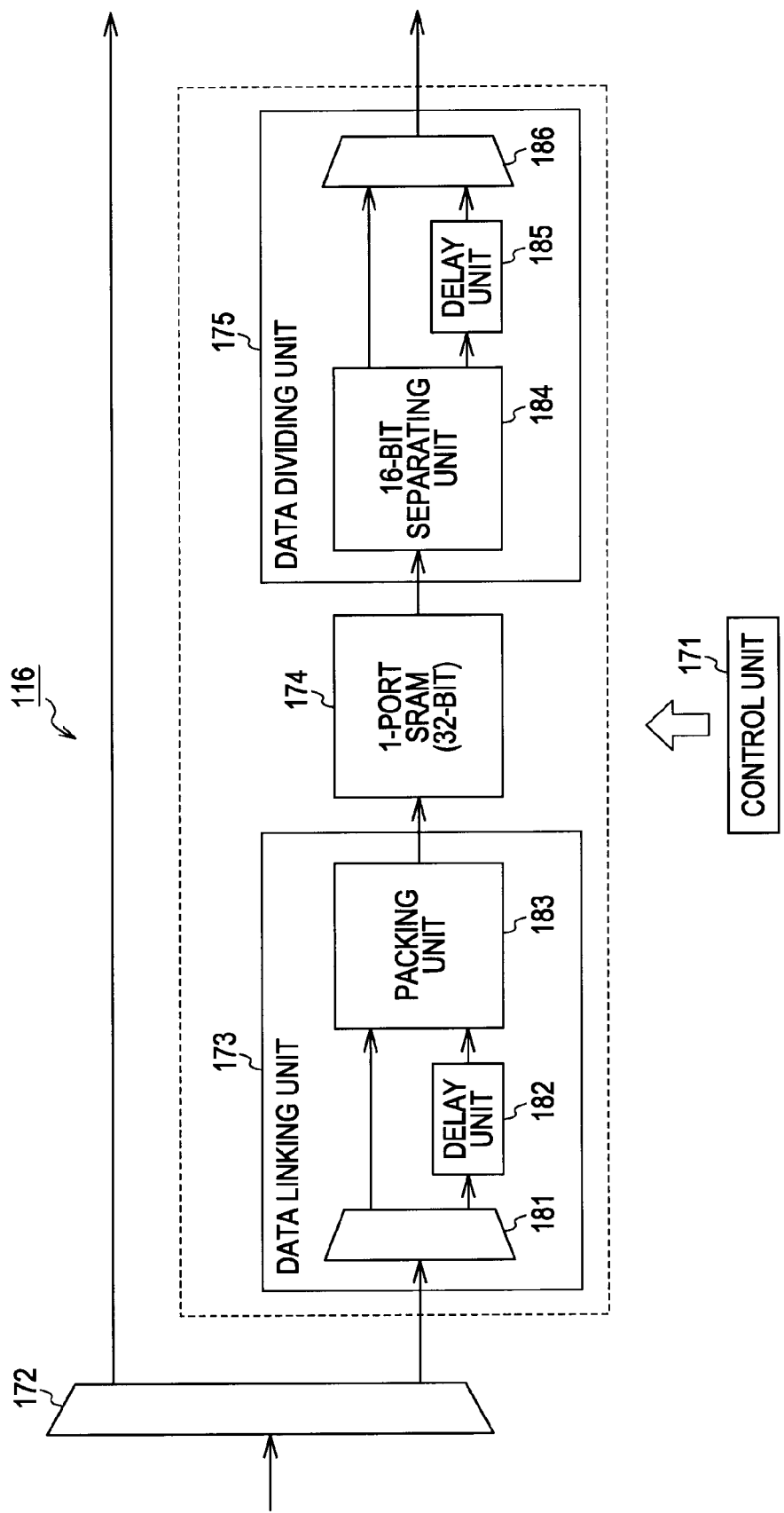
FIG. 14 is a block diagram illustrating a detailed configuration example of the output buffer unit shown in FIG. 27.

FIG. 14 is a block diagram illustrating an internal configuration example of the output buffer unit 116 shown in FIG. 5. As shown in FIG. 14, the output buffer unit 116 includes a control unit 171, selector 172, data linking unit 173, 1-port SRAM 174, and data dividing unit 175.

The control unit 171 controls the operation of each unit of the selector 172 through data dividing unit 175. For example, the selector 172 supplies the sub-band coefficient data supplied from the horizontal synthesizing filter unit 114 to the data linking unit 173. Also, of the two lines of baseband image data supplied from the horizontal synthesizing filter unit 114, the selector 172 supplies one to the selector 117 (FIG. 25), the other to the data linking unit 173.

The data linking unit 173 corresponds to the data linking unit 131 shown in FIG. 10, has the same configuration as the data linking unit 131, and operates in the same way. The 1-port SRAM 174 has the same configuration as that of the 1-port SRAM 132, and operates in the same way. The data dividing unit 175 corresponds to the data dividing unit 133 in FIG. 10, and has the same configuration as that of the data dividing unit 133, and operates in the same way.

Figure 15:
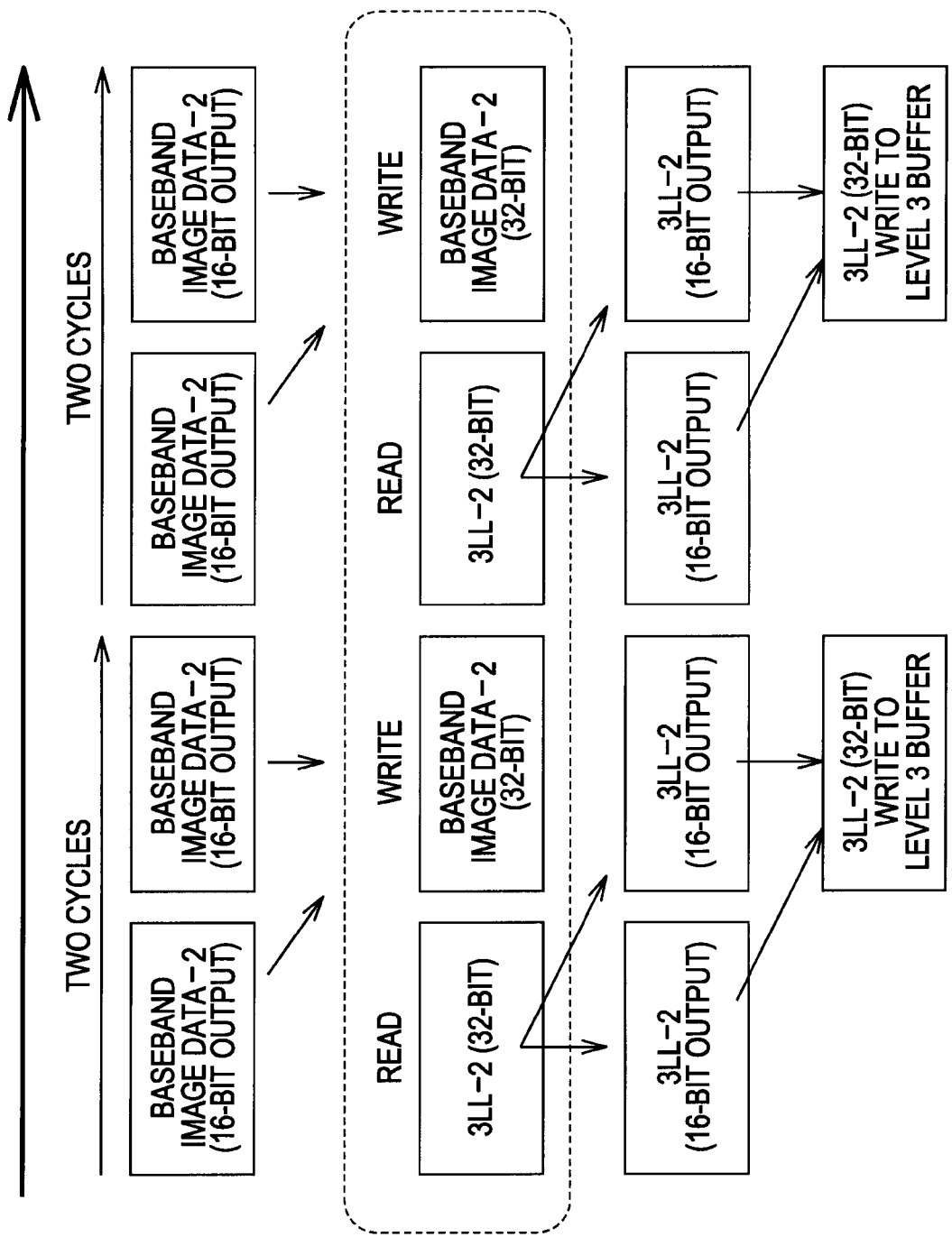
FIG. 15 is a diagram illustrating an example of the timing of data input/output with the 1-port SRAM shown in FIG. 9.

That is to say, the data linking unit 173 includes a selector 181 similar to the selector 151, a delay unit 182 similar to the delay unit 152, and a packing unit 183 similar to the packing unit 153, and as shown in FIG. 15, links two pieces of 16-bit data supplied from the selector 172 by spending two cycles to generate 12-bit data, and stores this to 1-port SRAM 174 in one cycle to hold this.

Also, the data dividing unit 175 includes a 16-bit separating unit 184 similar to the 16-bit separating unit 154, a delay unit 185 similar to the delay unit 155, and a selector 186 similar to the selector 156, and as shown in FIG. 15, reads out the 12-bit data from the 1-port SRAM, separates the 12-bit data thereof generate two pieces of 16-bit data, and outputs these externally by spending two cycles. Thus, reading out and writing of data as to the 1-port SRAM 174 of the output buffer unit 116 are, such as shown in FIG. 15, repeated alternately for every cycle, thereby reading and writing 12-bit data. Accordingly, reading out and writing are performed simultaneously in parallel. That is to say, the portions surrounded with the dotted line in FIG. 14 are the same configurations as those of the midway calculation buffer unit 113 shown in FIG. 10.

According to such configurations, the output buffer unit 116 stores baseband image data in the 1-port SRAM 174, and simultaneously in parallel, can read out the coefficient data stored in the 1-port SRAM 174 to supply this to the level-independent buffer unit 120.

Next each processing flow will be described. Description will be made regarding a flow example of the wavelet inverse transformation processing by the wavelet inverse transformation device 100 shown in FIG. 25 with reference to the flowchart shown in FIG. 16. When the wavelet inverse processing is started, in step S101 the control unit 101 initializes the precinct to be processed. In step S102, the control unit 101 determines whether or not the current timing is predetermined timing, and stands by until determination is made that the current timing is predetermined timing. In a case wherein determination is made in step S102 that the current timing is predetermined timing, the processing proceeds to step S103. In step S103, the vertical synthesizing filter unit 112 and horizontal synthesizing filter unit 114 execute line increment wavelet inverse transformation processing to generate one line worth of the coefficient data of one lower division level, or one line worth of baseband image data. The details of this line increment wavelet inverse transformation processing will be described later.

When the line increment wavelet inverse transformation processing is completed, the processing proceeds to step S104. In step S104, the control unit 101 determines whether or not all of the coefficient data within a precinct have been processed. In a case wherein determination is made that all of the coefficient data within a precinct have not been processed, the processing returns to step S102, where the subsequent processing is repeated. Also, in a case wherein determination is made that all of the coefficient data within a precinct have been processed, the processing proceeds to step S105.

In step S105, the control unit 101 determines whether or not all of the precincts within a picture have been processed. In a case wherein determination is made that an unprocessed precinct exists, the processing proceeds to step S106. In step S106, the control unit 101 updates the precinct to be processed to take the next precinct as the precinct to be processed. When the processing in step S106 is completed, the processing returns to step S102, where the subsequent processing is repeated.

Also, in a case wherein determination is made in step S105 that all of the precincts within a picture have been processed, the wavelet inverse transformation processing ends. Note that this wavelet inverse transformation processing is executed for each picture.

Figure 16:
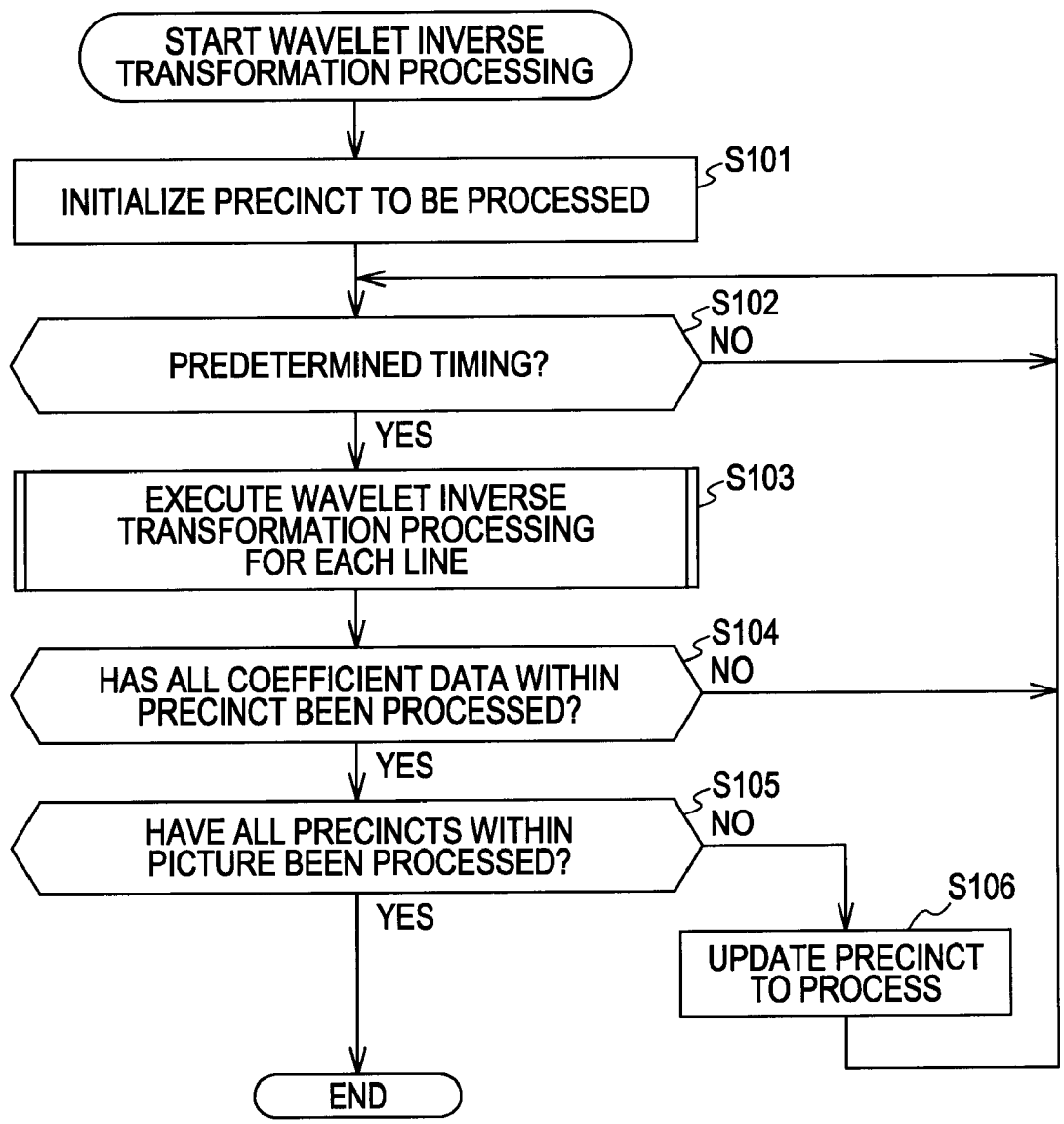
FIG. 16 is a flowchart for describing an example of the flow of wavelet inverse transformation processing.

Next, an example of the flow of line-increment wavelet inverse transformation executed in step S103 in FIG. 16 will be described with reference to the flowchart in FIGS. 17 and 18.

Upon the line-increment wavelet inverse transformation being started, in step S121, the control unit 101 determines whether or not baseband image data exists in the output buffer unit 116. As described later, two lines of baseband image data is generated each time that line-increment wavelet inverse transformation is performed. The generated baseband image data is output one line at a time, with the outer one line being accumulated in the output buffer unit 116, and being output at the next predetermined timing (the timing of determination in step S102 in FIG. 16), i.e., at the time of the next line-increment wavelet inverse transformation being executed.

That is to say, the processing in step S121 is determination regarding whether or not baseband image data has been accumulated in the output buffer unit 116.

In the event that determination is made that baseband image data has not been accumulated in the output buffer unit 116, the flow proceeds to step S122.

In step S122, the control unit 101 determines whether or not coefficient data exists in the level-independent buffer unit 120. With wavelet inverse transformation processing, in each of the repeatedly-performed synthesizing filtering processing, one line each of coefficients of four sub-bands is synthesized and two lines of lowband sub-band coefficients of one level lower order are generated, with one thereof being held in the level-independent buffer unit 120 via the output buffer unit 116. In line-increment wavelet inverse transformation processing, baseband image data is generated two lines at a time in order from the top of the picture, so in the event that coefficients are present in the level-independent buffer unit 120, those coefficients are first processed, which will be described later in detail.

In the event that determination is made that there are no coefficients in the level-independent buffer unit 120 in step S122, the flow proceeds to step S123. In step S123, the control unit 101 sets the division level to be processed to the uppermost level. Upon the processing in step S123 ending, the processing proceeds to step S131 in FIG. 18.

Figure 17:
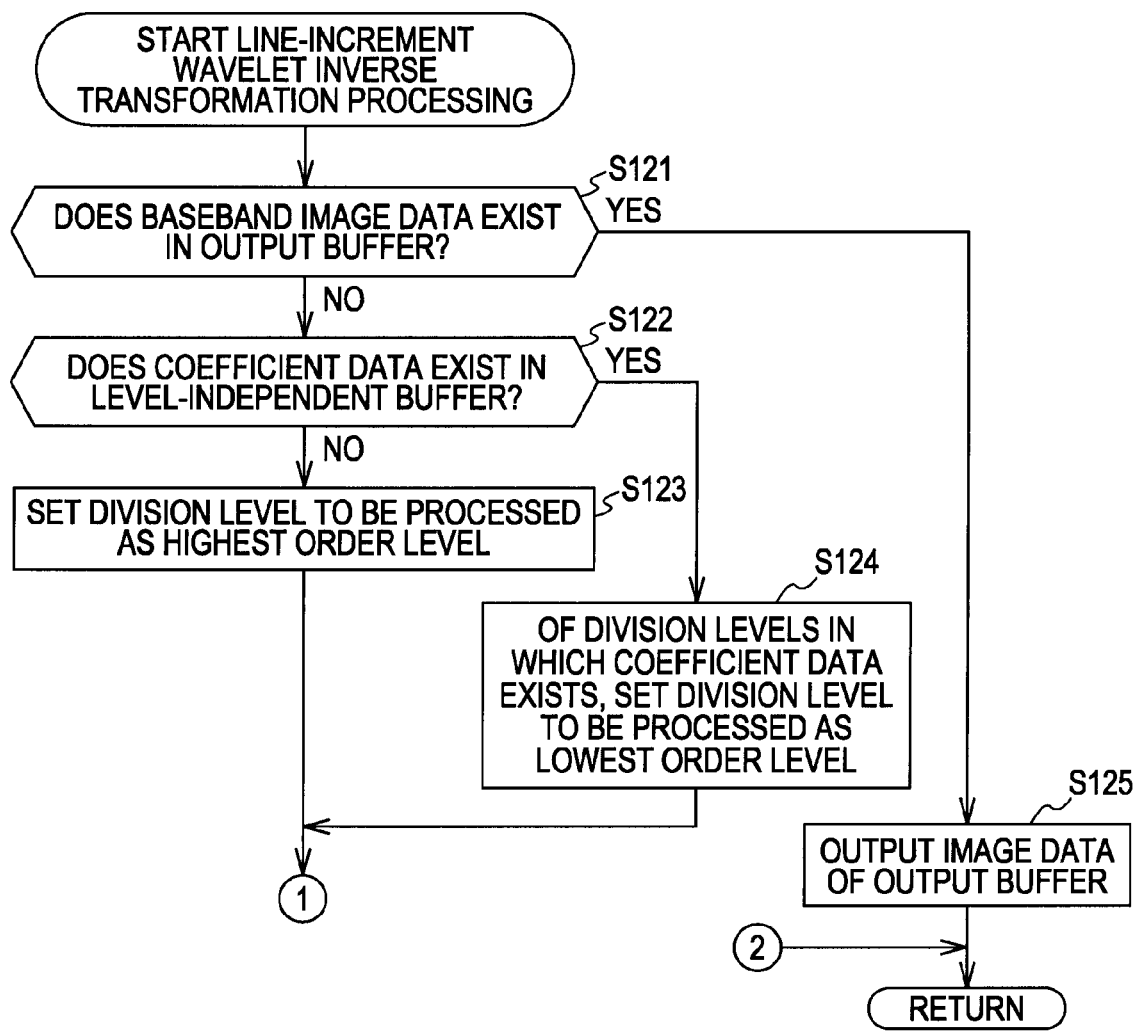
FIG. 17 is a flowchart for describing an example of the flow of line-increment wavelet inverse processing.

Also, in the event that determination is made that there are coefficients in the level-independent buffer unit 120 in step S122 in FIG. 17, the flow proceeds to step S124. In step S124, the control unit 101 sets the division level to be processed to the lowermost level. Upon the processing in step S124 ending, the processing proceeds to step S131 in FIG. 18.

Figure 18:
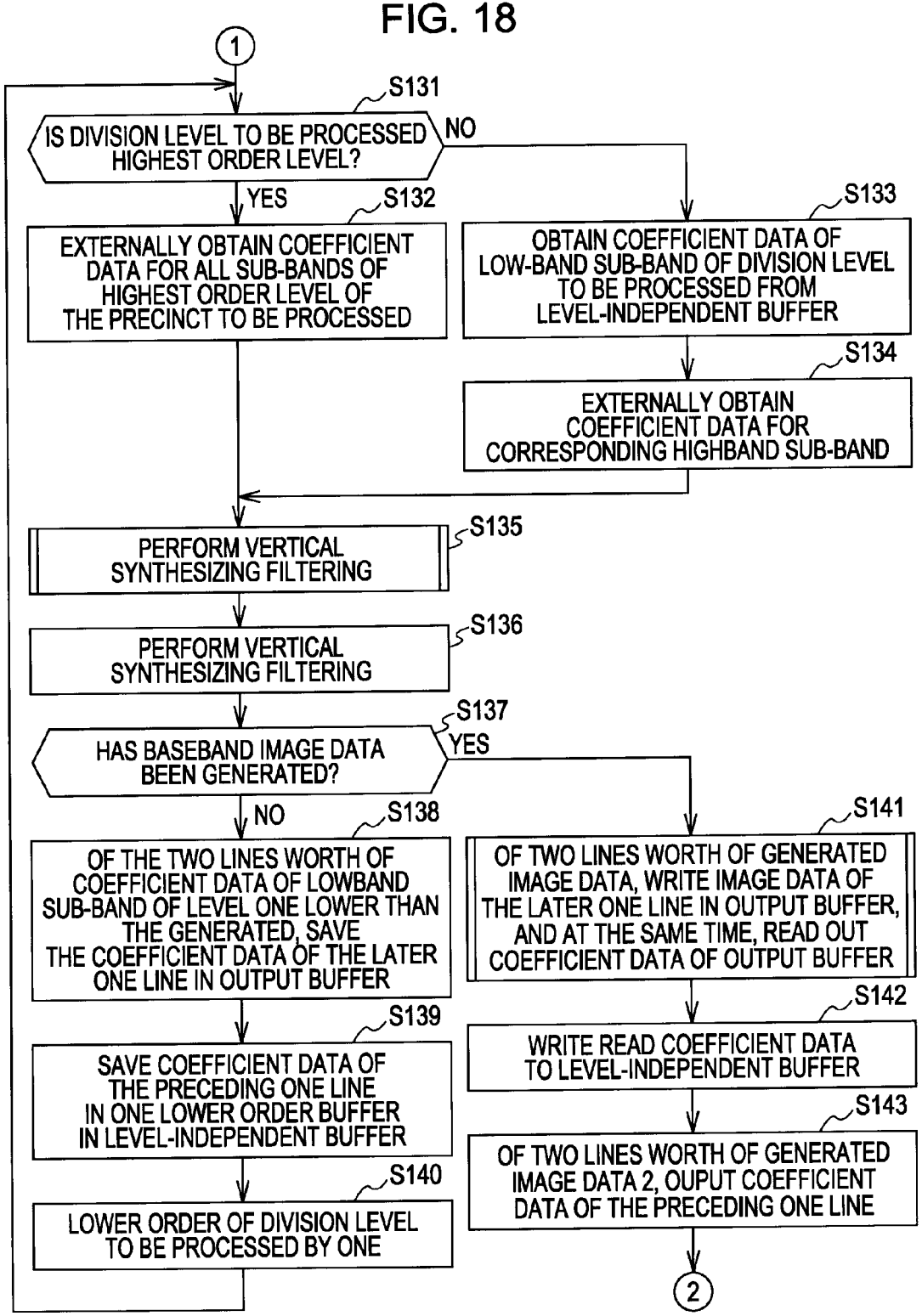
FIG. 18 is a flowchart continuing from FIG. 35, for describing an example of the flow of line-increment wavelet inverse processing.

In step S131 in FIG. 18, the control unit 101 determines whether or not the division level to be processed is the uppermost level or not. In the event that determination is made that the division level to be processed is the uppermost level, the flow proceeds to step S132. In step S132, the vertical synthesizing filter unit 112 externally obtains coefficient data for all sub-bands of the uppermost level of the precinct to be processed via the selector 111. Upon the coefficient data being obtained, the flow proceeds to step S135. Also, in the event that determination is made in step S131 that the division level to be processed is not the uppermost level, the flow proceeds to step S133. In step S133, the vertical synthesizing filter unit 112 obtains coefficient data for the lowband sub-band of the division level to be processed, via the selector 111. Also, in step S134, the vertical synthesizing filter unit 112 externally obtains coefficient data for the highband sub-bands of the division level to be processed, via the selector 111. Upon the processing of step S134 ending, the flow proceeds to step S135.

In step S135, the vertical synthesizing filter unit 112 executes vertical synthesizing filter processing (vertical synthesizing filtering). Details of vertical synthesizing filter processing will be described later. Upon the vertical synthesizing filter processing ending, the horizontal synthesizing filter unit 114 performs horizontal synthesizing filter processing (horizontal synthesizing filtering).

In step S137, the control unit 101 determines whether or not baseband image data has been generated by the horizontal synthesizing filter processing in step S136. In the event that determination is made that the generated coefficient data is midway level coefficient data, the flow proceeds to step S138. In step S138, the horizontal synthesizing filter unit 114 saves, of the two lines of lowband sub-band coefficient data of the level one below that generated, the latter one line, in the output buffer unit 116.

In step S139, the horizontal synthesizing filter unit 114 saves, of the two lines of lowband sub-band coefficients data of the level one below that generated, the first one line, in the level-independent buffer unit 120 at a level one lower in order. In step S140, the control unit 101 updates the division level to be processed, to the division level one lower in order. Upon the processing of step S140 ending, the flow returns to step S131, and subsequent processing is repeated.

That is to say, the wavelet inverse transformation device 100 repeats the processing of steps S131 through S140 until two lines of baseband image data are generated, and performs synthesizing filter processing at each level while transitioning the division level to be processed to the lower order one at a time.

Synthesizing filter processing is performed at the division level 1, and in the event that determination is made in step S137 that baseband image data has been generated, the flow proceeds to step S141. In step S141, the output buffer unit 116 obtains two lines of image data generated at the horizontal synthesizing filter unit 114, executes buffer input/output processing described later, and writes the latter one line into the built-in 1-port SRAM 174, while at the same time reading out the coefficient data stored in the 1-port SRAM 174.

In step S142, the output buffer unit 116 writes the coefficient data that has been read out to the buffer units of corresponding division levels in the level-independent buffer unit 120, via the selector 117. In step S143, the output buffer unit 116 externally outputs, of the two lines of image data generated at the horizontal synthesizing filter unit 114, the first line, via the selector 117. Upon the processing of step S143 ending, the line-increment wavelet inverse transformation processing ends, the flow returns to the processing in step S103 of FIG. 16, and processing from step S104 on is executed.

Also, in the event that determination is made in step S121 in FIG. 17 that one line of base band image data exists in the output buffer unit 116, the flow proceeds to step S125. The output buffer unit 116 reads out the one line of baseband image data from the built-in 1-port SRAM 174, and externally outputs this via the selector 117. Upon the image data being output, the line-increment wavelet inverse transformation processing ends, the flow returns to step S103 in FIG. 16, and processing from step S104 on is executed.

Thus, two lines at a time are generated by synthesizing filter processing, so one line is accumulated in the output buffer unit 116, and in the event that there is baseband image data in the output buffer unit 116, that image data is output; otherwise, image data is generated by the synthesizing filter processing. Accordingly, each time line-increment wavelet inverse transformation processing is performed, the wavelet inverse transformation device 100 can output one line each of baseband image data at a predetermined timing.

Figure 19:
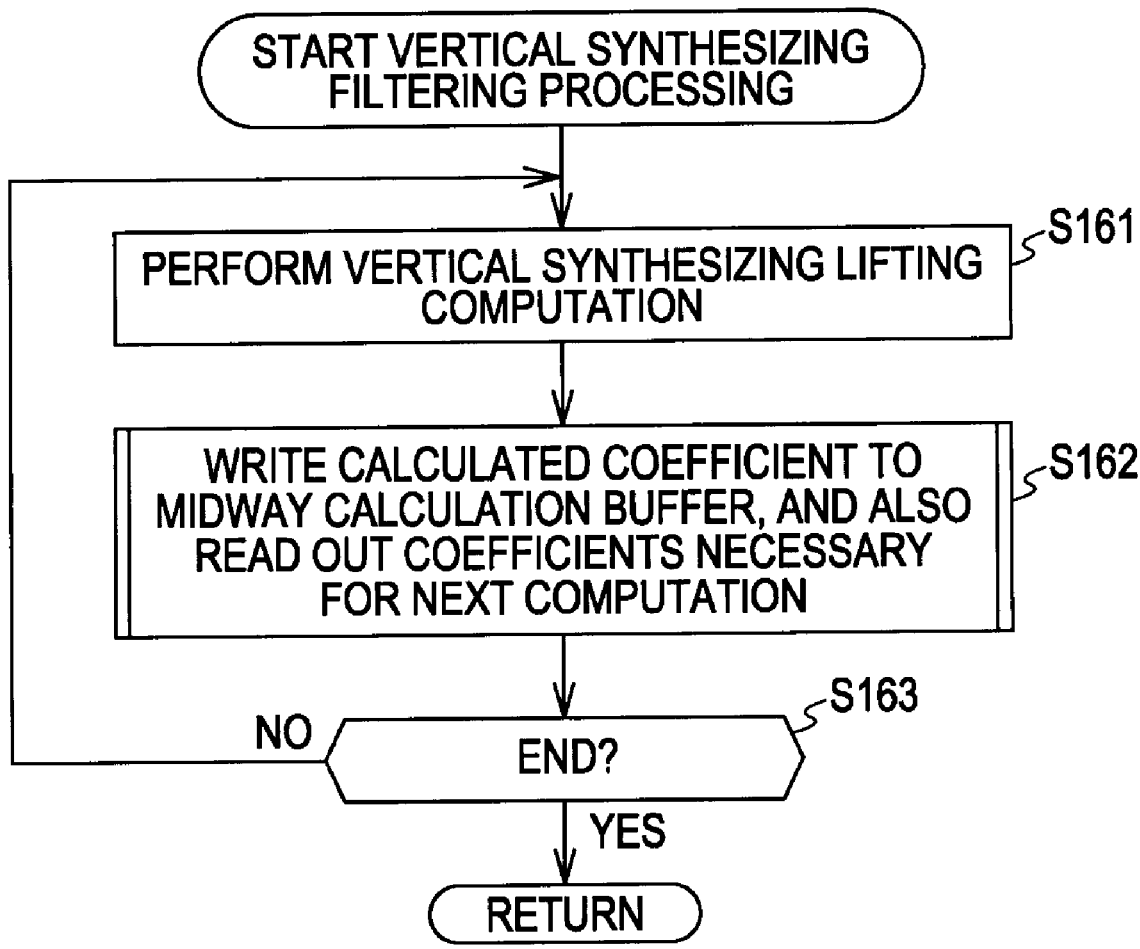
FIG. 19 is a flowchart for describing an example of the flow of vertical analysis filtering.

Next, a detailed example of vertical synthesizing filter processing executed in step S135 in FIG. 18 will be described with reference to the flowchart in FIG. 19.

Upon the vertical filter processing starting, in step S161 the vertical synthesizing filter unit 112 performs vertical direction synthesizing lifting computation (vertical synthesizing lifting computation) such as described with reference to FIGS. 7 and 8. In step S162, buffer input/output processing is performed, and coefficients calculated by the vertical synthesizing lifting computation in step S161 are written to the midway calculation buffer unit 113, while reading out coefficients necessary for the next computation. Details of buffer input/output processing for performing this data input and output simultaneously in parallel will be described later.

Upon the buffer input/output processing ending, in step S163, the vertical synthesizing filter unit 112 determines whether or not to end the vertical synthesizing filter processing. In the event that determination is made that the vertical lifting computation has not ended regarding all of the coefficient data obtained this time, and that there are still unprocessed coefficients, the flow returns to step S161, and the subsequent processing is repeated. That is to say, repeating the processing of steps S361 and S362 performs vertical lifting computation on all coefficients that have been obtained. In the event that determination is made in step S163 to end processing, i.e., in the event that determination is made that the vertical lifting computation has ended regarding all of the coefficient data obtained this time, the vertical synthesizing filter processing ends.

Figure 20:
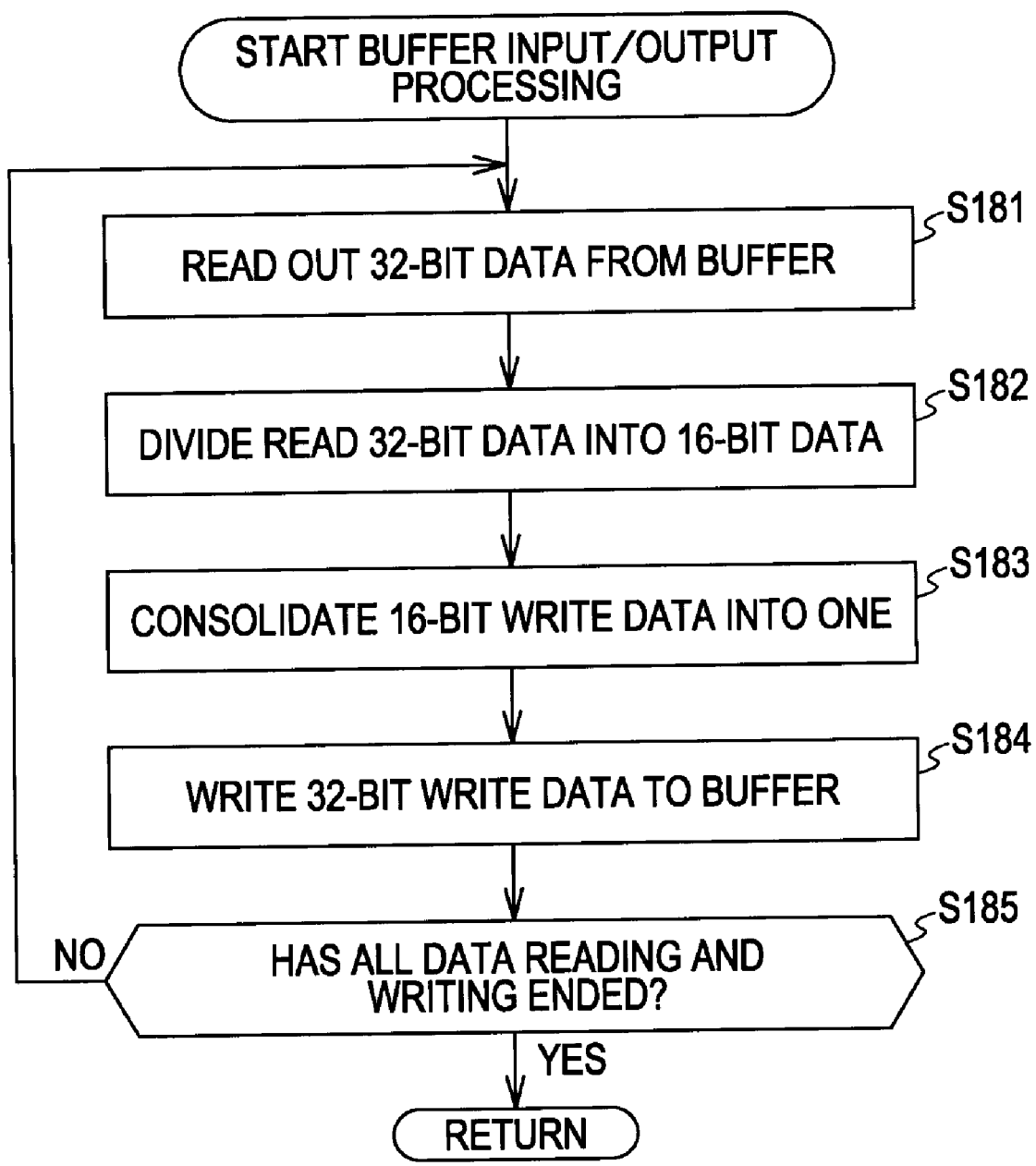
FIG. 20 is a flowchart for describing an example of buffer input/output processing.

Next, a detailed example of the flow of buffer input/output processing executed in step S162 in FIG. 19 by the midway calculation buffer unit 113 shown in FIG. 10 will be described with reference to the flowchart in FIG. 20.

Upon buffer input/output processing starting, in step S181 the data dividing unit 143 reads out the 32-bit data specified by the vertical synthesizing filter unit 112 from the buffer, i.e., from the 1-port SRAM 142, and in step s182 divides the 32-bit data that has been read out into 16-bit data and outputs externally, i.e., to the vertical synthesizing filter unit 112. In step S183, the data linking unit 141 links two process of write 16-bit data supplied externally, i.e., from the vertical synthesizing filter unit 112 into one piece of 32-bit data, and in step S184, writes the write 32-bit data to the buffer, i.e., to the 1-port SRAM 142.

In step S185, the data linking unit 141 and data dividing unit 143 determine whether or not reading and writing of all data has ended, and in the event that determination is made that there is data not read yet or data not written yet, the flow returns to step S181 and subsequent processing is executed. In the event that determination is made that reading and writing of all data has ended in step S185, the buffer input/output processing ends.

By performing such processing, the midway calculation buffer unit 113 can perform reading and writing processing alternately as shown in FIG. 13, and execute both processing simultaneously and in parallel as a whole.

Note that as described with reference to FIG. 14, the output buffer unit 116 has a configuration similar to the midway calculation buffer unit 113 shown in FIG. 10, and writing of one line of baseband image data and reading of coefficient data can be performed simultaneously and in parallel. That is to say, the buffer input/output processing executed in step S141 in FIG. 18 is also executed in the same way as with the midway calculation buffer unit 113 described with reference to the flowchart in FIG. 20. Accordingly, the description made by way of the flowchart in FIG. 20 can also be applied to the buffer input/output processing executed in step S141 in FIG. 18. It should be noted however, that the baseband image data written to the 1-port SRAM 174 is supplied from the horizontal synthesizing filter unit 114 via the selector 115, and the coefficient data of each division level read out from the 1-port SRAM 174 is supplied to the level-independent buffer unit 120 via the selector 117.

Figure 21:
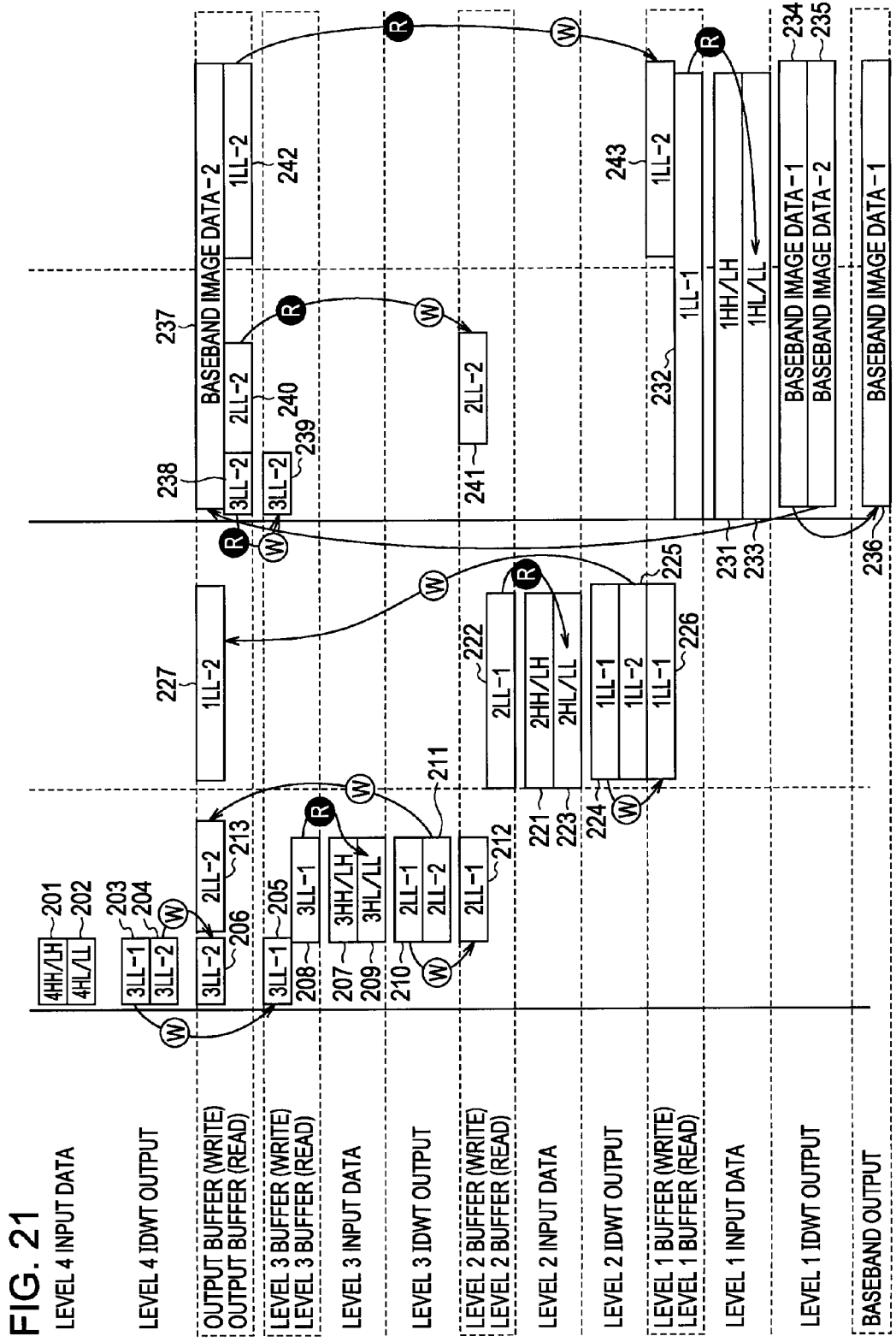
FIG. 21 is a model diagram for describing an example of the flow of line-increment wavelet inverse processing.

A specific example of the flow of such line-increment wavelet inverse transformation processing is schematically shown in FIG. 21. FIG. 21 illustrates in way in which transition of coefficient data occurs regarding the processing at each division level and the input/output at each buffer. Note that here, we will say that the division level of coefficient data is 4, i.e., that the uppermost level is 4.

As shown to the upper left in FIG. 21, at the time that the line-increment wavelet inverse transformation processing is started the division level to be processed is set to the uppermost level, so first, data 4HH/LH made up of one line of sub-band HH coefficients and one line of sub-band LH coefficients, and data 4HL/LL made up of one line of sub-band HL coefficients and one line of sub-band LL coefficients, of the division level 4, are supplied externally, i.e., from the upstream processing unit for storage unit or the like (none of these are shown in the drawings) of the wavelet inverse transformation device 100, to the vertical synthesizing filter unit 112 (data 201 and data 202). That is to say, the vertical synthesizing filter unit 112 takes input of one line each of coefficients of each of the sub-bands of division level 4.

The vertical synthesizing filter unit 112 and the horizontal synthesizing filter unit 114 perform synthesizing filter processing on these coefficients, and generate data 1LL-1 (data 203) and data 1LL-2 (data 204) which are one line of lowband sub-band coefficients of a division level one order lower. That is to say, the vertical synthesizing filter unit 112 and the horizontal synthesizing filter unit 114 generate two lines of lowband sub-band coefficients of a division level one order lower (division level 3) by synthesizing filer processing.

Of these, one, the data 3LL-1 (data 203) is supplied to the level 3 buffer unit 121 of the level-independent buffer unit 120 via the selector 115 and stored (data 205), and the other, the data 3LL-2 (data 204) is written to the output buffer unit 116 and held (data 206).

Here, the level to be processed is set to level 3, which is one order lower. The vertical synthesizing filter unit 112 externally obtains one line each of the highband sub-band coefficients of division level 3, and also reads out and obtains the data 3LL-1 held in the level 3 buffer unit 121 (data 208). That is to say, the vertical synthesizing filter unit 112 takes input of one line each of the sub-band coefficients of division level 3, such as data 3HH/LH (data 207) and data 3HL/LL (data 209). The data 1HH/LH represents one line of the sub-band HH coefficients and one line of the sub-band LH coefficients, of division level 3, and the data 1HL/LL represents one line of the sub-band HL coefficients and one line of the sub-band LL coefficients, of division level 3.

The vertical synthesizing filter unit 112 and the horizontal synthesizing filter unit 114 perform synthesizing filter processing on these coefficients, and generate data 2LL-1 (data 210) and data 2LL-2 (data 211) which are one line of lowband sub-band coefficients of a division level one order lower. That is to say, the vertical synthesizing filter unit 112 and the horizontal synthesizing filter unit 114 generate two lines of lowband sub-band coefficients of a division level one order lower (division level 2) by synthesizing filer processing.

Of these, one, the data 2LL-1 (data 210) is supplied to the level 2 buffer unit 122 of the level-independent buffer unit 120 via the selector 115 and stored (data 212), and the other, the data 2LL-2 (data 211) is written to the output buffer unit 116 and held (data 213).

Here, again, the level to be processed is set to level 2, which is one order lower. The vertical synthesizing filter unit 112 externally obtains one line each of the highband sub-band coefficients of division level 2, and also reads out and obtains the data 2LL-1 held in the level 2 buffer unit 122 (data 222). That is to say, the vertical synthesizing filter unit 112 takes input of one line each of the sub-band coefficients of division level 2, such as data 2HH/LH (data 221) and data 2HL/LL (data 223). The data 2HH/LH represents one line of the sub-band HH coefficients and one line of the sub-band LH coefficients, of division level 2, and the data 2LL represents one line of the sub-band coefficients and one line of the sub-band LL coefficients, of division level 2.

The vertical synthesizing filter unit 112 and the horizontal synthesizing filter unit 114 perform synthesizing filter processing on these coefficients, and generate data 1LL-1 (data 224) and data 1LL-2 (data 225) which are one line of lowband sub-band coefficients of a division level one order lower. That is to say, the vertical synthesizing filter unit 112 and the horizontal synthesizing filter unit 114 generate two lines of lowband sub-band coefficients of a division level one order lower (division level 1) by synthesizing filer processing.

Of these, one, the data 1LL-1 (data 224) is supplied to the level 1 buffer unit 123 of the level-independent buffer unit 120 via the selector 115 and stored (data 226), and the other, the data 1LL-2 (data 225) is written to the output buffer unit 116 and held (data 227).

Here, once again, the level to be processed is set to level 1, which is one order lower. The vertical synthesizing filter unit 112 externally obtains one line each of the highband sub-band coefficients of division level 1, and also reads out and obtains the data 1LL-1 held in the level 1 buffer unit 123 (data 232).

That is to say, the vertical synthesizing filter unit 112 takes input of one line each of the sub-band coefficients of division level 1, such as data 1HH/LH (data 231) and data 1HL/LL (data 233). The data 1HH/LH represents one line of the sub-band HH coefficients and one line of the sub-band LH coefficients, of division level 1, and the data 1LL represents one line of the sub-band coefficients and one line of the sub-band LL coefficients, of division level 1.

The vertical synthesizing filter unit 112 and the horizontal synthesizing filter unit 114 perform synthesizing filter processing on these coefficients, and generate baseband image data −1 (data 234) and baseband image data −2 (data 235) representing one line of baseband image data. That is to say, the vertical synthesizing filter unit 112 and the horizontal synthesizing filter unit 114 generate two lines of baseband image data by synthesizing filer processing.

Of these, one, the baseband image data −1 (data 234) is output as it is (data 236), and the other, the baseband image data −2 (data 235) is written to the output buffer unit 116 and held (data 237). Simultaneously and in parallel with this writing, the data 3LL-2 (data 238) which is division level 3 lowband sub-band coefficients stored in the output buffer unit 116 is read out and supplied to and stored in the level 3 buffer unit 121 of the level-independent buffer unit 120 (data 239), the data 2LL-2 (data 240) which is division level 2 lowband sub-band coefficients is read out and supplied to and stored in the level 2 buffer unit 122 of the level-independent buffer unit 120 (data 241), and the data 1LL-2 (data 242) which is division level 1 lowband sub-band coefficients is read out and supplied to and stored in the level 1 buffer unit 123 of the level-independent buffer unit 120 (data 243).

Each time the line-increment wavelet inverse transformation processing described with reference to the flowchart in FIGS. 17 and 18 is performed, data is processed as shown in FIG. 21. The baseband image data −2 (data 237) stored in the output buffer unit 116 is externally output at the next line-increment wavelet inverse transformation processing. The coefficients accumulated in each buffer of the level-independent buffer unit 120 are processed in the next and subsequent times.

As described above, synthesizing filter processing at each division level generates two lines each of lower-order division level coefficients, but only one line each is processed in the synthesizing filter processing. That is to say, of the two generated lines of coefficients, only line is used for the next synthesizing filter processing, but the other line is unnecessary until the next or subsequent line-increment wavelet inverse transformation processing. That is to say, there is no need to accumulate the generated two lines in the level-independent buffer unit 120 at the same time. Accordingly, the wavelet inverse transformation device 100 mutually offsets the accumulation of the two lines of coefficients, so as to be accumulated in the level-independent buffer unit 120 one line at a time. Thus, the capacity necessary for the level-independent buffer unit 120 can be reduced.

The level-independent buffer unit 120 needs to supply the coefficients held therein to the vertical synthesizing filter unit 112 via the selector 111 frequency, so an arrangement implemented with memory which can only be accessed at low speed, such as external memory which has to go through a shared bus for data read/write, may drastically lower the processing speed of the synthesizing filter processing, increasing delay time due to wavelet inverse transformation processing. Accordingly, the level-independent buffer unit 120 preferably is realized by implementation with memory which can be accessed at high speed without going through a shared bus, and is provided within an LSI chip including the CPU where the synthesizing filter processing is performed, such as so-called cache memory.

However, increase in the memory capacity of the cache memory increases the scale of the circuit, resulting in a larger chip size for the LSI chip. That is to say, increase in cache memory capacity may lead to increased manufacturing costs of the device. This means that there is an upper limit to cache memory capacity in real-world applicability, and from the perspective of cost reduction, the smaller the capacity is, the better.

Accordingly, increased data amount stored in the level-independent buffer unit 120 may result in insufficient capacity in the event that small-capacity cache memory has been used. In this case, external memory which operates slower needs to be used as buffer memory, but as described above, this may lead to increase in delay time due to the wavelet inverse transformation processing. Also, in this case, the delay time may be further increased due to mishits occurring at the cache memory and data backup and so forth.

Accordingly, as described above, such increase in delay time and increase in manufacturing costs can be reduced by arranging for the coefficients generated by synthesizing filter processing to be accumulated in the level-independent buffer unit 120 one line each so as to reduce capacity needed for the level-independent buffer unit 120.

Also, as described above, the wavelet inverse transformation device 100 accumulates in the output buffer unit 116 the one of the two lines of coefficients generated by synthesizing filter processing that is not immediately accumulated in the level-independent buffer unit 120.

The output buffer unit 116 is originally a buffer for accumulating one line of the two lines of generated baseband image data, in order to output baseband image data one line at a time. In other words, this data is not used until the baseband image data is generated, so as described above, coefficients not immediately accumulated in the level-independent buffer unit 120 are temporarily stored in the output buffer unit 116 until synthesizing filter processing of the coefficients accumulated at the level-independent buffer unit 120 ends. That is to say, the timing of accumulation in the level-independent buffer unit 120 is offset using the output buffer unit 116.

While the output buffer unit 116, as with the level-independent buffer unit 120, is preferably realized by cache memory which can operate at high speeds, in order to reduce delay time due to wavelet inverse transformation processing, storing the coefficients using such idle time (the period during which baseband image data is not being held) enables coefficients generated by synthesizing filter processing to be accumulated in the level-independent buffer unit 120 without increasing the capacity of the cache memory (output buffer unit 116).

That is to say, the wavelet inverse transformation device 100 updates the usage efficiency of the cache memory for buffering coefficient data and image data, thereby reducing the memory capacity necessary as buffer memory for holding data in the wavelet inverse transformation processing.

While an arrangement can be conceived for backing up coefficients not accumulated in the level-independent buffer unit 120 immediately in external memory, this may lead to complicated timing control to prevent increase in delay time. Using the output buffer unit 116 as described above allows the coefficients generated by the synthesizing filter processing to be easily accumulated in the level-independent buffer unit 120, one line at a time.

Also, as described with reference to the block diagram in FIG. 14 and the flowchart in FIG. 20, the output buffer unit 116 is arranged so as to be capable of writing baseband image data and reading out coefficients, simultaneously and in parallel. Thus, increase in delay time due to moving coefficients from the output buffer unit 116 to the level-independent buffer unit 120 can be suppressed without increasing costs.

Figure 22:
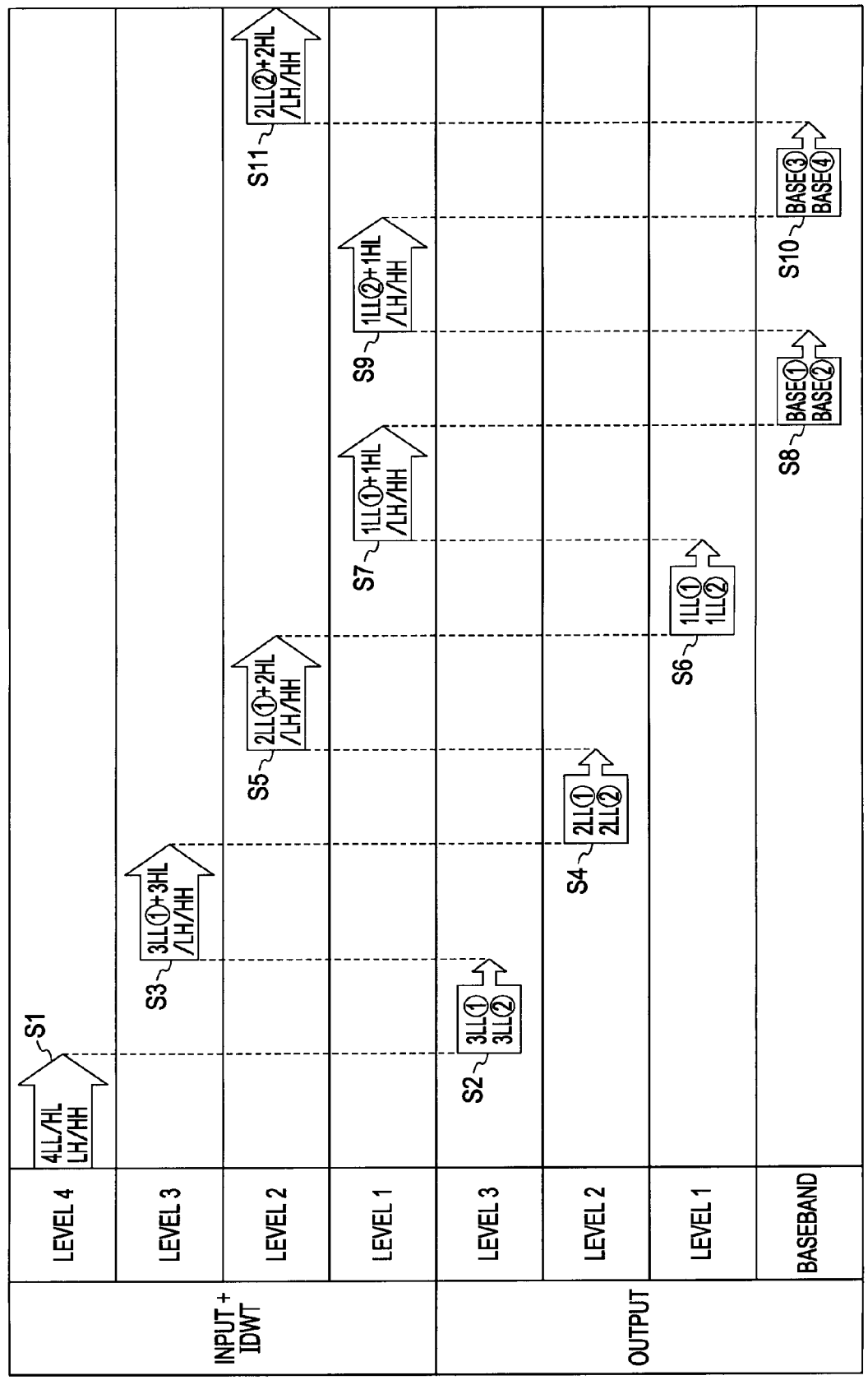
FIG. 22 is a model diagram for describing an example of the flow of line-increment wavelet inverse processing for one precinct.
Figure 23:
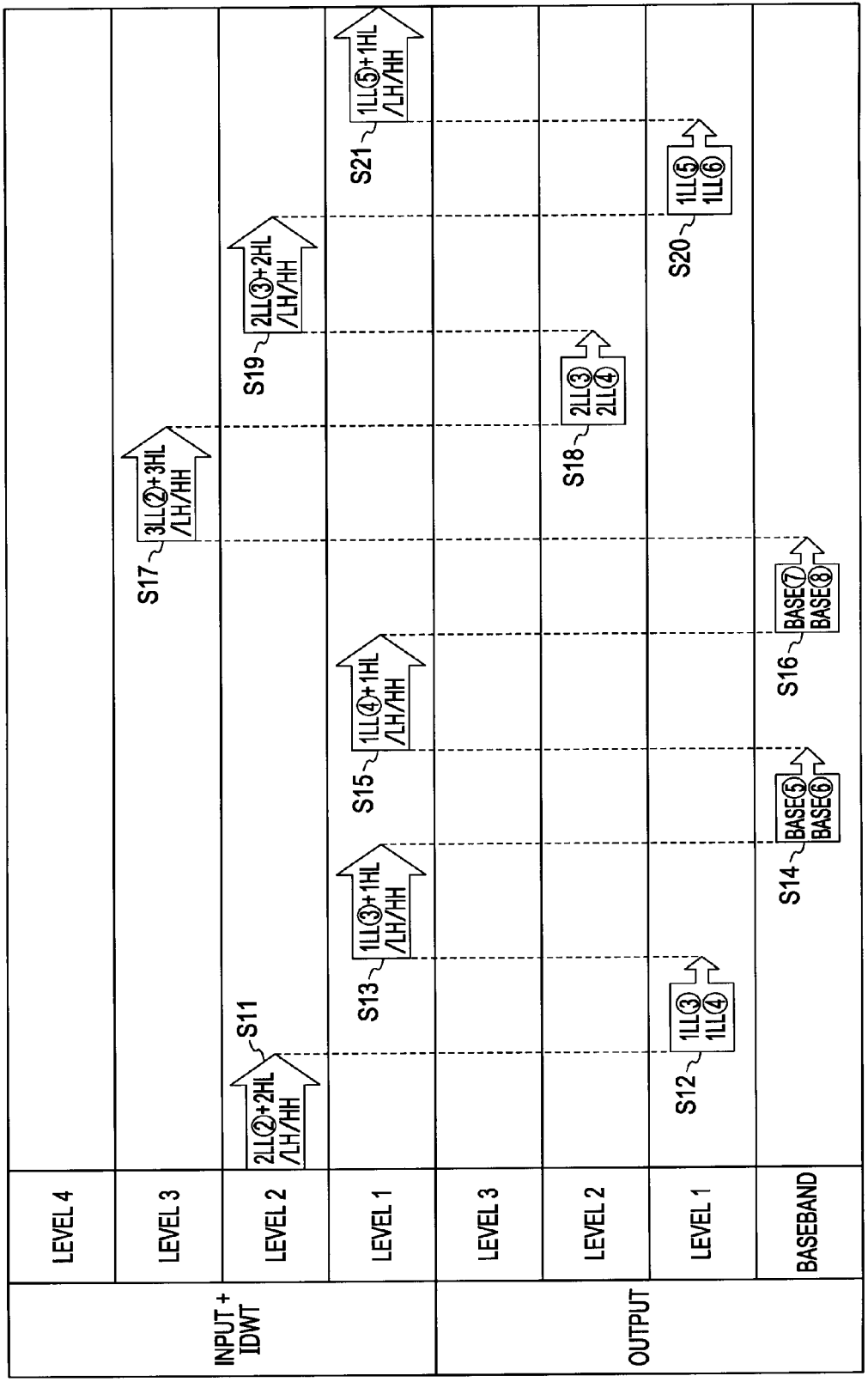
FIG. 23 is a model diagram continuing from FIG. 22, for describing an example of the flow of line-increment wavelet inverse processing for one precinct.
Figure 24:
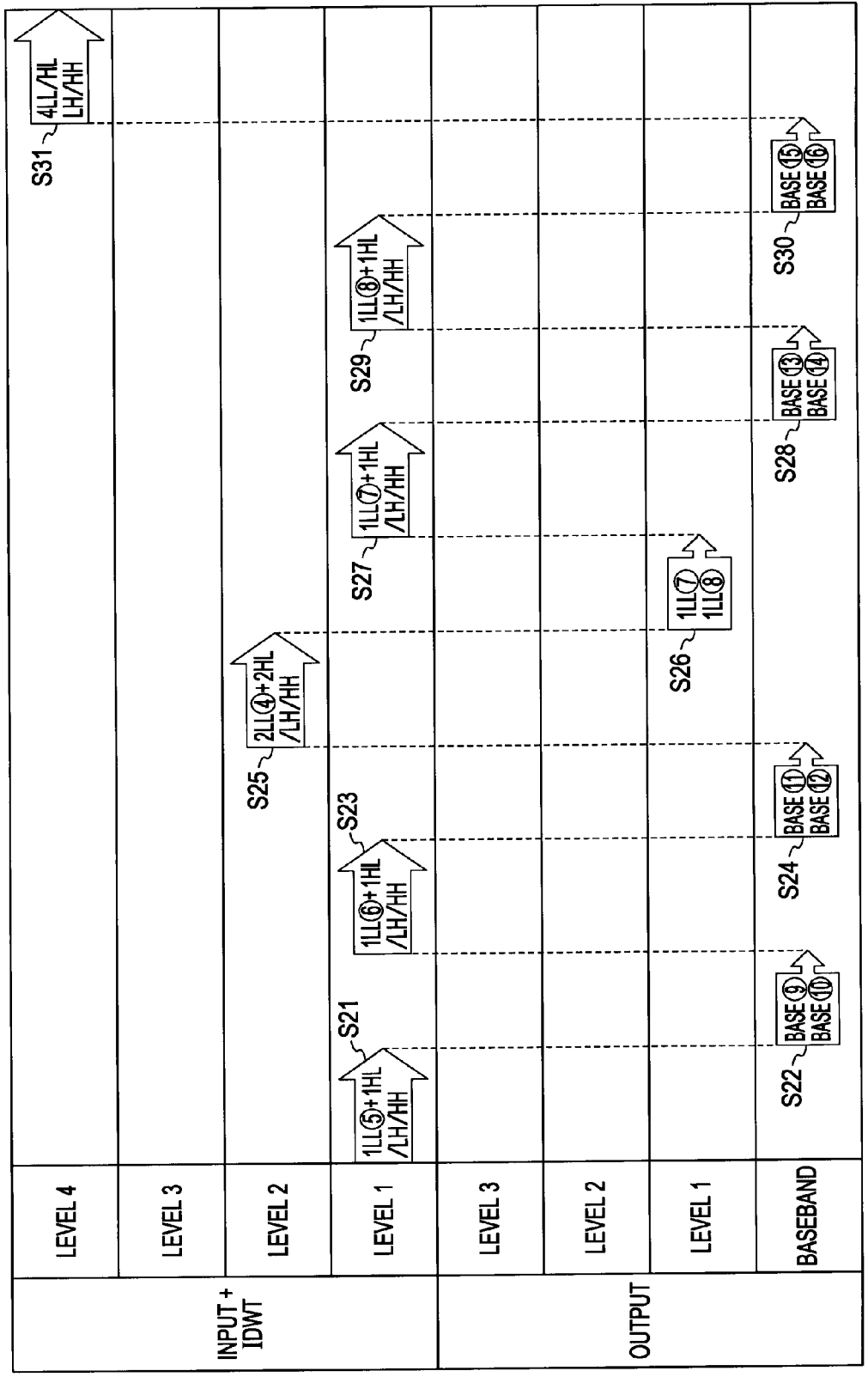
FIG. 24 is a model diagram continuing from FIG. 23, for describing an example of the flow of line-increment wavelet inverse processing for one precinct.

Next, a more specific example of the flow of wavelet inverse transformation processing for one precinct will be described with reference to FIGS. 22 through 24. In FIGS. 22 through 24, the numerals shown in circles are identification Nos. of lines within the precinct; the circles shown around the numerals in the drawings are omitted in the Present Specification. Note that the description which will be given here is one regarding wavelet inverse transformation processing performed on coefficients subjected to level 4 wavelet transformation.

As shown in FIG. 22, upon the first wavelet inverse transformation processing being started, first, one line each of the division level 4 sub-bands (4LL/HL/LH/HH) are subjected to synthesizing filter processing (arrow S1). This synthesizing filter processing generates the first line coefficients 3LL1 and second line coefficients 3LL2 for the lowband sub-band of division level 3 (arrow S2). Next, synthesizing filter processing is performed for the first line coefficients 3LL1 and one line each of newly-input division level 3 highband sub-band coefficients (3HL/LH/HH) (arrow S3), generating first line coefficients 2LL1 and second line coefficients 2LL2 for the lowband sub-band of division level 2 (arrow S4). Further, synthesizing filter processing is performed for the first line coefficients 2LL1 and one line each of newly-input division level 2 highband sub-band coefficients (2HL/LH/HH) (arrow S5), generating first line coefficients 1LL1 and second line coefficients 1LL2 for the lowband sub-band of division level 1 (arrow S6). Further, synthesizing filter processing is performed for the first line coefficients 1LL1 and one line each of newly-input division level 1 highband sub-band coefficients (1HL/LH/HH) (arrow S7), generating first line baseband image data Base 1 and second line baseband image data Base 2 for the baseband (arrow S8).

The first line of image data Base 1 is immediately externally output, and the second line of image data Base 2 is temporarily held in the output buffer unit 116 and output at the next output timing (the second line-increment wavelet inverse transformation processing).

At the time of starting the third line-increment wavelet inverse transformation processing, the second line coefficients 3LL2 of the division level 3 lowband sub-band generated in the first line-increment wavelet inverse transformation processing, the second line coefficients 2LL2 of the division level 2 lowband sub-band, and the second line coefficients 1LL2 of the division level 1 lowband sub-band, are accumulated at the level-independent buffer unit 120. Accordingly, with the third line-increment wavelet inverse transformation processing, of these, the second line coefficients 1LL2 of the division level 1 lowband sub-band are processed, being the lowest order coefficient. That is to say, synthesizing filter processing is performed for the second line coefficients 1LL2 and one line each of newly-input division level 1 highband sub-band coefficients (1HL/LH/HH) (arrow S9), generating third line baseband image data Base 3 and fourth line baseband image data Base 4 for the baseband (arrow S10).

The third line of image data Base 3 is immediately externally output, and the fourth line of image data Base 4 is temporarily held in the output buffer unit 116 and output at the next output timing (the fourth line-increment wavelet inverse transformation processing).

At the time of starting the fifth line-increment wavelet inverse transformation processing, the second line coefficients 1LL2 of the division level 1 lowband sub-band have already been processed, so the second line coefficients 3LL2 of the division level 3 lowband sub-band, and the second line coefficients 2LL2 of the division level 2 lowband sub-band, are accumulated at the level-independent buffer unit 120. Accordingly, with the fifth line-increment wavelet inverse transformation processing, of these, the second line coefficients 2LL2 of the division level 2 lowband sub-band are processed, being the lowest order coefficient. That is, synthesizing filter processing is performed for the second line coefficients 2LL2 and one line each of newly-input division level 2 highband sub-band coefficients (2HL/LH/HH) (arrow S11), generating third line coefficients 1LL3 and fourth line coefficients 1LL4 for the lowband sub-band of division level 1 (arrow S12), as shown in FIG. 23. Further, synthesizing filter processing is performed for the division level 1 third line coefficients 1LL3 and one line each of newly-input division level 1 highband sub-band coefficients (1HL/LH/HH) (arrow S13), generating fifth line baseband image data Base 5 and sixth line baseband image data Base 6 for the baseband (arrow S14).

The fifth line of image data Base 5 is immediately externally output, and the sixth line of image data Base 6 is temporarily held in the output buffer unit 116 and output at the next output timing (the sixth line-increment wavelet inverse transformation processing).

At the time of starting the seventh line-increment wavelet inverse transformation processing, the second line coefficients 3LL2 of the division level 3 lowband sub-band, generated at the first line-increment wavelet inverse transformation processing, and the fourth line coefficients 1LL4 of the division level 1 lowband sub-band, generated at the fifth line-increment wavelet inverse transformation processing, are accumulated at the level-independent buffer unit 120. Accordingly, with the seventh line-increment wavelet inverse transformation processing, of these, the fourth line coefficients 1LL4 of the division level 1 lowband sub-band are processed, being the lowest order coefficient. That is to say, synthesizing filter processing is performed for the fourth line coefficients 1LL4 and one line each of newly-input division level 1 highband sub-band coefficients (1HL/LH/HH) (arrow S15), generating seventh line baseband image data Base 7 and eighth line baseband image data Base 8 for the baseband (arrow S16).

The seventh line of image data Base 7 is immediately externally output, and the eighth line of image data Base 8 is temporarily held in the output buffer unit 116 and output at the next output timing (the eighth line-increment wavelet inverse transformation processing).

At the time of starting the ninth line-increment wavelet inverse transformation processing, only the second line coefficients 3LL2 of the division level 3 lowband sub-band generated at the first line-increment wavelet inverse transformation processing are accumulated at the level-independent buffer unit 120. Accordingly, with the ninth line-increment wavelet inverse transformation processing, the second line coefficients 3LL2 of the division level 3 lowband sub-band are processed. That is, synthesizing filter processing is performed for the second line coefficients 3LL2 and one line each of newly-input division level 3 highband sub-band coefficients (3HL/LH/HH) (arrow S17), generating third line coefficients 2LL3 and fourth line coefficients 2LL4 for the lowband sub-band of division level 2 (arrow S18). Further, synthesizing filter processing is performed for the division level 2 third line coefficients 2LL3 and one line each of newly-input division level 2 highband sub-band coefficients (2HL/LH/HH) (arrow S19), generating fifth line coefficients 1LL5 and sixth line coefficients 1LL6 for the lowband sub-band of division level 1 (arrow S20). Further, synthesizing filter processing is performed for the division level 1 fifth line coefficients 1LL5 and one line each of newly-input division level 1 highband sub-band coefficients (1HL/LH/HH) (arrow S21), generating ninth line baseband image data Base 9 and tenth line baseband image data Base 10 for the baseband (arrow S22).

The ninth line of image data Base 9 is immediately externally output, and the tenth line of image data Base 10 is temporarily held in the output buffer unit 116 and output at the next output timing (the tenth line-increment wavelet inverse transformation processing).

At the time of starting the eleventh line-increment wavelet inverse transformation processing, the fourth line coefficients 2LL4 of the division level 2 lowband sub-band generated at the ninth line-increment wavelet inverse transformation processing, and the sixth line coefficients 1LL6 of the division level 1 lowband sub-band, are accumulated at the level-independent buffer unit 120. Accordingly, with the eleventh line-increment wavelet inverse transformation processing, of these, the sixth line coefficients 1LL6 of the division level 1 lowband sub-band are processed, being the lowest order coefficient. That is to say, synthesizing filter processing is performed for the sixth line coefficients 1LL6 and one line each of newly-input division level 1 highband sub-band coefficients (1HL/LH/HH) (arrow S23), generating eleventh line baseband image data Base 11 and twelfth line baseband image data Base 12 for the baseband (arrow S24).

The eleventh line of image data Base 11 is immediately externally output, and the twelfth line of image data Base 12 is temporarily held in the output buffer unit 116 and output at the next output timing (the twelfth line-increment wavelet inverse transformation processing).

At the time of starting the thirteenth line-increment wavelet inverse transformation processing, the sixth line coefficients 1LL6 of the division level 1 lowband sub-band have been processed, so the fourth line coefficients 2LL4 of the division level 4 lowband sub-band are accumulated at the level-independent buffer unit 120. Accordingly, with the thirteenth line-increment wavelet inverse transformation processing, the fourth line coefficients 2LL4 of the division level 2 lowband sub-band are processed. That is, synthesizing filter processing is performed for the fourth line coefficients 2LL4 and one line each of newly-input division level 2 highband sub-band coefficients (2HL/LH/HH) (arrow S25), generating seventh line coefficients 1LL7 and eighth line coefficients 1LL8 for the lowband sub-band of division level 1 (arrow S26). Further, synthesizing filter processing is performed for the division level 1 seventh line coefficients 1LL7 and one line each of newly-input division level 1 highband sub-band coefficients (1HL/LH/HH) (arrow S27), generating thirteenth line baseband image data Base 13 and fourteenth line baseband image data Base 14 for the baseband (arrow S28).

The thirteenth line of image data Base 13 is immediately externally output, and the fourteenth line of image data Base 14 is temporarily held in the output buffer unit 116 and output at the next output timing (the fourteenth line-increment wavelet inverse transformation processing).

At the time of starting the fifteenth line-increment wavelet inverse transformation processing, only the eighth line coefficients 1LL8 of the division level 1 lowband sub-band generated at the thirteenth line-increment wavelet inverse transformation processing are accumulated at the level-independent buffer unit 120. Accordingly, with the fifteenth line-increment wavelet inverse transformation processing, the eighth line coefficients 1LL8 of the division level 1 lowband sub-band are processed. That is, synthesizing filter processing is performed for the eighth line coefficients 1LL8 and one line each of newly-input division level 1 highband sub-band coefficients (1HL/LH/HH) (arrow S29), generating fifteenth line baseband image data Base 15 and sixteenth line baseband image data Base 16 for the baseband (arrow S30).

The fifteenth line of image data Base 15 is immediately externally output, and the sixteenth line of image data Base 16 is temporarily held in the output buffer unit 116 and output at the next output timing (the sixteenth line-increment wavelet inverse transformation processing).

Thus, repeating the line-increment wavelet inverse transformation processing sixteen times generates and outputs one precinct worth of baseband image data (16 lines). The same processing as above is repeated for the next precinct (arrow S31).

Thus, the wavelet inverse transformation device 100 repeatedly performs line-increment wavelet inverse transformation processing, generating two lines at a time from the top of the base band image data and selecting one to process such that one line each is output, and repeating synthesizing filter processing. Accordingly, the wavelet inverse transformation device 100 can output baseband image data at every predetermined timing.

Also, the wavelet inverse transformation device 100 generates two lines each of baseband image data, and at the time thereof, executes only synthesizing filter processing necessary for generating those two lines. That is to say, the wavelet inverse transformation device 100 saves, of the two lines of coefficients generated by synthesizing filter processing, one line in the output buffer, and holds the other one line in the level-independent buffer unit 120, so as to preferentially perform synthesizing filter processing again on the one line held in the level-independent buffer unit 120, so as to generate two lines of coefficients. The wavelet inverse transformation device 100 repeats this until two lines of baseband image data are generated. Upon the baseband image data being generated and all of the coefficients held in the level-independent buffer unit 120 being processed, the wavelet inverse transformation device 100 reads out the coefficients held in the output buffer unit 116 and holds these in the level-independent buffer unit 120, and performs synthesizing filter processing preferentially from coefficients of lower order in division level. At this time as well, the wavelet inverse transformation device 100 repeats the synthesizing filter processing as described above.

Thus, the wavelet inverse transformation device 100 not only can generate two lines each of baseband image data from the top, but also alleviate load for generating each of the two lines of baseband image data, and further, reduce the data amount of data which needs to be held, such as, for example, coefficient data generated by synthesizing filter processing, baseband image data, and so forth, whereby the memory capacity necessary for the buffer can be reduced. This also allows manufacturing costs to be reduced.

Further, at the time of generating the two lines of baseband image data, the wavelet inverse transformation device 100 executes only synthesizing filter processing necessary for generating the two lines, so the interval of generating the two lines of baseband image data can be reduced. That is to say, the wavelet inverse transformation device 100 can output each line of the baseband image data at shorter intervals.

The image data which the wavelet inverse transformation device 100 processes is, for example, television signals or the like. As described above, the wavelet inverse transformation device 100 outputs baseband image data one line at a time, but matching the intervals thereof to the horizontal synchronization timing of television signals enables the wavelet inverse transformation device 100 to generate television signals in real-time (instantaneously). That is to say, in this case, the wavelet inverse transformation device 100 can perform wavelet inverse transformation of input coefficient data in real time, so that output image data can be displayed on a monitor without buffering, for example. It should be noted there that the term "real-time" as used here means that baseband image data can be output one line at a time matching the intervals thereof to the horizontal synchronization timing of television signals, and does not mean that the delay time due to wavelet inverse transformation processing is zero.

Figure 25:
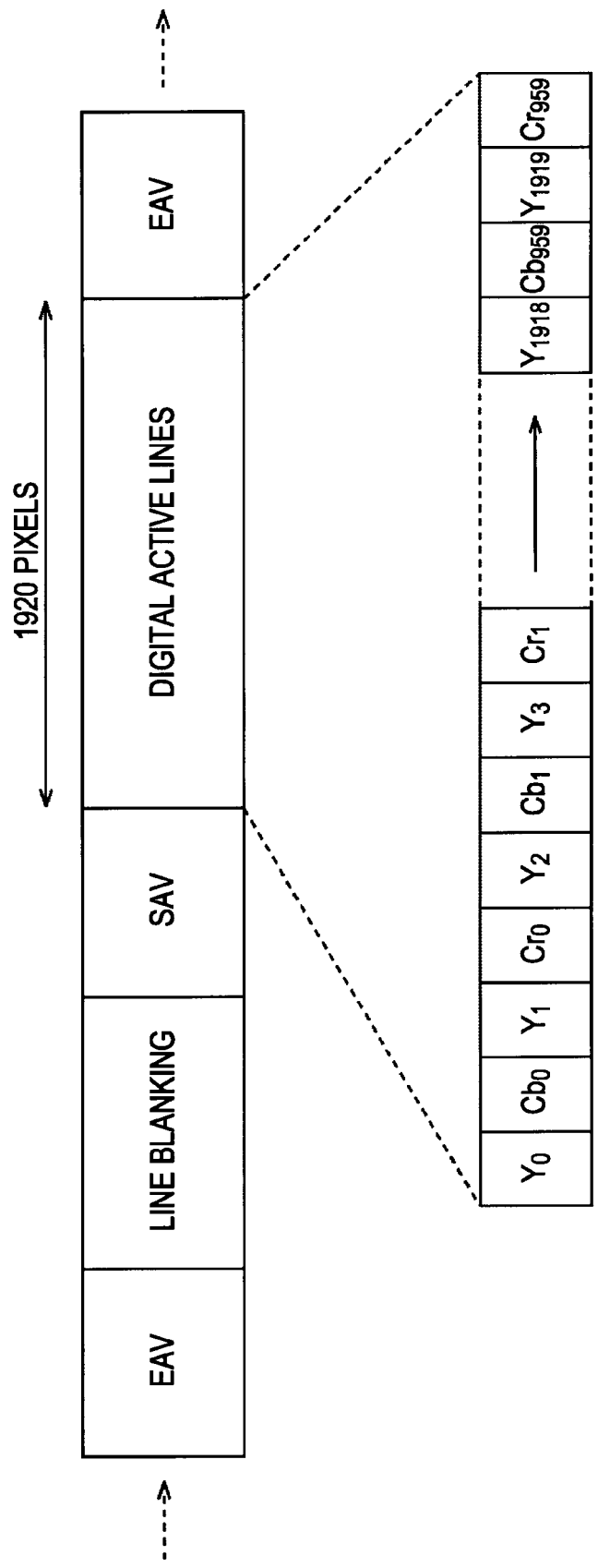
FIG. 25 is a diagram illustrating an example of a data array of luminance and color difference signals with the HDTV standard.

FIG. 25 is a schematic diagram illustrating the multiplexed data format for 10-bit samples, with the 1920×1080, YCbCr 4:2:2 format stipulated with SMPTE (Society of Motion Picture and Television Engineers) 292M HD-SDI (High Definition Serial Digital Interface) signals (1.5 Gbps). With this data format, 1920 pixels of baseband data, multiplexed into Y (luminance) and Cb, Cr (color difference), is positioned between an SAV (Start of Active Video) and an EAV (End of Active Video). A line blanking representing the horizontal blanking period is positioned between the EAV and the next SAV.

In order to generate base band image data in real-time with such a data format, the wavelet inverse transformation device 100 needs to generate the base band image data between one SAV and the next SAV. As described above, at the time of generating the two lines of baseband image data, the wavelet inverse transformation device 100 executes only synthesizing filter processing necessary for generating the two lines, so each line of the baseband image data can be output at shorter intervals, and baseband image data can be easily output one line at a time for each SAV.

Now, in actual practice, the above-described processing such as the wavelet transformation processing and wavelet inverse transformation processing is applied to image data transfer systems and recording/playback systems for example, and often are used along with other processing such as entropy encoding and entropy decoding and so forth.

Figure 26:
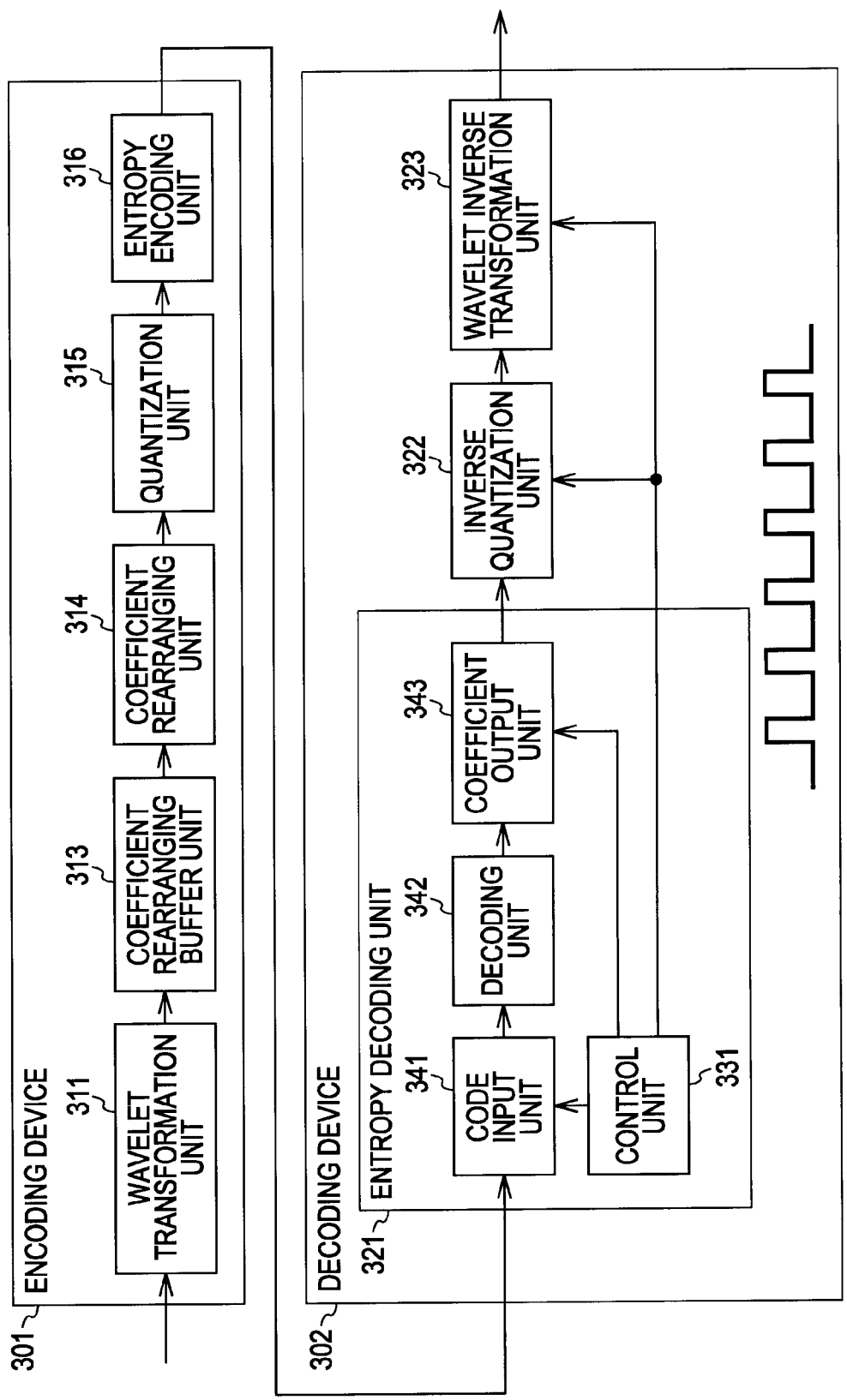
FIG. 26 is a block diagram illustrating the configuration of an example of an image transmission system to which an embodiment of the present invention has been applied.

The following is a description of an application example of the wavelet inverse transformation device 100. FIG. 26 is a block diagram illustrating a configuration of an image transmission system using the wavelet inverse transformation device 100 to which the present invention has been applied.

The image transmission system 300 shown in FIG. 26 is a system for encoding and transmitting image data of the data format shown in FIG. 25, having an encoding device 301 serving as a transmission source, and a decoding device 302 serving as a transmission destination.

The encoding device 301 subjects externally-input image data to wavelet transformation and encodes the data, and transmits the encoded data to the decoding device 302. The encoding device 301 has a wavelet transformation unit 311, coefficient rearranging buffer unit 313, coefficient rearranging unit 314, quantization unit 315, and entropy encoding unit 316.

The image data externally input to the encoding device 301 is transformed into wavelet coefficients at the wavelet transformation unit 311, by a method corresponding to wavelet inverse transformation processing at the wavelet inverse transformation 100 described with reference to FIGS. 1 through 4, and stored in the coefficient rearranging buffer unit 313. The coefficient data stored in the coefficient rearranging buffer unit 313 is sequentially read out by the coefficient rearranging unit 314 in the order in which wavelet inverse transformation processing is to be performed, quantized at the quantization unit 315, and encoded at the entropy encoding unit 316, so as to be converted into encoded data. The encoded data generated at the entropy encoding unit 316 is supplied to the decoding device 302.

The decoding device 302 decodes the encoded data transmitted from the encoding device 301, and performs wavelet inverse transformation processing, thereby restoring and outputting the baseband image data, having an entropy decoding unit 321, inverse quantization unit 322, and wavelet inverse transformation unit 323. That is to say, the encoded data supplied from the encoding device 301 is decoded at the entropy decoding unit 321, subjected to inverse quantization at the inverse quantization unit 322, and subjected to wavelet inverse transformation at the wavelet inverse transformation unit 323, so as to be transformed into baseband image data and output from the decoding device 302.

The wavelet inverse transformation unit 323 corresponds to the above-described wavelet inverse transformation device 100, having basically the same configuration, and performing the same processing. Accordingly, the wavelet inverse transformation unit 323 can perform wavelet inverse transformation processing so as to output image data one line at a time matching a horizontal synchronization timing.

The entropy decoding unit 321 has a control unit 331, code input unit 341, decoding unit 342, and coefficient output unit 343. The encoded data supplied to the entropy decoding unit 321 is received at the code input unit 341, and decoded at the decoding unit 342 so as to be transformed into coefficient data. The generated coefficient data is output to the inverse quantization unit 322 by the coefficient output unit 343. The control unit 331 controls the input/output at the decoding unit 342, i.e., the code input unit 341 and the coefficient output unit 343, thereby controlling the execution timing of decoding processing performed by the decoding unit 342. Also, the control unit 331 supplies clock signals indicating the horizontal synchronization timing of the image data to the inverse quantization unit 322 and wavelet inverse transformation unit 323.

The decoding unit 342, inverse quantization unit 322, and wavelet inverse transformation unit 323 execute each process under control of the control device 331, decoding, inverse-quantizing, and wavelet inverse transforming the input encoded data, so that image data is output one line at a time matching the horizontal synchronization timing.

Figure 27:
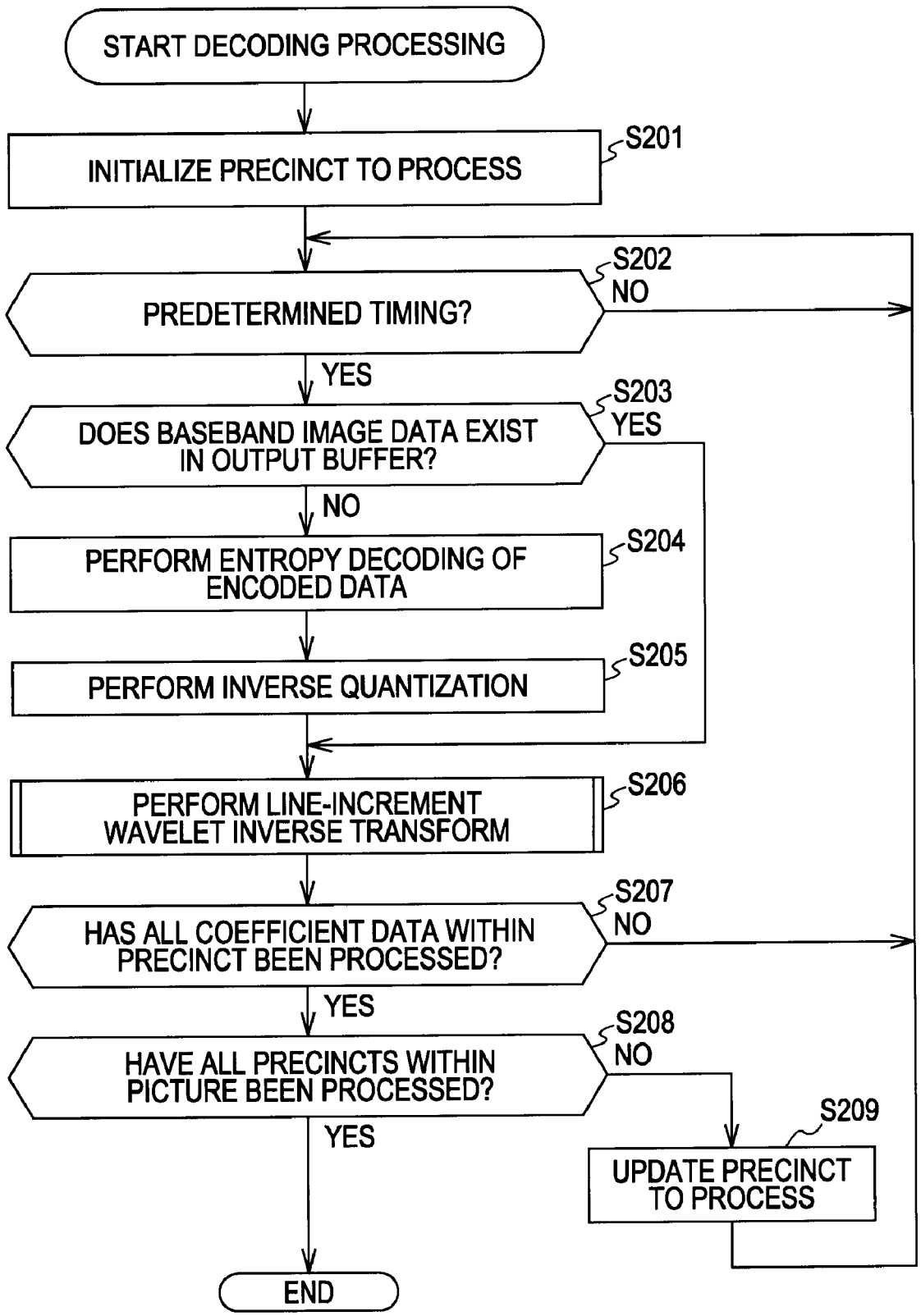
FIG. 27 is a flowchart for describing an example of the flow of decoding processing.

An example of the flow of the decoding processing executed by such a decoding device 302 will be described with reference to the flowchart shown in FIG. 27. This decoding processing is repeatedly executed for each picture.

Upon the decoding processing starting, in step S201 the control unit 331 initializes the precinct to process, and in step S202, determines whether or not the timing is a predetermined timing corresponding to the horizontal blanking timing (horizontal synchronization timing), and stands by till the predetermined timing.

In the event that determination is made in step S202 that the timing is the predetermined timing, the flow proceeds to step S203.

In step S203, determination is made regarding whether or not there is baseband image data in the output buffer unit of the wavelet inverse transformation unit 323. In the event that determination is made that there is no baseband image data at the output buffer unit, the flow proceeds to step S204. In step S204, the decoding unit 342 obtains encoded data via the code input unit 341 which is controlled by the control unit 331, and subjects the encoded data to entropy decoding so as to be transformed into coefficient data. The decoding unit 342 supplies the generated coefficient data to the inverse quantization unit 322 which is controlled by the control unit 331. In step S205, the inverse quantization unit 322 performs inverse quantization of the coefficient data, and supplies the coefficient data subjected to inverse quantization to the wavelet inverse transformation unit 323.

Upon ending of the processing in step S205, the flow proceeds to step S206. Also, in the event that determination is made in step S203 that there is baseband image data at the output buffer unit, outputting the image data in the output buffer unit is given priority, the processing in steps S204 and S205 is skipped, and the flow proceeds to step S206.

In step S206, in accordance with the control timing supplied from the control unit 331, the wavelet inverse transformation unit 323 executes the line-increment wavelet inverse transformation processing as described with reference to the flowchart in FIGS. 17 and 18, so as to generate and output two lines of baseband image data.

In step S207, the control unit 331 determines whether or not all coefficient data within the precinct has been processed, and in the event that determination is made that unprocessed data exists, the flow returns to step S202 and repeats the subsequent processing. On the other hand, in the event that determination has been made in step S207 that all coefficient data within the precinct has been processed, the flow proceeds to step S208.

In step S208, the control unit 331 determines whether or not all precincts within the picture have been processed. In the event that determination is made that there is an unprocessed precinct, the flow proceeds to step S209. In step S209, the control unit 331 updates the precinct to be processed to the next precinct, and the flow returns to step S202. In step S208, in the event that determination is made that all precincts within the picture have been processed, the control unit 331 ends decoding processing on that picture.

As described above, the decoding device 302 repeatedly executes line-increment wavelet inverse transformation processing under the control of the control unit 331 at predetermined timing, i.e., corresponding to the horizontal synchronization timing.

Thus, the decoding device 302 can output one line at a time with the horizontal synchronization timing. That is to say, the decoding device 302 can decode encoded data and restore baseband image data in real-time.

Figure 28:
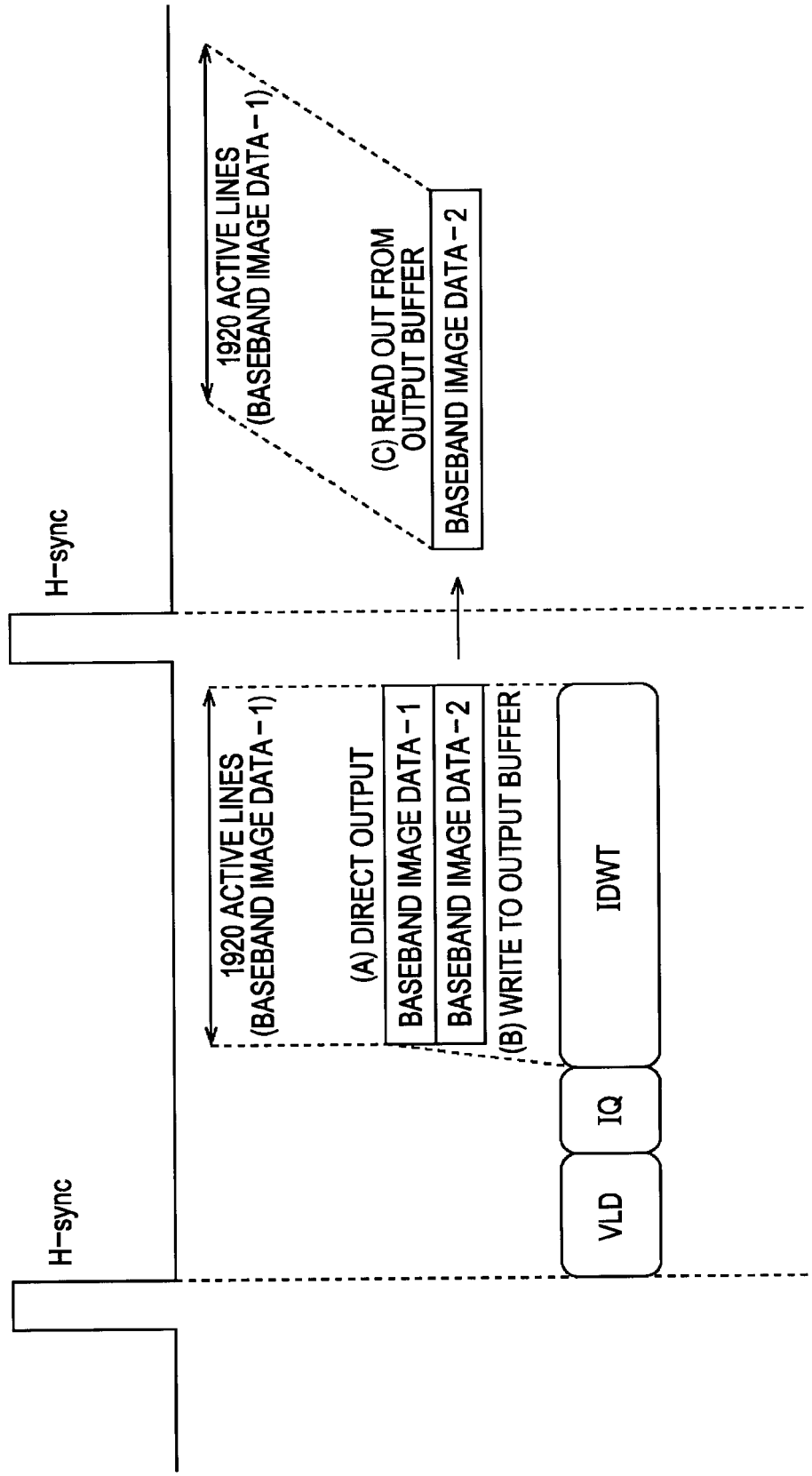
FIG. 28 is a model diagram for describing an example of processing execution timing.

FIG. 28 is a schematic diagram illustrating the way in which baseband image data is output in that case. As shown in FIG. 28, the baseband image data (baseband image data −1 and baseband image data −2) is output one line each every horizontal synchronization timing (H-Sync). Note however, as shown in FIG. 28, two lines each of the baseband image data is generated (baseband image data −1 and baseband image data −2). That is to say, of the two generated lines, one line is directly output at the horizontal synchronization timing when being generated, as with (A), and the other one line is written to the output buffer 116 as with (B) and read out and output from the output buffer 116 at the next horizontal synchronization timing as with (C).

Accordingly, as shown in FIG. 28, there is the need to match the entropy decoding processing (VLD), inverse quantization (IQ), and wavelet inverse transformation processing (IDWT) between horizontal synchronization timing periods. The wavelet inverse transformation unit 323 (wavelet inverse transformation device 100) performs synthesizing filter processing with the above-described order, thereby enabling the interval between generating of baseband image data, so real-time decoding processing at the timing such as shown in FIG. 28 can be easily achieved.

While an image data transmission system has been described above, the wavelet inverse transformation device 100 to which the present invention has been applied can be applied to other systems as well. However, it can be said that the greater the disadvantage of delay time increase is, i.e., the more reduction of delay time is demanded of the system is, the greater the advantage of application of the present invention is.

The wavelet inverse transformation device 100 has been described above such that a part of the coefficient data generated by synthesis filter processing is held in the output buffer unit 116 when there is no baseband image data accumulated. Accordingly, the amount of data stored in the level-independent buffer unit 120 at once can be reduced without increasing the amount of data stored in the output buffer unit 116 at once. That is to say, the wavelet inverse transformation device 100 can reduce the memory capacity necessary as buffer memory for holding data in the wavelet inverse transformation, by improving the usage efficiency of cache memory for buffering the coefficient data and image data. Also, with the wavelet inverse transformation device 100, overflow of coefficient data and image data from the cache memory (a situation wherein coefficient data and image data is undesirably backed up to external memory) can also be suppressed, so faster wavelet inverse transformation processing can be executed easily, without increasing manufacturing costs.

That is to say, in order to obtain such advantages, all that is necessary is for the output buffer unit 116 to be provided to the wavelet inverse transformation device 100, with a part of the coefficient data generated by the synthesis filter processing being held in the output buffer unit 116 when there is no baseband image data accumulated; all other applications of configurations and procedures and the like are optional. For example, an arrangement may be made wherein synthesis filter processing may be performed from the uppermost level toward the lowermost level for each division level. However, an arrangement wherein synthesis filter processing is performed so as to generated two lines each of baseband image data can reduce the amount of data to be held more.

Also, while description has been made above regarding an arrangement wherein wavelet transformation, encoding, decoding, and wavelet inverse transformation are performed in increments of precincts, but it goes without saying that wavelet transformation, encoding, decoding, and wavelet inverse transformation may be performed in increments of the entire picture. However, it can be said that performing these in increments of precincts enables delay time for wavelet inverse transformation to be reduced, and the amount of buffer memory necessary for holding coefficients to be reduced. In the same way, applying other configurations and processed described above such as configuring the output buffer unit 116 as illustrated in FIG. 14 allows the advantages described with each to be obtained.

Also, description has been made above with regard to an arrangement wherein, of the two lines of coefficient data obtained by the synthesis filter processing, the wavelet inverse transformation device 100 repeats synthesis filter processing from the uppermost order level to the lowermost order level wherein one line is held and synthesis filter processing is further performed regarding the other one line, and further, the held coefficient data is subjected to synthesis filter processing with priority from the lower order level coefficient data, thereby generating two lines each of baseband image data.

This allows for various advantages to be obtained, such as reducing the data amount of coefficient data to be held, performing wavelet inverse transformation at high speed with little delay, outputting baseband image data one line at a time at shorter intervals, suppressing increase in costs, and so forth.

That is to say, in order to obtain such advantages, all that is necessary is for the wavelet inverse transformation device 100 to repeat synthesis filter processing from the uppermost order level to the lowermost order level wherein one line of the two lines of coefficient data obtained by the synthesis filter processing is held and synthesis filter processing is further performed regarding the other one line, and further, the held coefficient data is subjected to synthesis filter processing with priority from the lower order level coefficient data, thereby generating two lines each of baseband image data; all other applications of configurations and procedures and the like are optional.

For example, an arrangement may be made wherein coefficient data is not held in the output buffer unit 116. However, holding coefficient data in the output buffer unit 116 enables increase in the memory amount of cache memory, and overflow of coefficient data and image data from the cache memory, to be suppressed, thereby performing wavelet inverse transformation at high speed with little delay, without increasing manufacturing costs. In the same way, applying other configurations and processed described above such as configuring the output buffer unit 116 as illustrated in FIG. 14 allows the advantages described with each to be obtained.

The above-described series of processing can be realized by hardware, or by software. In this case, a configuration may be made such as the personal computer shown in FIG. 29.

In FIG. 29, a CPU (Central Processing Unit) 401 executes processing of various types, following programs stored in ROM (Read Only Memory) 402 or loaded to RAM (Random Access Memory) 403 from a storage unit 413. The RAM 403 also stores as necessary any data necessary for the CPU 401 to execute the various types of processing. The CPU 401, ROM 402, and RAM 403 are mutually connected via a bus 404. The bus 404 is also connected to an input/output interface 410.

Connected to the input/output interface 410 are an input unit 411 made up of a keyboard, mouse, etc., an output unit 412 made up of a display such as a CRT (Cathode Ray Tube) or LCD (Liquid Crystal Display) or the like, and speakers or the like, a storage unit 413 made up of a hard disk or the like, and a communication unit 414 made up of a modem or the like. The communication unit 414 performs communication processing via a network, of which the Internet is representative.

A drive 415 is connected to the input/output interface 410 as necessary, with removable media 421 such as a magnetic disk, optical disc, magneto-optical disk, semiconductor memory, or the like being mounted as appropriate, with computer programs read out therefrom being installed in the storage unit 413 as necessary.

In the event of executing the above-describe series of processing by software, a program making up the software is installed from a network or a recording medium.

As shown in FIG. 29, the recording medium may be, for example, may be configured of removable media 421, such as magnetic disks (including flexible disks), optical disks (including CD-ROM (Compact Disk Read Only Memory) and DVD (Digital Versatile Disk), magneto-optical disks (including MD (Mini-Disk (a registered trademark))), or semiconductor memory or the like, which is distributed separately from the device main unit so as to distribute the program to the user, but is not restricted to such removable media 421, and may be configured of ROM 402 or the storage unit 413 in which the program has been recorded, built into the device main unit so as to distribute the program to the user in that state.

Note that with the Present Specification, steps describing the program recorded in the recording medium may of course include processing performed in time-sequence following the described order, but is not restricted to processing in time-sequence, and may include processing executed in parallel or individually. Also, in the Present Specification, the term "system" refers to the entirety of equipment configured of multiple devices. Also, a configuration described as being a single device in the above description may be divided so as to be configured of multiple devices, or conversely, a configuration described above as being multiple devices may be integrated so as to be configured as a single device. Of course, other configurations than those described above may be added to the configurations of the devices. Moreover, a part of the configuration of one device may be included in the configuration of another device as long as the configuration and operations of the overall system are substantially the same.

It should be understood by those skilled in the art that various modifications, combinations, sub-combinations and alterations may occur depending on design requirements and other factors insofar as they are within the scope of the appended claims or the equivalents thereof.

What is claimed is:

1. An information processing device comprising:
synthesis filter processing means for subjecting image data to analysis filtering for dividing the frequency components of said image data into highband components and lowband components hierarchically into a plurality of division levels, and subject the frequency components of said image data divided into a plurality of frequency components to synthesis filtering for mutually synthesizing the frequency components of the frequency band of the same division level recursively, the synthesis filter processing means subjecting a different number of lines of data to the analysis filtering for each of the plurality of division levels;
frequency component holding means for holding frequency components of a division level one order lower, generated by said synthesis filtering performed by said synthesis filter processing means; and
control means for controlling said synthesis filter processing means to recursively perform said synthesis filtering processing on each frequency component held in said frequency component holding means, in an order whereby said image data is restored in order from the top of said image, a plurality of lines at a time.

2. The information processing device according to claim 1, wherein said control means cause said synthesis filter processing means to recursively perform said synthesis filtering processing on each frequency component held in said frequency component holding means, in an order whereby said image data is restored in order from the top of said image, two lines at a time.

3. The information processing device according to claim 1, wherein said frequency component holding means hold said frequency components mutually independent for each division level of said frequency components.

4. The information processing device according to claim 1, wherein said control means cause said synthesis filter processing means to preferentially perform said synthesis filtering processing on the frequency components of lower level, of the frequency components held in said frequency component holding means.

5. The information processing device according to claim 4, wherein said synthesis filter processing means synthesize one line each of frequency components of mutually the same division level frequency band to generate a plurality of lines of frequency components of a division level one order lower; and wherein said control means cause said frequency component holding means to hold said plurality of lines generated by said filter processing means, one line at a time.

6. The information processing device according to claim 5, wherein said synthesis filter processing means synthesize one line each of frequency components of mutually the same division level frequency band to generate two lines of frequency components of a division level one order lower; and wherein said control means cause said frequency component holding means to hold said two lines generated by said filter processing means, one line at a time.

7. The information processing device according to claim 6, further comprising:
image data holding means configured to hold said image data restored by said synthesis filter processing which is recursively performed; wherein said control means cause said frequency component holding means to hold, of said two lines generated by said synthesis filter processing means, one line, and cause said frequency component holding means to hold the other one line after said other one line has been temporarily held by said image data holding means, such that one line is held at a time in said frequency component holding means.

8. The information processing device according to claim 7, wherein said control means externally output, of said two lines of image data restored, one line, and hold the other one line in said image data holding means until the next output timing.

9. The information processing device according to claim 8, wherein said control means hold said other one line of frequency components generated by said synthesis filter processing means in said image data holding means during a period in which said image data is not held, and further, at the timing of holding said other one line of said image data generated by said synthesis filter processing means, said frequency component held at that time are read out and moved to said frequency component holding means.

10. The information processing device according to claim 1, wherein a number of the plurality of division levels is three, the synthesis filter processing means subjects eight lines of data to the analysis filtering for a first division level, subjects four lines of data for a second division level, and subjects two lines of data to the analysis filtering for a third division level.

11. An information processing method comprising:
subjecting image data to analysis filtering for dividing the frequency components of said image data into highband components and lowband components hierarchically a, and subjecting the frequency components of said image data divided into a plurality of frequency components to synthesis filtering for mutually synthesizing the frequency components of the frequency band of the same division level recursively, the subjecting including subjecting a different number of lines of data to the analysis filtering for each of the plurality of division levels;
holding frequency components of a division level one order lower, generated in said synthesis filtering; and
recursively performing said synthesis filtering processing on each frequency component held, in an order whereby said image data is restored in order from the top of said image, a plurality of lines at a time.

12. The information processing method according to claim 11, wherein a number of the plurality of division levels is three, the subjecting includes subjecting eight lines of data to the analysis filtering for a first division level, subjecting four lines of data for a second division level, and subjecting two lines of data to the analysis filtering for a third division level.

13. An information processing device comprising:
a synthesis filter processing unit configured to subject image data to analysis filtering for dividing the frequency components of said image data into highband components and lowband components hierarchically into a plurality of division levels, and subject the frequency components of said image data divided into a plurality of frequency components to synthesis filtering for mutually synthesizing the frequency components of the frequency band of the same division level recursively, the synthesis filter processing unit subjecting a different number of lines of data to the analysis filtering for each of the plurality of division levels;
a frequency component holding unit configured to hold frequency components of a division level one order lower, generated by said synthesis filtering performed by said synthesis filter processing unit; and
a control unit configured to cause said synthesis filter processing unit to recursively perform said synthesis filtering processing on each frequency component held in said frequency component holding unit, in an order whereby said image data is restored in order from the top of said image, a plurality of lines at a time.

14. The information processing device according to claim 13, wherein a number of the plurality of division levels is three, the synthesis filter processing unit subjects eight lines of data to the analysis filtering for a first division level, subjects four lines of data for a second division level, and subjects two lines of data to the analysis filtering for a third division level.

* * * * *